(12) United States Patent
Mackall et al.

(10) Patent No.: US 12,454,562 B2
(45) Date of Patent: Oct. 28, 2025

(54) REGULATABLE CELL SURFACE RECEPTORS AND RELATED COMPOSITIONS AND METHODS

(71) Applicant: The Board of Trustees of the Leland Stanford Junior University, Stanford, CA (US)

(72) Inventors: Crystal Mackall, Stanford, CA (US); Louai Labanieh, Palo Alto, CA (US); Robbie Majzner, Palo Alto, CA (US); Michael Z. Lin, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 1002 days.

(21) Appl. No.: 17/299,239

(22) PCT Filed: Dec. 5, 2019

(86) PCT No.: PCT/US2019/064722
§ 371 (c)(1),
(2) Date: Jun. 2, 2021

(87) PCT Pub. No.: WO2020/118076
PCT Pub. Date: Jun. 11, 2020

(65) Prior Publication Data
US 2022/0041686 A1 Feb. 10, 2022

Related U.S. Application Data

(60) Provisional application No. 62/776,250, filed on Dec. 6, 2018.

(51) Int. Cl.
| | | |
|---|---|---|
| C07K 14/705 | (2006.01) | |
| A61K 38/05 | (2006.01) | |
| A61K 38/17 | (2006.01) | |
| A61K 39/395 | (2006.01) | |
| A61K 40/11 | (2025.01) | |

(Continued)

(52) U.S. Cl.
CPC .......... *C07K 14/7051* (2013.01); *A61K 38/05* (2013.01); *A61K 38/177* (2013.01); *A61K 38/1774* (2013.01); *A61K 39/3955* (2013.01); *A61K 40/11* (2025.01); *A61K 40/31* (2025.01); *A61K 40/4205* (2025.01); *A61K 40/4211* (2025.01); *A61K 40/4258* (2025.01); *C07K 14/005* (2013.01); *C07K 14/705* (2013.01); *C07K 14/70517* (2013.01); *C07K 14/70521* (2013.01); *C07K 14/70578* (2013.01); *C07K 16/2827* (2013.01); *C07K 16/46* (2013.01); *C07K 19/00* (2013.01); *C12N 5/0636* (2013.01); *C12N 5/0646* (2013.01); *A61K 2039/505* (2013.01); *A61K 40/15* (2025.01); *A61K 40/32* (2025.01); *A61K 2239/10* (2023.05); *A61K 2239/23* (2023.05); *A61K 2239/31* (2023.05); *A61K 2239/38* (2023.05); *A61K 2239/48* (2023.05); *C07K 2317/622* (2013.01); *C07K 2319/02* (2013.01); *C07K 2319/03* (2013.01); *C07K 2319/30* (2013.01); *C07K 2319/33* (2013.01); *C07K 2319/50* (2013.01);

(Continued)

(58) Field of Classification Search
CPC ............ C07K 14/705; C07K 14/70517; C07K 14/70521; C07K 19/00; C07K 16/46; C07K 2319/50; C07K 2319/03; C07K 2317/24; A61K 39/3955; A61K 39/39558; A61K 2039/505; A61K 2239/10; A61K 2239/23; A61K 2239/35; A61K 40/11; A61K 40/15; A61K 40/31; A61K 40/32; C12N 5/0636; C12N 5/0646; C12N 15/62
See application file for complete search history.

(56) References Cited

U.S. PATENT DOCUMENTS

2021/0189367 A1* 6/2021 Lee ................ A61K 39/464412

FOREIGN PATENT DOCUMENTS

| WO | WO 2016193696 | 8/2016 |
|---|---|---|
| WO | WO 2018039247 | 3/2018 |

(Continued)

OTHER PUBLICATIONS

Labanieh et al. Enhanced safety and efficacy of protease-regulated CAR-T cell receptors. Cell 185: 1745-1763, 2022.*

(Continued)

*Primary Examiner* — Bridget E Bunner
(74) *Attorney, Agent, or Firm* — Brian E. Davy; Bozicevic, Field & Francis LLP

(57) ABSTRACT

Provided herein are cell surface receptors that include an extracellular binding domain, a transmembrane domain, an intracellular signaling domain, and a protease cleavage site disposed between the extracellular binding domain and the intracellular signaling domain. In certain aspects, the cell surface receptors are engineered cell surface receptors, such as chimeric antigen receptors (CARs). Also provided are cells that include such receptors (e.g., where the cells express the receptors on their surface) and pharmaceutical compositions including such cells. Nucleic acids that encode the cell surface receptors, cells including such nucleic acids, and pharmaceutical compositions including such cells, are also provided. Also provided are methods for regulating signaling of a cell surface receptor, and methods of using the cells of the present disclosure, including methods of using such cells to administer a regulatable cell-based therapy to an individual.

11 Claims, 41 Drawing Sheets
Specification includes a Sequence Listing.

(51) Int. Cl.

| | |
|---|---|
| *A61K 40/31* | (2025.01) |
| *A61K 40/42* | (2025.01) |
| *C07K 14/005* | (2006.01) |
| *C07K 14/725* | (2006.01) |
| *C07K 16/28* | (2006.01) |
| *C07K 16/46* | (2006.01) |
| *C07K 19/00* | (2006.01) |
| *C12N 5/0783* | (2010.01) |
| *A61K 39/00* | (2006.01) |
| *A61K 40/15* | (2025.01) |
| *A61K 40/32* | (2025.01) |

(52) U.S. Cl.
CPC .............. *C12N 2770/24232* (2013.01); *C12N 2770/24271* (2013.01)

(56) References Cited

FOREIGN PATENT DOCUMENTS

| WO | WO-2018204717 A1 | * | 11/2018 |
| WO | WO-2019099689 A1 | * | 5/2019 |
| WO | WO-2019118518 A2 | * | 6/2019 |

OTHER PUBLICATIONS

Berg et al. (1995) "Physiological functions of endosomal proteolysis" Biochem. J. 307:313-326.
Hooper et al. (1997) "Membrane protein secretases" Biochem. J. 321:265-279.
Labanieh et al. (2018) "Programming CAR-T cells to kill cancer" Nature Biomedical Engineering, 2:377-391.
Liu et al. (2017) "Systematic comparison of 2A peptides for cloning multi-genes in a polycistronic vector" Scientific Reports, 7:2193.
Mei et al. (2005) "The importance of being dimeric" FEBS J. 272(1):16-27.
Talanian et al. (1997) "Substrate Specificities of Caspase Family Proteases" J. Biol. Chem. 272(15):9677-9682.
Thornberry et al. (1997) "A Combinatorial Approach Defines Specificities of Members of the Caspase Family and Granzyme B: Functional Relationships Established For Key Mediators Of Apoptosis" J. Biol. Chem. 272(29):17907-17911.
Viaud et al. (2018) "Switchable control over in vivo CAR T expansion, B cell depletion, and induction of memory" PNAS 115(46):E10898-E10906.
Werb (1997) "ECM and Cell Surface Proteolysis: Regulating Cellular Ecology" Cell, 91:439-442.
Wolfsberg et al. (1995) "ADAM, a Novel Family of Membrane Proteins Containing A Disintegrin And Metalloprotease Domain: Multipotential Functions in Cell-Cell and Cell-Matrix Interactions" J. Cell Biol. 131(2):275-278.
Han et al. (2017) "Masked Chimeric Antigen Receptor for Tumor-Specific Activation" Molecular Therapy, 25:274-284.

* cited by examiner

FIG. 12
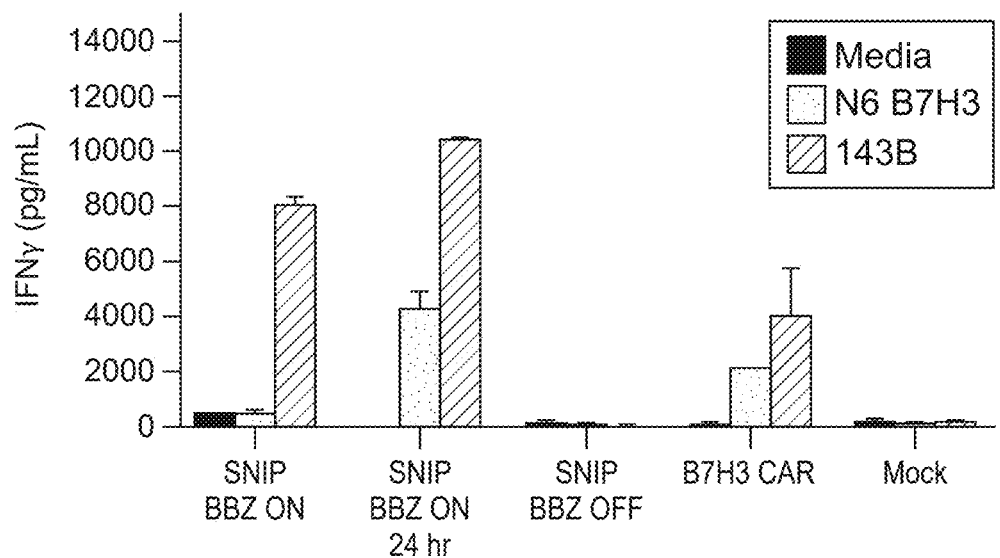
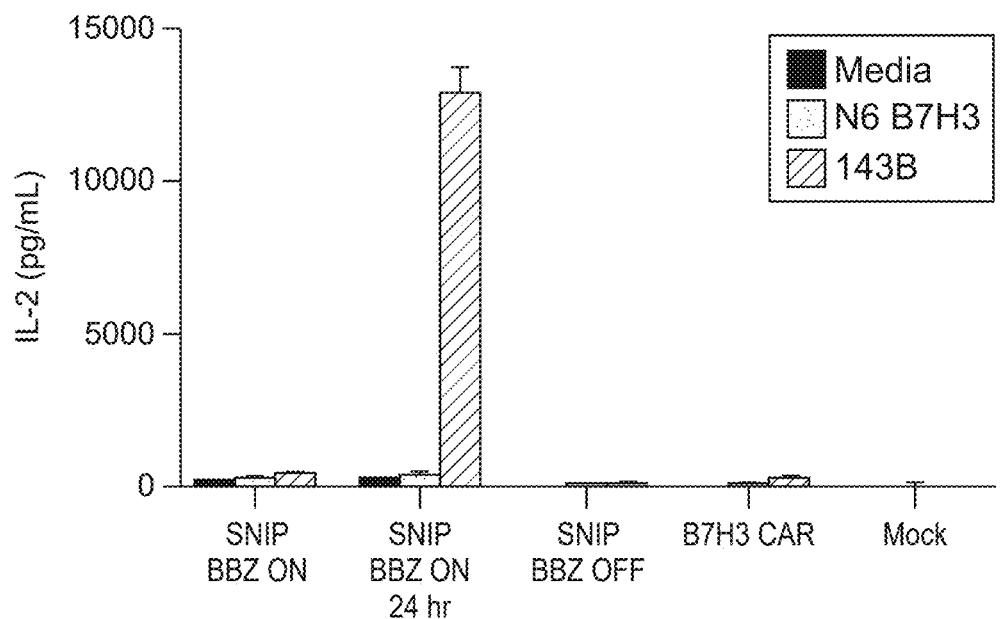

Leukemia imaging

FIG. 16
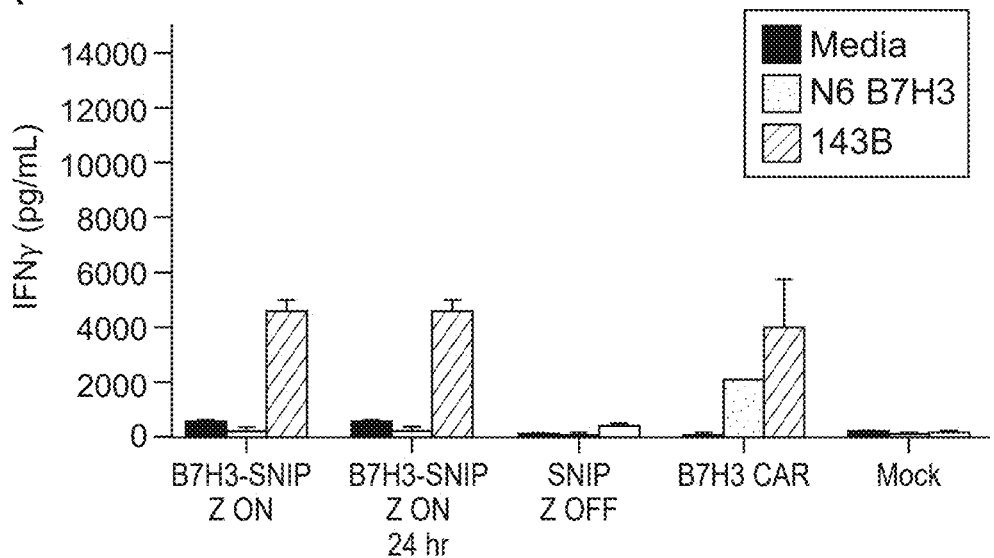
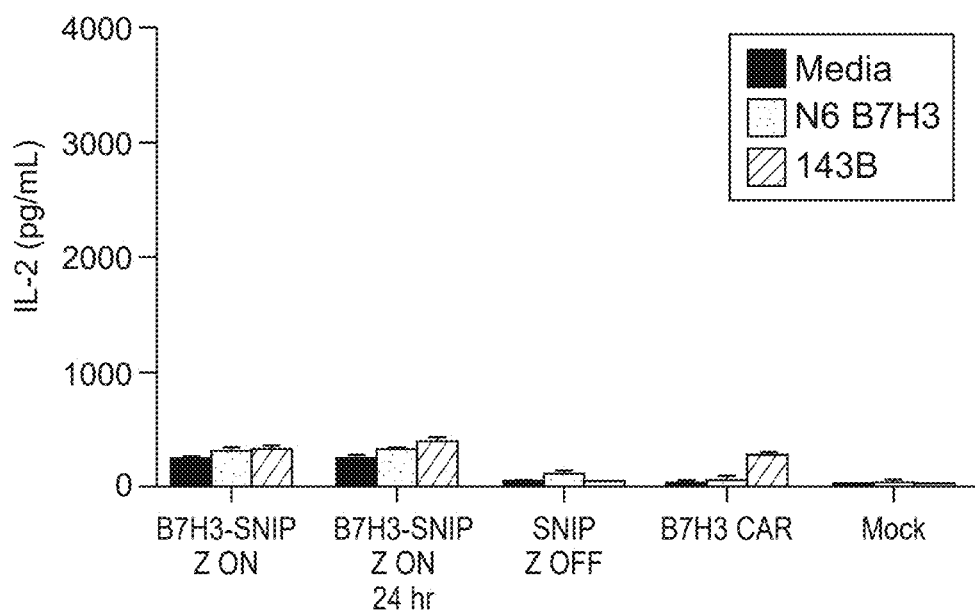

A

| Cleavage site (aa sequence) | $K_{Cat}$ (min$^{-1}$) | $K_m$ (µM) | $K_{cat}/K_m$ (M$^{-1}$S$^{-1}$) |
|---|---|---|---|
| 064(DEMEECSQH) | 0.16 | 2.80 | 9.2 |
| 065(EDWPCSMGS) | 0.8 | 1.6 | 830 |
| 066(ECTTPCSGSWL) | 1.1 | 160 | 113 |

FIG. 18
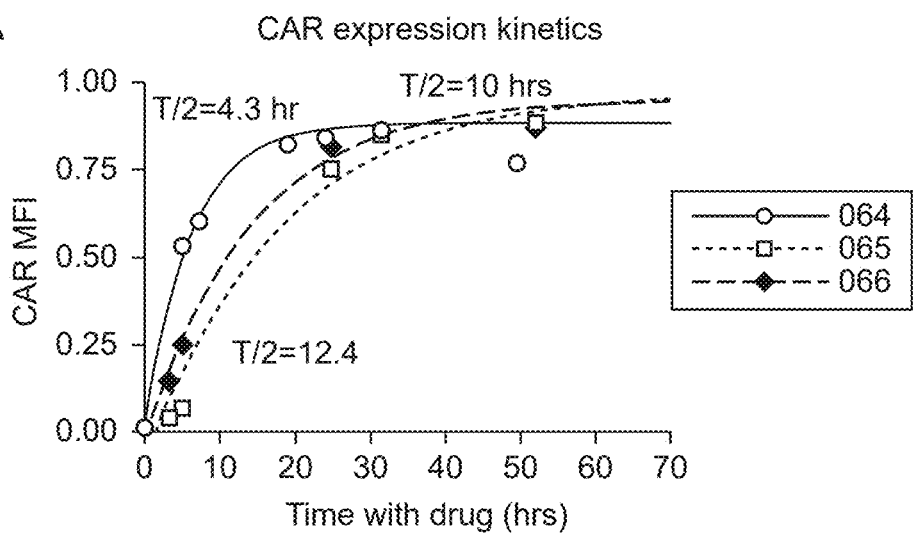
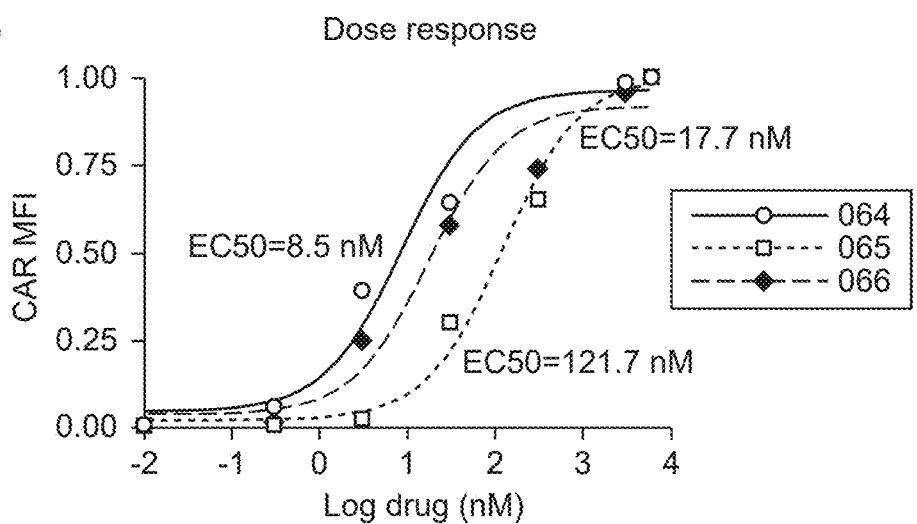
C
| Cleavage site (aa sequence) | $K_{Cat}$ (min$^{-1}$) | $K_m$ (μM) | $K_{cat}/K_m$ (M$^{-1}$S$^{-1}$) |
|---|---|---|---|
| 064(DEMEECSQH) | 0.16 | 2.80 | 9.2 |
| 065(EDWPCSMGS) | 0.8 | 1.6 | 830 |
| 066(ECTTPCSGSWL) | 1.1 | 160 | 113 |

Cut site 1=4a4b (DEMEECSQH)
Cut site 2=5a5b (EDVVPCSMGS)

Mock
CAR ON
CAR OFF

Cut site 3=4b5a (ECTTPCSGSWL)
Kcat Hi=4a4b cut site with A54T protease

—○— Mock
---□--- CAR ON
---△--- CAR OFF

| CAR Tm | 8 | 8 | 28 | 28 |
|---|---|---|---|---|
| Protease Tm | 8 | 28 | 8 | 28 |

8= CD8α transmembrane
28= CD28 transmembrane uncleaved ⟶ CAR

FIG. 34 (Cont.)
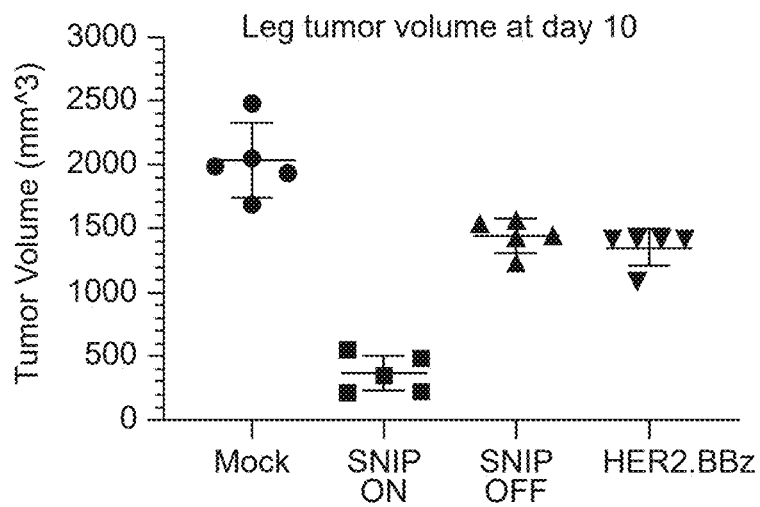
SNIP ON= HER2 SNIP.BBz CAR-T + drug
SNIP OFF= HER2 SNIP.BBz CAR-T - drug
CONSTIT= HER2.BBz consitutive CAR-T
Mock= untransduced T cells
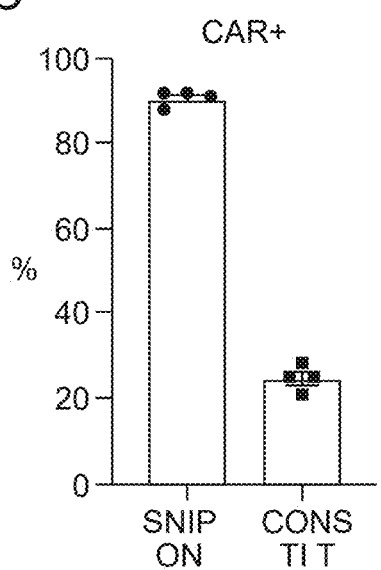
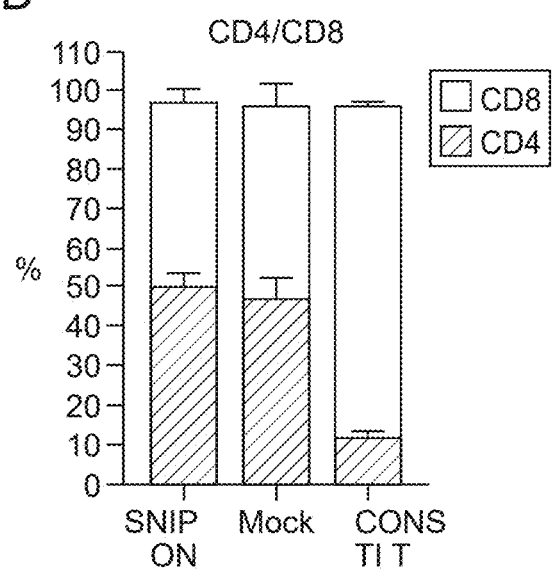

FIG. 37
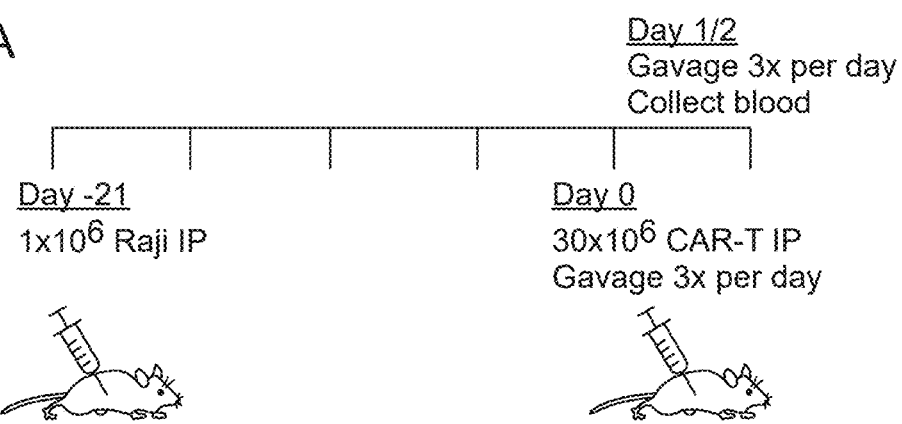
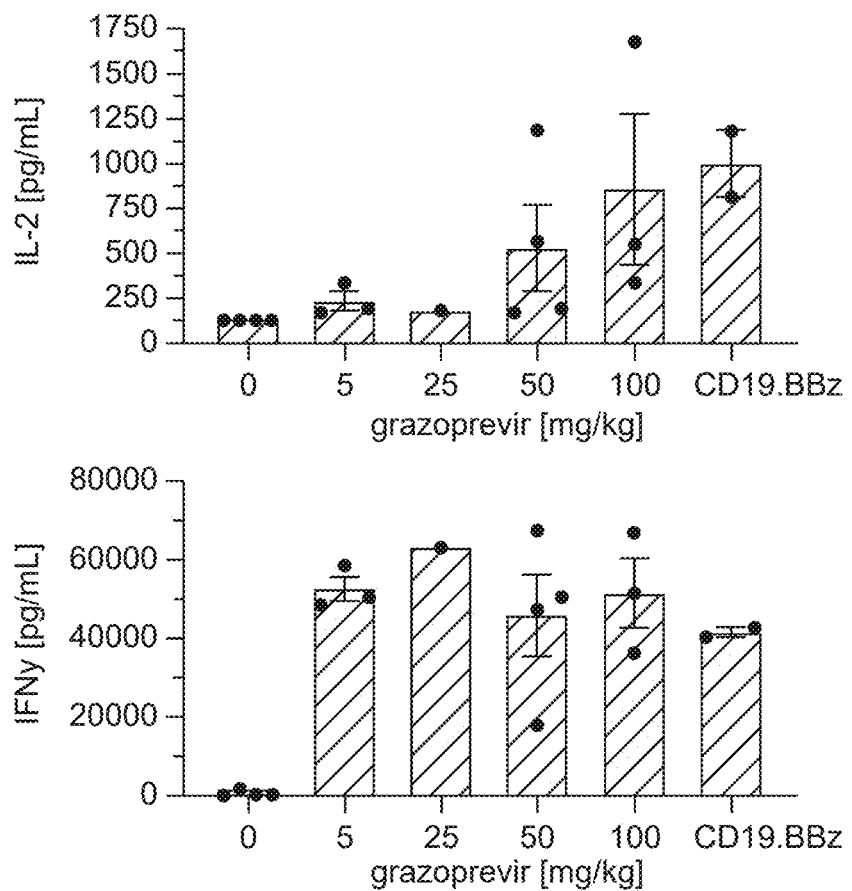

FIG. 38
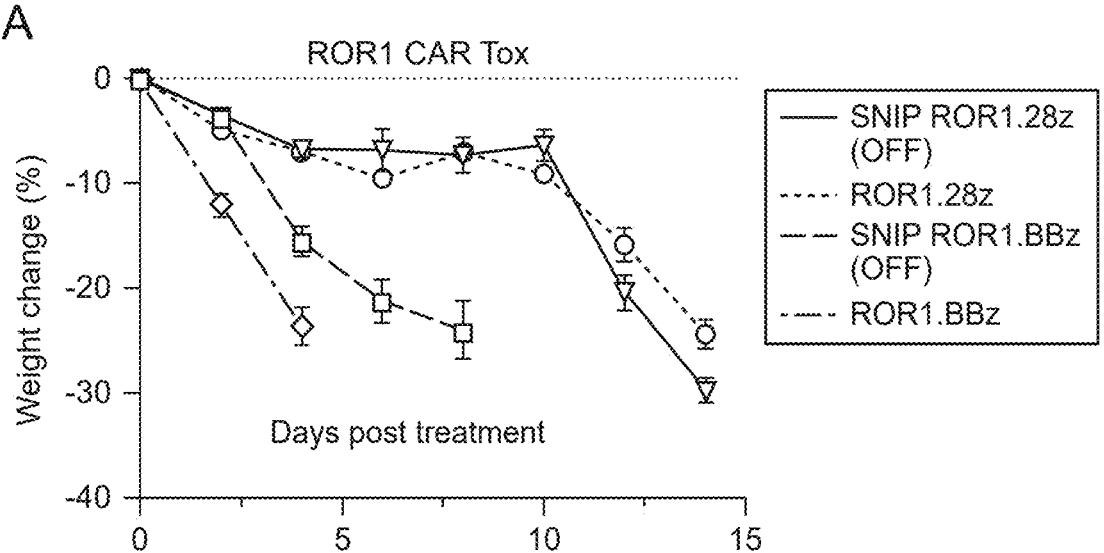
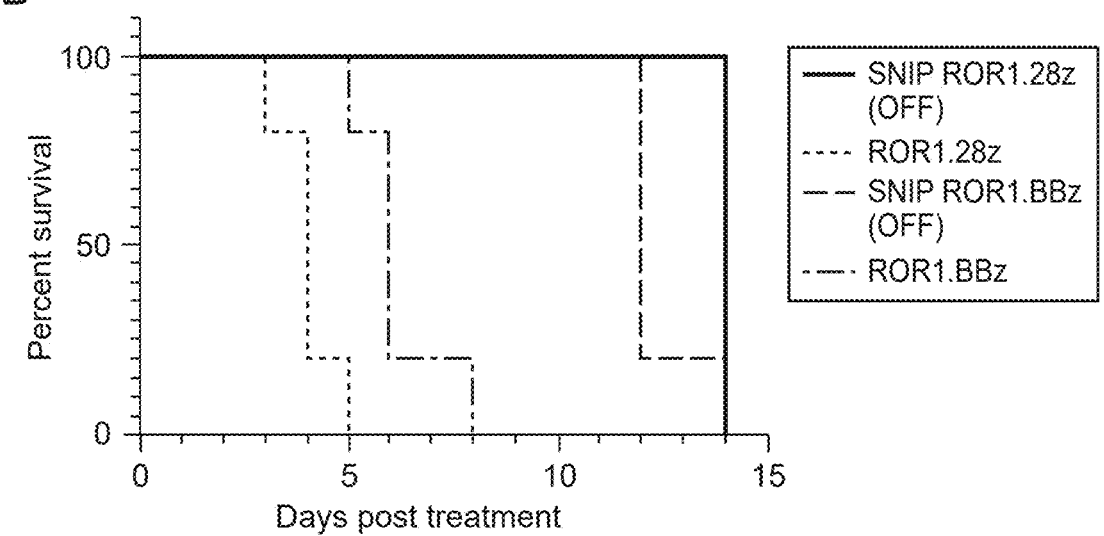

SEQUENCE LISTING

<160> NUMBER OF SEQ ID NOS: 22

<210> SEQ ID NO 1
<211> LENGTH: 186
<212> TYPE: PRT
<213> ORGANISM: Artificial sequence
<220> FEATURE:
<223> OTHER INFORMATION: synthetic sequence

<400> SEQUENCE: 1

Ala Pro Ile Thr Ala Tyr Ala Gln Gln Thr Arg Gly Leu Leu Gly Cys
1               5                   10                  15

Ile Ile Thr Ser Leu Thr Gly Arg Asp Lys Asn Gln Val Glu Gly Glu
            20                  25                  30

Val Gln Ile Val Ser Thr Ala Thr Gln Thr Phe Leu Ala Thr Cys Ile
        35                  40                  45

Asn Gly Val Cys Trp Ala Val Tyr His Gly Ala Gly Thr Arg Thr Ile
    50                  55                  60

Ala Ser Pro Lys Gly Pro Val Ile Gln Met Tyr Thr Asn Val Asp Gln
65                  70                  75                  80

Asp Leu Val Gly Trp Pro Ala Pro Gln Gly Ser Arg Ser Leu Thr Pro
                85                  90                  95

Cys Thr Cys Gly Ser Ser Asp Leu Tyr Leu Val Thr Arg His Ala Asp
            100                 105                 110

Val Ile Pro Val Arg Arg Arg Gly Asp Ser Arg Gly Ser Leu Leu Ser
        115                 120                 125

Pro Arg Pro Ile Ser Tyr Leu Lys Gly Ser Ser Gly Gly Pro Leu Leu
    130                 135                 140

Cys Pro Ala Gly His Ala Val Gly Leu Phe Arg Ala Ala Val Cys Thr
145                 150                 155                 160

Arg Gly Val Ala Lys Ala Val Asp Phe Ile Pro Val Glu Asn Leu Glu
                165                 170                 175

Thr Thr Met Arg Ser Pro Val Phe Thr Asp
            180                 185

<210> SEQ ID NO 2
<211> LENGTH: 186
<212> TYPE: PRT
<213> ORGANISM: Artificial sequence
<220> FEATURE:
<223> OTHER INFORMATION: synthetic sequence

<400> SEQUENCE: 2

Ala Pro Ile Thr Ala Tyr Ala Gln Gln Thr Arg Gly Leu Leu Gly Cys
1               5                   10                  15

Ile Ile Thr Ser Leu Thr Gly Arg Asp Lys Asn Gln Val Glu Gly Glu
            20                  25                  30

Val Gln Ile Met Ser Thr Ala Thr Gln Thr Phe Leu Ala Thr Cys Ile
        35                  40                  45

Asn Gly Val Cys Trp Thr Val Tyr His Gly Ala Gly Thr Arg Thr Ile
    50                  55                  60

Ala Ser Pro Lys Gly Pro Val Ile Gln Met Tyr Thr Asn Val Asp Gln
65                  70                  75                  80

Asp Leu Val Gly Trp Pro Ala Pro Gln Gly Ser Arg Ser Leu Thr Pro
                85                  90                  95

Cys Thr Cys Gly Ser Ser Asp Leu Tyr Leu Val Thr Arg His Ala Asp
            100                 105                 110

```
Val Ile Pro Val Arg Arg Arg Gly Asp Gly Arg Gly Ser Leu Leu Ser
            115                 120                 125

Pro Arg Pro Ile Ser Tyr Leu Lys Gly Ser Ser Gly Pro Leu Leu
        130                 135                 140

Cys Pro Ala Gly His Ala Val Gly Leu Phe Arg Ala Ala Val Cys Thr
145                 150                 155                 160

Arg Gly Val Ala Lys Ala Val Asp Phe Ile Pro Val Glu Asn Leu Glu
                165                 170                 175

Thr Thr Met Arg Ser Pro Val Phe Thr Asp
            180                 185

<210> SEQ ID NO 3
<211> LENGTH: 186
<212> TYPE: PRT
<213> ORGANISM: Artificial sequence
<220> FEATURE:
<223> OTHER INFORMATION: synthetic sequence

<400> SEQUENCE: 3

Ala Pro Ile Thr Ala Tyr Ala Gln Gln Thr Arg Gly Leu Leu Gly Cys
1               5                   10                  15

Ile Ile Thr Ser Leu Thr Gly Arg Asp Lys Asn Gln Val Glu Gly Glu
            20                  25                  30

Val Gln Ile Val Ser Thr Ala Thr Gln Thr Phe Leu Ala Thr Cys Ile
        35                  40                  45

Asn Gly Val Cys Trp Ala Val Tyr His Gly Ala Gly Thr Arg Thr Ile
    50                  55                  60

Ala Ser Pro Lys Gly Pro Val Ile Gln Met Tyr Thr Asn Val Asp Gln
65                  70                  75                  80

Asp Leu Val Gly Trp Pro Ala Pro Gln Gly Ser Arg Ser Leu Thr Pro
                85                  90                  95

Cys Thr Cys Gly Ser Ser Asp Leu Tyr Leu Val Thr Arg His Ala Asp
            100                 105                 110

Val Ile Pro Val Arg Arg Arg Gly Asp Ser Arg Gly Ser Leu Leu Ser
            115                 120                 125

Pro Arg Pro Ile Ser Tyr Leu Lys Gly Ser Ser Gly Gly Pro Leu Leu
        130                 135                 140

Cys Pro Ala Gly His Ala Val Gly Leu Phe Arg Ala Ala Val Cys Thr
145                 150                 155                 160

Arg Gly Val Ala Lys Ala Val Asp Phe Ile Pro Val Glu Asn Leu Glu
                165                 170                 175

Thr Thr Met Arg Ser Pro Val Phe Thr Asp
            180                 185

<210> SEQ ID NO 4
<211> LENGTH: 186
<212> TYPE: PRT
<213> ORGANISM: Artificial sequence
<220> FEATURE:
<223> OTHER INFORMATION: synthetic sequence

<400> SEQUENCE: 4

Ala Pro Ile Thr Ala Tyr Ala Gln Gln Thr Arg Gly Leu Leu Gly Cys
1               5                   10                  15

Ile Ile Thr Ser Leu Thr Gly Arg Asp Lys Asn Gln Val Glu Gly Glu
            20                  25                  30

Val Gln Ile Val Ser Thr Ala Thr Gln Thr Phe Leu Ala Thr Cys Ile
        35                  40                  45
```

```
Asn Gly Val Cys Trp Thr Val Tyr His Gly Ala Gly Thr Arg Thr Ile
 50                  55                  60

Ala Ser Pro Lys Gly Pro Val Ile Gln Met Tyr Thr Asn Val Asp Gln
 65                  70                  75                  80

Asp Leu Val Gly Trp Pro Ala Pro Gln Gly Ser Arg Ser Leu Thr Pro
                 85                  90                  95

Cys Thr Cys Gly Ser Ser Asp Leu Tyr Leu Val Thr Arg His Ala Asp
                100                 105                 110

Val Ile Pro Val Arg Arg Arg Gly Asp Ser Arg Gly Ser Leu Leu Ser
            115                 120                 125

Pro Arg Pro Ile Ser Tyr Leu Lys Gly Ser Ser Gly Gly Pro Leu Leu
            130                 135                 140

Cys Pro Ala Gly His Ala Val Gly Leu Phe Arg Ala Ala Val Cys Thr
145                 150                 155                 160

Arg Gly Val Ala Lys Ala Val Asp Phe Ile Pro Val Glu Asn Leu Glu
                165                 170                 175

Thr Thr Met Arg Ser Pro Val Phe Thr Asp
            180                 185

<210> SEQ ID NO 5
<211> LENGTH: 9
<212> TYPE: PRT
<213> ORGANISM: Artificial sequence
<220> FEATURE:
<223> OTHER INFORMATION: synthetic sequence

<400> SEQUENCE: 5

Asp Glu Met Glu Glu Cys Ser Gln His
1               5

<210> SEQ ID NO 6
<211> LENGTH: 10
<212> TYPE: PRT
<213> ORGANISM: Artificial sequence
<220> FEATURE:
<223> OTHER INFORMATION: synthetic sequence

<400> SEQUENCE: 6

Asp Glu Met Glu Glu Cys Ser Gln His Leu
1               5                   10

<210> SEQ ID NO 7
<211> LENGTH: 9
<212> TYPE: PRT
<213> ORGANISM: Artificial sequence
<220> FEATURE:
<223> OTHER INFORMATION: synthetic sequence

<400> SEQUENCE: 7

Glu Asp Val Val Pro Cys Ser Met Gly
1               5

<210> SEQ ID NO 8
<211> LENGTH: 10
<212> TYPE: PRT
<213> ORGANISM: Artificial sequence
<220> FEATURE:
<223> OTHER INFORMATION: synthetic sequence

<400> SEQUENCE: 8

Glu Asp Val Val Pro Cys Ser Met Gly Ser
1               5                   10
```

<210> SEQ ID NO 9
<211> LENGTH: 11
<212> TYPE: PRT
<213> ORGANISM: Artificial sequence
<220> FEATURE:
<223> OTHER INFORMATION: synthetic sequence

<400> SEQUENCE: 9

Glu Cys Thr Thr Pro Cys Ser Gly Ser Trp Leu
1               5                   10

<210> SEQ ID NO 10
<211> LENGTH: 506
<212> TYPE: PRT
<213> ORGANISM: Artificial sequence
<220> FEATURE:
<223> OTHER INFORMATION: synthetic sequence

<400> SEQUENCE: 10

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Phe
            20                  25                  30

Gly Met His Trp Val Arg Gln Ala Pro Gly Lys Gly Leu Glu Trp Val
        35                  40                  45

Ala Tyr Ile Ser Ser Asp Ser Ser Ala Ile Tyr Tyr Ala Asp Thr Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Asp Glu Asp Thr Ala Val Tyr Tyr Cys
                85                  90                  95

Gly Arg Gly Arg Glu Asn Ile Tyr Tyr Gly Ser Arg Leu Asp Tyr Trp
            100                 105                 110

Gly Gln Gly Thr Thr Val Thr Val Ser Ser Gly Gly Gly Gly Ser Gly
        115                 120                 125

Gly Gly Gly Ser Gly Gly Gly Gly Ser Asp Ile Gln Leu Thr Gln Ser
    130                 135                 140

Pro Ser Phe Leu Ser Ala Ser Val Gly Asp Arg Val Thr Ile Thr Cys
145                 150                 155                 160

Lys Ala Ser Gln Asn Val Asp Thr Asn Val Ala Trp Tyr Gln Gln Lys
                165                 170                 175

Pro Gly Lys Ala Pro Lys Ala Leu Ile Tyr Ser Ala Ser Tyr Arg Tyr
            180                 185                 190

Ser Gly Val Pro Ser Arg Phe Ser Gly Ser Gly Ser Gly Thr Asp Phe
        195                 200                 205

Thr Leu Thr Ile Ser Ser Leu Gln Pro Glu Asp Phe Ala Thr Tyr Tyr
    210                 215                 220

Cys Gln Gln Tyr Asn Asn Tyr Pro Phe Thr Phe Gly Gln Gly Thr Lys
225                 230                 235                 240

Leu Glu Ile Lys Ala Ala Ala Thr Thr Thr Pro Ala Pro Arg Pro Pro
                245                 250                 255

Thr Pro Ala Pro Thr Ile Ala Ser Gln Pro Leu Ser Leu Arg Pro Glu
            260                 265                 270

Ala Cys Arg Pro Ala Ala Gly Gly Ala Val His Thr Arg Gly Leu Asp
        275                 280                 285

Phe Ala Cys Asp Ile Tyr Ile Trp Ala Pro Leu Ala Gly Thr Cys Gly

```
          290                 295                 300
Val Leu Leu Leu Ser Leu Val Ile Thr Leu Tyr Cys Lys Gly Gly Gly
305                 310                 315                 320

Gly Ser Gly Gly Gly Ser Gly Gly Gly Ser Pro Gly Asp Glu
            325                 330                 335

Met Glu Glu Cys Ser Gln His Leu Pro Gly Ala Gly Ser Ser Asn Ala
            340                 345                 350

Ser Arg Gly Arg Lys Lys Leu Leu Tyr Ile Phe Lys Gln Pro Phe Met
        355                 360                 365

Arg Pro Val Gln Thr Thr Gln Glu Glu Asp Gly Cys Ser Cys Arg Phe
    370                 375                 380

Pro Glu Glu Glu Glu Gly Gly Cys Glu Leu Arg Val Lys Phe Ser Arg
385                 390                 395                 400

Ser Ala Asp Ala Pro Ala Tyr Lys Gln Gly Gln Asn Gln Leu Tyr Asn
                405                 410                 415

Glu Leu Asn Leu Gly Arg Arg Glu Glu Tyr Asp Val Leu Asp Lys Arg
            420                 425                 430

Arg Gly Arg Asp Pro Glu Met Gly Gly Lys Pro Arg Arg Lys Asn Pro
        435                 440                 445

Gln Glu Gly Leu Tyr Asn Glu Leu Gln Lys Asp Lys Met Ala Glu Ala
    450                 455                 460

Tyr Ser Glu Ile Gly Met Lys Gly Glu Arg Arg Arg Gly Lys Gly His
465                 470                 475                 480

Asp Gly Leu Tyr Gln Gly Leu Ser Thr Ala Thr Lys Asp Thr Tyr Asp
                485                 490                 495

Ala Leu His Met Gln Ala Leu Pro Pro Arg
                500                 505
```

<210> SEQ ID NO 11
<211> LENGTH: 1518
<212> TYPE: DNA
<213> ORGANISM: Artificial sequence
<220> FEATURE:
<223> OTHER INFORMATION: synthetic sequence

<400> SEQUENCE: 11

```
gaggtgcagc tggtggaatc tggcggcgga ctggtgcagc ctggcggatc tctgagactg      60
agctgtgccg ccagcggctt caccttcagc agcttcggaa tgcactgggt cgcccaggcc     120
cctggcaaag gactggaatg gtggcctac atcagcagcg acagcagcgc catctactac     180
gccgacaccc tgaagggccg cttcaccatc tcccgggaca acgccaagaa cagcctgtac     240
ctgcagatga actccctgcg ggacgaggac accgccgtgt actattgcgg cagaggcaga     300
gagaacatct attacggcag cagactggac tactgggggcc agggcacaac cgtgacagtg     360
tctagcggag gcggaggatc aggcggcgga ggaagtggcg aggggggatc tgatatccag     420
ctgacccaga gccccagctt cctgagcgcc tctgtgggcg acagagtgac catcacatgc     480
aaggccagcc agaacgtgga caccaacgtg gcctggtatc agcagaagcc cggcaaggcc     540
cctaaggccc tgatctacag cgccagctac cggtacagcg gcgtgcccag cagattttct     600
ggcagcggct ccggcaccga cttcaccctg acaatcagca gcctgcagcc cgaggacttc     660
gccacctact actgccagca gtacaacaac taccctttca ccttcggcca ggggaccaag     720
ctggaaatca agcggccgc aaccacgacg ccagcgccgc gaccaccaac accggcgccc     780
accatcgcgt cgcagccct gtccctgcgc ccagaggcgt gccggccagc ggcgggggc      840
```

-continued

```
gcagtgcaca cgagggggct ggacttcgcc tgtgatatct acatctgggc gcccttggcc       900
gggacttgtg gggtccttct cctgtcactg gttatcaccc tttactgcaa aggtggcgga       960
ggatctggcg gcggaggaag cggaggcggc ggatctcctg gcgacgaaat ggaagagtgt      1020
agccagcatc tgcctggcgc cggatctagc aatgcatccc ggggcagaaa gaaactcctg      1080
tatatattca acaaccatt tatgagacca gtacaaacta ctcaagagga gatggctgt       1140
agctgccgat ttccagaaga agaagaagga ggatgtgaac tgagagtgaa gttcagcagg      1200
agcgcagacg cccccgcgta caagcagggc cagaaccagc tctataacga gctcaatcta      1260
ggacgaagag aggagtacga tgttttggac aagagacgtg gccggacccc tgagatgggg      1320
ggaaagccga aaggaagaa ccctcaggaa ggcctgtaca atgaactgca gaaagataag      1380
atggcggagg cctacagtga gattgggatg aaaggcgagc gccggagggg caaggggcac      1440
gatggccttt accagggtct cagtacagcc accaaggaca cctacgacgc ccttcacatg      1500
caggccctgc cacctcgc                                                    1518
```

<210> SEQ ID NO 12
<211> LENGTH: 362
<212> TYPE: PRT
<213> ORGANISM: Artificial sequence
<220> FEATURE:
<223> OTHER INFORMATION: synthetic sequence

<400> SEQUENCE: 12

```
Ala Cys Pro Tyr Ser Asn Pro Ser Leu Cys Ser Gly Gly Gly Gly Ser
 1               5                  10                  15

Glu Leu Pro Thr Gln Gly Thr Phe Ser Asn Val Ser Thr Asn Val Ser
                20                  25                  30

Pro Ala Lys Pro Thr Thr Thr Ala Cys Pro Tyr Ser Asn Pro Ser Leu
            35                  40                  45

Cys Ser Gly Gly Gly Gly Ser Pro Ala Pro Arg Pro Pro Thr Pro Ala
        50                  55                  60

Pro Thr Ile Ala Ser Gln Pro Leu Ser Leu Arg Pro Glu Ala Cys Arg
65                  70                  75                  80

Pro Ala Ala Gly Gly Ala Val His Thr Arg Gly Leu Asp Phe Ala Cys
                85                  90                  95

Asp Ile Tyr Ile Trp Ala Pro Leu Ala Gly Thr Cys Gly Val Leu Leu
            100                 105                 110

Leu Ser Leu Val Ile Thr Leu Tyr Cys Asn His Arg Asn Arg Arg
        115                 120                 125

Val Cys Lys Cys Pro Arg Pro Val Val Gly Ser Ser Gly Asn Ser Ser
    130                 135                 140

Gly Gly Ser Thr Gly Cys Val Val Ile Val Gly Arg Ile Val Leu Ser
145                 150                 155                 160

Gly Ser Gly Thr Ser Ala Pro Ile Thr Ala Tyr Ala Gln Gln Thr Arg
                165                 170                 175

Gly Leu Leu Gly Cys Ile Ile Thr Ser Leu Thr Gly Arg Asp Lys Asn
            180                 185                 190

Gln Val Glu Gly Glu Val Gln Ile Met Ser Thr Ala Thr Gln Thr Phe
        195                 200                 205

Leu Ala Thr Cys Ile Asn Gly Val Cys Trp Ala Val Tyr His Gly Ala
    210                 215                 220

Gly Thr Arg Thr Ile Ala Ser Pro Lys Gly Pro Val Ile Gln Met Tyr
225                 230                 235                 240
```

```
Thr Asn Val Asp Gln Asp Leu Val Gly Trp Pro Ala Pro Gln Gly Ser
                245                 250                 255

Arg Ser Leu Thr Pro Cys Thr Cys Gly Ser Ser Asp Leu Tyr Leu Val
            260                 265                 270

Thr Arg His Ala Asp Val Ile Pro Val Arg Arg Arg Gly Asp Gly Arg
        275                 280                 285

Gly Ser Leu Leu Ser Pro Arg Pro Ile Ser Tyr Leu Lys Gly Ser Ser
    290                 295                 300

Gly Gly Pro Leu Leu Cys Pro Ala Gly His Ala Val Gly Leu Phe Arg
305                 310                 315                 320

Ala Ala Val Cys Thr Arg Gly Val Ala Lys Ala Val Asp Phe Ile Pro
                325                 330                 335

Val Glu Asn Leu Glu Thr Thr Met Arg Ser Pro Val Phe Thr Asp Asn
            340                 345                 350

Ser Ser Pro Pro Ala Val Thr Leu Thr His
        355                 360
```

<210> SEQ ID NO 13
<211> LENGTH: 1086
<212> TYPE: DNA
<213> ORGANISM: Artificial sequence
<220> FEATURE:
<223> OTHER INFORMATION: synthetic sequence

<400> SEQUENCE: 13

```
gcgtgtcctt atagcaaccc ttctctctgc agtggtggag gcgggagcga gttgccgact      60
cagggcactt tttcaaacgt aagcacaaat gtaagccctg ccaagcctac cacgactgct     120
tgtccctaca gcaatccgag tctgtgttca ggaggaggag ggtctccggc ccctcgaccg     180
cctaccccccg caccaacgat tgcctcacag cccctcagtt tgcgaccccga agcatgccga     240
cctgcggcag gaggtgctgt tcatacgcgg ggcttggact ttgcctgtga catttatatt     300
tgggctccac tcgcaggcac atgcggcgtg ctgttgctca gtctcgtcat aacattgtat     360
tgcaatcaca ggaacaggag gcgagtttgc aagtgccccc gaccagttgt cggcagttct     420
gggaattcct ctggaggttc tacaggctgc gtggtcatag tgggcaggat cgtcttgtcc     480
ggatccggca ctagtgcgcc catcacggcg tacgcccagc agacgagagg cctcctaggg     540
tgtataatca ccagcctgac tggccgggac aaaaaccaag tggagggtga ggtccagatc     600
atgtcaactg ctacccaaac cttcctggca acgtgcatca atggggtatg ctgggcagtc     660
taccacgggg ccggaacgag gaccatcgca tcacccaagg gtcctgtcat ccagatgtat     720
accaatgtgg accaagacct tgtgggctgg cccgctcctc aaggttcccg ctcattgaca     780
ccctgtacct gcggctcctc ggacctttac ctggtcacga gcacgccga tgtcattccc     840
gtgcgccggc gaggtgatgg cagggtagc ctgctttcgc cccggcccat ttcctacttg     900
aaaggctcct cgggggggtcc gctgttgtgc cccgcgggac acgccgtggg cctattcagg     960
gccgcggtgt gcacccgtgg agtggctaaa gcggtggact ttatccctgt ggagaaccta    1020
gagacaacca tgagatcccc ggtgttcacg gacaactcct ctccaccagc agtcaccctg    1080
acgcac                                                              1086
```

<210> SEQ ID NO 14
<211> LENGTH: 506
<212> TYPE: PRT
<213> ORGANISM: Artificial sequence
<220> FEATURE:
<223> OTHER INFORMATION: synthetic sequence

<400> SEQUENCE: 14

```
Glu Val Gln Leu Val Glu Ser Gly Gly Leu Val Gln Pro Gly Gly
1               5                   10                  15

Ser Leu Arg Leu Ser Cys Ala Ala Ser Gly Phe Thr Phe Ser Ser
            20                  25                  30

Phe Gly Met His Trp Val Arg Gln Ala Pro Gly Lys Gly Leu Glu Trp Val
                35                  40                  45

Ala Tyr Ile Ser Ser Asp Ser Ala Ile Tyr Tyr Ala Asp Thr Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Asp Glu Asp Thr Ala Val Tyr Tyr Cys
                85                  90                  95

Gly Arg Gly Arg Glu Asn Ile Tyr Tyr Gly Ser Arg Leu Asp Tyr Trp
                100                 105                 110

Gly Gln Gly Thr Thr Val Thr Val Ser Ser Gly Gly Gly Ser Gly
                115                 120                 125

Gly Gly Gly Ser Gly Gly Gly Ser Asp Ile Gln Leu Thr Gln Ser
130                 135                 140

Pro Ser Phe Leu Ser Ala Ser Val Gly Asp Arg Val Thr Ile Thr Cys
145                 150                 155                 160

Lys Ala Ser Gln Asn Val Asp Thr Asn Val Ala Trp Tyr Gln Gln Lys
                165                 170                 175

Pro Gly Lys Ala Pro Lys Ala Leu Ile Tyr Ser Ala Ser Tyr Arg Tyr
                180                 185                 190

Ser Gly Val Pro Ser Arg Phe Ser Gly Ser Gly Ser Gly Thr Asp Phe
                195                 200                 205

Thr Leu Thr Ile Ser Ser Leu Gln Pro Glu Asp Phe Ala Thr Tyr Tyr
210                 215                 220

Cys Gln Gln Tyr Asn Asn Tyr Pro Phe Thr Phe Gly Gln Gly Thr Lys
225                 230                 235                 240

Leu Glu Ile Lys Ala Ala Ala Thr Thr Thr Pro Ala Pro Arg Pro Pro
                245                 250                 255

Thr Pro Ala Pro Thr Ile Ala Ser Gln Pro Leu Ser Leu Arg Pro Glu
                260                 265                 270

Ala Cys Arg Pro Ala Ala Gly Gly Ala Val His Thr Arg Gly Leu Asp
                275                 280                 285

Phe Ala Cys Asp Ile Tyr Ile Trp Ala Pro Leu Ala Gly Thr Cys Gly
                290                 295                 300

Val Leu Leu Leu Ser Leu Val Ile Thr Leu Tyr Cys Lys Arg Gly Arg
305                 310                 315                 320

Lys Lys Leu Leu Tyr Ile Phe Lys Gln Pro Phe Met Arg Pro Val Gln
                325                 330                 335

Thr Thr Gln Glu Glu Asp Gly Cys Ser Cys Arg Phe Pro Glu Glu Glu
                340                 345                 350

Glu Gly Gly Cys Glu Gly Gly Gly Ser Gly Gly Gly Ser Gly
                355                 360                 365

Gly Gly Gly Ser Pro Gly Asp Glu Met Glu Glu Cys Ser Gln His Leu
                370                 375                 380

Pro Gly Ala Gly Ser Ser Asn Ala Ser Leu Arg Val Lys Phe Ser Arg
385                 390                 395                 400

Ser Ala Asp Ala Pro Ala Tyr Lys Gln Gly Gln Asn Gln Leu Tyr Asn
```

```
              405                 410                 415
Glu Leu Asn Leu Gly Arg Arg Glu Glu Tyr Asp Val Leu Asp Lys Arg
            420                 425                 430

Arg Gly Arg Asp Pro Glu Met Gly Gly Lys Pro Arg Arg Lys Asn Pro
        435                 440                 445

Gln Glu Gly Leu Tyr Asn Glu Leu Gln Lys Asp Lys Met Ala Glu Ala
    450                 455                 460

Tyr Ser Glu Ile Gly Met Lys Gly Glu Arg Arg Gly Lys Gly His
465                 470                 475                 480

Asp Gly Leu Tyr Gln Gly Leu Ser Thr Ala Thr Lys Asp Thr Tyr Asp
            485                 490                 495

Ala Leu His Met Gln Ala Leu Pro Pro Arg
        500                 505

<210> SEQ ID NO 15
<211> LENGTH: 1518
<212> TYPE: DNA
<213> ORGANISM: Artificial sequence
<220> FEATURE:
<223> OTHER INFORMATION: synthetic sequence

<400> SEQUENCE: 15
gaggtgcagc tggtggaatc tggcggcgga ctggtgcagc ctggcggatc tctgagactg      60
agctgtgccg ccagcggctt caccttcagc agcttcggaa tgcactgggt gcgccaggcc     120
cctggcaaag gactggaatg ggtggcctac atcagcagcg acagcagcgc catctactac     180
gccgacaccg tgaagggccg gttcaccatc tcccgggaca cgccaagaa cagcctgtac     240 ctgcagatga actccctgcg ggacgaggac accgccgtgt actattgcgg cagaggcaga     300
gagaacatct attacggcag cagactggac tactggggcc agggcacaac cgtgacagtg     360
tctagcggag gcggaggatc aggcggcgga ggaagtggcg aggggggatc tgatatccag     420
ctgacccaga gccccagctt cctgagcgcc tctgtgggcg acagagtgac catcacatgc     480
aaggccagcc agaacgtgga caccaacgtg gcctggtatc agcagaagcc cggcaaggcc     540
cctaaggccc tgatctacag cgccagctac cggtacagcg gcgtgcccag cagatttttct     600 ggcagcggct ccggcaccga cttcaccctg acaatcagca gcctgcagcc cgaggacttc     660
gccacctact actgccagca gtacaacaac tacccctttca ccttcggcca ggggaccaag     720
ctggaaatca agcggccgcg aaccacgacg ccagcgccgc gaccaccaac accggcgccc     780
accatcgcgt cgcagcccct gtccctgcgc ccagaggcgt gccggccagc ggcgggggc     840 gcagtgcaca cgagggggct ggacttcgcc tgtgatatct acatctgggc gcccttggcc     900
gggacttgtg gggtccttct cctgtcactg gttatcaccc tttactgcaa acggggcaga     960
aagaaactcc tgtatatatt caaacaacca tttatgagac cagtacaaac tactcaagag    1020
gaagatggct gtagctgccg atttccagaa gaagaagaag gaggatgtga aggtggcgga    1080
ggatctggcg gcgaggaag cggaggcggc ggatctcctg cgacgaaat ggaagagtgt    1140 agccagcatc tgcctggcgc cggatctagc aatgcatccc tgagagtgaa gttcagcagg    1200
agcgcagacg cccccgcgta caagcagggc cagaaccagc tctataacga gctcaatcta    1260
ggacgaagag aggagtacga tgttttggac aagagacgtg gccgggaccc tgagatgggg    1320
ggaaagccga aaggaagaa ccctcaggaa ggcctgtaca tgaactgca gaaagataag    1380 atggcggagg cctacagtga gattgggatg aaaggcagc gccggagggg caaggggcac    1440
gatggccttt accagggtct cagtacagcc accaaggaca cctacgacgc ccttcacatg    1500
```
caggccctgc cacctcgc                                                    1518

<210> SEQ ID NO 16
<211> LENGTH: 736
<212> TYPE: PRT
<213> ORGANISM: Artificial sequence
<220> FEATURE:
<223> OTHER INFORMATION: synthetic sequence

<400> SEQUENCE: 16

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Phe
            20                  25                  30

Gly Met His Trp Val Arg Gln Ala Pro Gly Lys Gly Leu Glu Trp Val
        35                  40                  45

Ala Tyr Ile Ser Ser Asp Ser Ser Ala Ile Tyr Tyr Ala Asp Thr Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Asp Glu Asp Thr Ala Val Tyr Tyr Cys
                85                  90                  95

Gly Arg Gly Arg Glu Asn Ile Tyr Tyr Gly Ser Arg Leu Asp Tyr Trp
            100                 105                 110

Gly Gln Gly Thr Thr Val Thr Val Ser Ser Gly Gly Gly Gly Ser Gly
        115                 120                 125

Gly Gly Gly Ser Gly Gly Gly Gly Ser Asp Ile Gln Leu Thr Gln Ser
    130                 135                 140

Pro Ser Phe Leu Ser Ala Ser Val Gly Asp Arg Val Thr Ile Thr Cys
145                 150                 155                 160

Lys Ala Ser Gln Asn Val Asp Thr Asn Val Ala Trp Tyr Gln Gln Lys
                165                 170                 175

Pro Gly Lys Ala Pro Lys Ala Leu Ile Tyr Ser Ala Ser Tyr Arg Tyr
            180                 185                 190

Ser Gly Val Pro Ser Arg Phe Ser Gly Ser Gly Ser Gly Thr Asp Phe
        195                 200                 205

Thr Leu Thr Ile Ser Ser Leu Gln Pro Glu Asp Phe Ala Thr Tyr Tyr
    210                 215                 220

Cys Gln Gln Tyr Asn Asn Tyr Pro Phe Thr Phe Gly Gln Gly Thr Lys
225                 230                 235                 240

Leu Glu Ile Lys Ala Ala Ala Gly Gly Ser Gly Gly Ser Gly Arg Ala
                245                 250                 255

Tyr Pro Tyr Asp Val Pro Asp Tyr Ala Gly Gly Ser Gly Gly Ser Asp
            260                 265                 270

Glu Met Glu Glu Cys Ser Gln His Gly Gly Ser Gly Gly Ser Thr Gly
        275                 280                 285

Cys Val Val Ile Val Gly Arg Ile Val Leu Ser Gly Ser Gly Thr Ser
    290                 295                 300

Ala Pro Ile Thr Ala Tyr Ala Gln Gln Thr Arg Gly Leu Leu Gly Cys
305                 310                 315                 320

Ile Ile Thr Ser Leu Thr Gly Arg Asp Lys Asn Gln Val Glu Gly Glu
                325                 330                 335

Val Gln Ile Met Ser Thr Ala Thr Gln Thr Phe Leu Ala Thr Cys Ile
            340                 345                 350

-continued

Asn Gly Val Cys Trp Ala Val Tyr His Gly Ala Gly Thr Arg Thr Ile
            355                 360                 365
Ala Ser Pro Lys Gly Pro Val Ile Gln Met Tyr Thr Asn Val Asp Gln
        370                 375                 380
Asp Leu Val Gly Trp Pro Ala Pro Gln Gly Ser Arg Ser Leu Thr Pro
385                 390                 395                 400
Cys Thr Cys Gly Ser Ser Asp Leu Tyr Leu Val Thr Arg His Ala Asp
                405                 410                 415
Val Ile Pro Val Arg Arg Arg Gly Asp Gly Arg Gly Ser Leu Leu Ser
            420                 425                 430
Pro Arg Pro Ile Ser Tyr Leu Lys Gly Ser Ser Gly Gly Pro Leu Leu
        435                 440                 445
Cys Pro Ala Gly His Ala Val Gly Leu Phe Arg Ala Ala Val Cys Thr
    450                 455                 460
Arg Gly Val Ala Lys Ala Val Asp Phe Ile Pro Val Glu Asn Leu Glu
465                 470                 475                 480
Thr Thr Met Arg Ser Pro Val Phe Thr Asp Asn Ser Ser Pro Pro Ala
                485                 490                 495
Val Thr Leu Thr His Gly Gly Ser Gly Gly Ser Gly Cys Ile Gly Ala
            500                 505                 510
Ala Thr Thr Thr Pro Ala Pro Arg Pro Pro Thr Pro Ala Pro Thr Ile
        515                 520                 525
Ala Ser Gln Pro Leu Ser Leu Arg Pro Glu Ala Cys Arg Pro Ala Ala
    530                 535                 540
Gly Gly Ala Val His Thr Arg Gly Leu Asp Phe Ala Cys Asp Ile Tyr
545                 550                 555                 560
Ile Trp Ala Pro Leu Ala Gly Thr Cys Gly Val Leu Leu Ser Leu
                565                 570                 575
Val Ile Thr Leu Tyr Cys Lys Arg Gly Arg Lys Leu Leu Tyr Ile
            580                 585                 590
Phe Lys Gln Pro Phe Met Arg Pro Val Gln Thr Thr Gln Glu Glu Asp
        595                 600                 605
Gly Cys Ser Cys Arg Phe Pro Glu Glu Glu Gly Gly Cys Glu Leu
    610                 615                 620
Arg Val Lys Phe Ser Arg Ser Ala Asp Ala Pro Ala Tyr Lys Gln Gly
625                 630                 635                 640
Gln Asn Gln Leu Tyr Asn Glu Leu Asn Leu Gly Arg Arg Glu Glu Tyr
                645                 650                 655
Asp Val Leu Asp Lys Arg Arg Gly Arg Asp Pro Glu Met Gly Gly Lys
            660                 665                 670
Pro Arg Arg Lys Asn Pro Gln Glu Gly Leu Tyr Asn Glu Leu Gln Lys
        675                 680                 685
Asp Lys Met Ala Glu Ala Tyr Ser Glu Ile Gly Met Lys Gly Glu Arg
    690                 695                 700
Arg Arg Gly Lys Gly His Asp Gly Leu Tyr Gln Gly Leu Ser Thr Ala
705                 710                 715                 720
Thr Lys Asp Thr Tyr Asp Ala Leu His Met Gln Ala Leu Pro Pro Arg
                725                 730                 735

<210> SEQ ID NO 17
<211> LENGTH: 2286
<212> TYPE: DNA
<213> ORGANISM: Artificial sequence
<220> FEATURE:
<223> OTHER INFORMATION: synthetic sequence

<400> SEQUENCE: 17

```
atggttgcca ccctgctcgt gacaagcctg ctgctgtgcg agctgcccca ccctgccttt      60
ctgctgatcc ccgataccga ggtgcagctg gtggaatctg gcggcggact ggtgcagcct     120
ggcggatctc tgagactgag ctgtgccgcc agcggcttca ccttcagcag cttcggaatg     180
cactgggtgc gccaggcccc tggcaaagga ctggaatggg tggcctacat cagcagcgac     240
agcagcgcca tctactacgc cgacaccgtg aagggccggt tcaccatctc ccgggacaac     300
gccaagaaca gcctgtacct gcagatgaac tccctgcggg acgaggacac cgccgtgtac     360
tattgcggca gaggcagaga gaacatctat acggcagca gactggacta ctggggccag      420
ggcacaaccg tgacagtgtc tagcggaggc ggaggatcag gcggcggagg aagtggcgga     480
gggggatctg atatccagct gacccagagc cccagcttcc tgagcgcctc tgtgggcgac     540
agagtgacca tcacatgcaa ggccagccag aacgtggaca ccaacgtggc ctggtatcag     600
cagaagcccg gcaaggcccc taaggccctg atctacagcg ccagctaccg gtacagcggc     660
gtgcccagca gatttctgg cagcggctcc ggcaccgact tcaccctgac aatcagcagc      720
ctgcagcccg aggacttcgc cacctactac tgccagcagt acaacaacta ccctttcacc     780
ttcggccagg ggaccaagct ggaaatcaaa gcggccgcag ggggcagtgg cgggagcggg     840
cgcgcctatc cctacgatgt gcccgattac gctggtggat ccggcgggtc agatgagatg     900
gaagagtgct ctcagcacgg cggatctgga ggttctacag gctgcgtggt catagtgggc     960
aggatcgtct tgtccggatc cggcactagt gcgcccatca cggcgtacgc ccagcagacg    1020
agaggcctcc tagggtgtat aatcaccagc ctgactggcc gggacaaaaa ccaagtggag    1080
ggtgaggtcc agatcatgtc aactgctacc caaaccttcc tggcaacgtg catcaatggg    1140
gtatgctggg cagtctacca cggggccgga acgaggacca tcgcatcacc caagggtcct    1200
gtcatccaga tgtataccaa tgtgaccaa gaccttgtgg gctggcccgc tcctcaaggt     1260
tccccgctcat tgacaccctg tacctgcggc tcctcggacc tttacctggt cacgaggcac    1320
gccgatgtca ttcccgtgcg ccggcgaggt gatggcaggg gtagcctgct ttcgccccgg    1380
cccatttcct acttgaaagg ctcctcgggg ggtccgctgt tgtgccccgc gggacacgcc    1440
gtgggcctat tcagggccgc ggtgtgcacc cgtggagtgg ctaaagcggt ggactttatc    1500
cctgtggaga acctagagac aaccatgaga tccccgtgt tcacggacaa ctcctctcca     1560
ccagcagtca ccctgacgca cggggggttca ggcggtagtg gatgcattgg ggccgcaacc    1620
acgacgccca cgccgcgacc accaacaccg gcgcccacca tcgcgtcgca gcccctgtcc    1680
ctgcgcccag aggcgtgccg gccagcggcg ggggcgcag tgcacacgag ggggctggac     1740
ttcgcctgtg atatctacat ctgggcgccc ttggccggga cttgtgggt ccttctcctg     1800
tcactggtta tcaccctta ctgcaaacgg ggcagaaaga aactcctgta tatattcaaa    1860
caaccattta tgagaccagt acaaactact caagaggaag atggctgtag ctgccgattt    1920
ccagaagaag aagaaggagg atgtgaactg agagtgaagt tcagcaggag cgcagacgcc    1980
cccgcgtaca gcagggcca gaaccagctc tataacgagc tcaatctagg acgaagagag    2040
gagtacgatg ttttgacaa gagacgtggc cgggaccctg agatggggg aaagccgaga     2100
aggaagaacc ctcaggaagg cctgtacaat gaactgcaga agataagat ggcggaggcc     2160
tacagtgaga ttgggatgaa aggcgagcgc cggaggggca aggggcacga tggcctttac    2220
cagggtctca gtacagccac caaggacacc tacgacgccc ttcacatgca ggccctgcca    2280
``` cctcgc 2286

<210> SEQ ID NO 18
<211> LENGTH: 30
<212> TYPE: PRT
<213> ORGANISM: Artificial sequence
<220> FEATURE:
<223> OTHER INFORMATION: synthetic sequence

<400> SEQUENCE: 18

Gly Gly Gly Gly Ser Gly Gly Gly Ser Gly Gly Gly Ser Gly
1               5                   10                  15

Gly Gly Ser Gly Gly Gly Ser Gly Gly Gly Ser
            20                  25                  30

<210> SEQ ID NO 19
<211> LENGTH: 45
<212> TYPE: PRT
<213> ORGANISM: Artificial sequence
<220> FEATURE:
<223> OTHER INFORMATION: synthetic sequence

<400> SEQUENCE: 19

Thr Thr Thr Pro Ala Pro Arg Pro Pro Thr Pro Ala Pro Thr Ile Ala
1               5                   10                  15

Ser Gln Pro Leu Ser Leu Arg Pro Glu Ala Cys Arg Pro Ala Ala Gly
            20                  25                  30

Gly Ala Val His Thr Arg Gly Leu Asp Phe Ala Cys Asp
        35                  40                  45

<210> SEQ ID NO 20
<211> LENGTH: 24
<212> TYPE: PRT
<213> ORGANISM: Artificial sequence
<220> FEATURE:
<223> OTHER INFORMATION: synthetic sequence

<400> SEQUENCE: 20

Ile Tyr Ile Trp Ala Pro Leu Ala Gly Thr Cys Gly Val Leu Leu Leu
1               5                   10                  15

Ser Leu Val Ile Thr Leu Tyr Cys
            20

<210> SEQ ID NO 21
<211> LENGTH: 39
<212> TYPE: PRT
<213> ORGANISM: Artificial sequence
<220> FEATURE:
<223> OTHER INFORMATION: synthetic sequence

<400> SEQUENCE: 21

Ile Glu Val Met Tyr Pro Pro Pro Tyr Leu Asp Asn Glu Lys Ser Asn
1               5                   10                  15

Gly Thr Ile Ile His Val Lys Gly Lys His Leu Cys Pro Ser Pro Leu
            20                  25                  30

Phe Pro Gly Pro Ser Lys Pro
        35

<210> SEQ ID NO 22
<211> LENGTH: 27
<212> TYPE: PRT
<213> ORGANISM: Artificial sequence
<220> FEATURE:
<223> OTHER INFORMATION: synthetic sequence

```
<400> SEQUENCE: 22

Phe Trp Val Leu Val Val Val Gly Gly Val Leu Ala Cys Tyr Ser Leu
1               5                   10                  15

Leu Val Thr Val Ala Phe Ile Ile Phe Trp Val
                20              25
```

REGULATABLE CELL SURFACE RECEPTORS AND RELATED COMPOSITIONS AND METHODS

CROSS-REFERENCE TO RELATED APPLICATIONS

This application claims the benefit of U.S. Provisional Patent Application No. 62/776,250, filed Dec. 6, 2018, which application is incorporated herein by reference in its entirety.

INCORPORATION BY REFERENCE OF SEQUENCE LISTING PROVIDED AS A TEXT FILE

A Sequence Listing is provided herewith in a text file, STAN-1499WO_Seq_Listing_ST25, created on Dec. 5, 2019 and having a size of 37,616 bytes. The contents of the text file are incorporated herein by reference in its entirety.

INTRODUCTION

Engineering cells such as T cells, stem cells or other cell types provides the potential to cure numerous diseases. Engineering T cells to express chimeric antigen receptors (CARs) has already demonstrated impressive clinical efficacy and additional immune cell therapy applications using more complex CARs further comprising additional features hold great promise. There are, however, substantial risks associated with unregulated receptor signaling.

Such cell-based immunotherapies have proven effective in treating certain cancers. For example, CAR T cells have yielded impressive response rates against certain hematologic malignancies, and there is interest in extending this therapeutic approach to solid tumors. However, cell-based therapies in which the engineered receptor targets solid tumor antigens present a substantial risk of on-target off-tumor effects and other adverse events. The ability to regulate signaling of the engineered receptor would provide control over receptor activity and thus a means to intervene in the case of adverse events. In addition, regulatable receptor signaling would permit fine-tuning and optimization of the response profile of the transferred cells, reduce susceptibility to exhaustion (e.g., T cell exhaustion in the case of CAR-T cells), and improve potency. Existing regulatable systems suffer from limited dynamic range and basal ("leaky") activity in the "off" state.

SUMMARY

Provided are cell surface receptors that include an extracellular binding domain, a transmembrane domain, an intracellular signaling domain, and a protease cleavage site disposed between the extracellular binding domain and the intracellular signaling domain. In some embodiments, the cell surface receptors are engineered cell surface receptors, such as chimeric antigen receptors (CARs). Also provided are cells that include such receptors (e.g., where the cells express the receptors on their surface) and pharmaceutical compositions including such cells. Nucleic acids that encode the cell surface receptors, cells including such nucleic acids, and pharmaceutical compositions including such cells, are also provided. Also provided are methods for regulating signaling of a cell surface receptor, and methods of using the cells of the present disclosure, including methods of using such cells to administer a regulatable cell-based therapy to an individual.

BRIEF DESCRIPTION OF THE FIGURES

FIG. 12: Panel A: A graph showing quantification of interferon gamma (IFNγ) levels in co-culture supernatant of B7H3-expressing Nalm6 or 143B tumor cells co-cultured with CAR T cells as described for FIG. 6. Panel B: A graph showing quantification of interleukin-2 (IL-2) levels in co-culture supernatant of B7H3-expressing Nalm6 or 143B tumor cells co-cultured with CAR T cells as described for FIG. 6.

FIG. 16: Panel A: A graph showing quantification of interferon gamma (IFNγ) levels in co-culture supernatant of B7H3-expressing Nalm6 or 143B tumor cells co-cultured with CAR T cells as described for FIG. 14. Panel B: A graph showing quantification of interleukin-2 (IL-2) levels in co-culture supernatant of B7H3-expressing Nalm6 or 143B tumor cells co-cultured with CAR T cells as described for FIG. 14.

FIG. 18: Panel A: A plot showing the time course of full-length CAR expression for constructs (as described for FIG. 17) integrated with various cleavage sites following administration of an inhibitor of the protease. Panel B: A plot showing the dose response to an inhibitor of the protease for the constructs shown in panel A. Panel C: A table showing the amino acid sequences and biochemical parameters of the various cleavage sites used. Cleavage site 064 (DEMEECSQH) (SEQ ID NO:5); cleavage site 065 (EDVVPCSMGS) (SEQ ID NO: 8); cleavage site 066 (ECTTPCSGSWL) (SEQ ID NO:9).

FIG. 37: Data demonstrating that plasma levels of proinflammatory cytokines can be controlled and tuned by dosing of drug. Panel A: Schematic of the experimental setup of a mouse model of cytokine release syndrome. Panel B: A series of graphs showing plasma cytokine levels of the proinflammatory cytokines IL-2 and IFNγ in mice treated with the indicated amount of drug.

FIG. 38: Data demonstrating that ROR1 SNIP CAR-T cells extend survival in an on-target off-tumor toxicity model. Panel A: A graph showing percent weight change in a ROR1 on-target, off-tumor toxicity model. Panel B: A graph showing the survival of mice described in Panel A.

DETAILED DESCRIPTION

Figure 1:
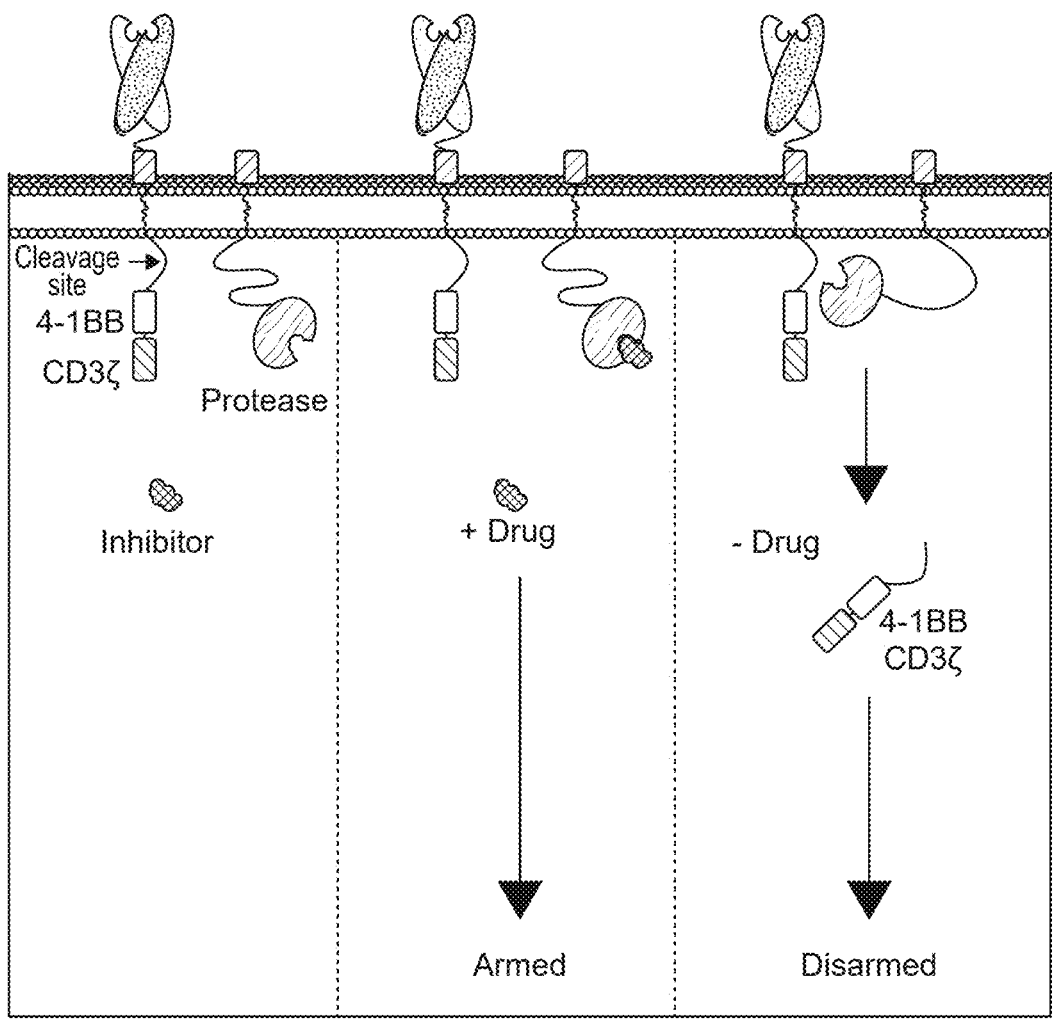
FIG. 1: A schematic illustration of an engineered cell surface receptor expressed on the surface of a cell according to one embodiment. In this example, the engineered cell surface receptor is a chimeric antigen receptor (CAR) in which the protease cleavage site is disposed between the transmembrane domain and a first intracellular signaling domain. Also in this example, a protease capable of cleaving the protease cleavage site is tethered intracellularly to the cell membrane. As schematically illustrated, in the presence of an inhibitor of the protease (designated as "drug" in FIG. 1), the protease is prevented from cleaving the protease cleavage site, leaving the CAR intact and capable of transducing antigen-binding related signals to the cell (designated "armed" in FIG. 1). In the absence of an inhibitor of the protease, the protease cleaves the protease cleavage site, thereby removing the intracellular signaling domains from the remaining domains of the CAR, rendering the CAR incapable of transducing antigen-binding related signals to the cell (designated "disarmed" in FIG. 1).

Provided are cell surface receptors that include an extracellular binding domain, a transmembrane domain, an intracellular signaling domain, and a protease cleavage site disposed between the extracellular binding domain and the intracellular signaling domain. In some embodiments, the cell surface receptors are engineered cell surface receptors, such as chimeric antigen receptors (CARs). Also provided are cells that include such receptors (e.g., where the cells express the receptors on their surface) and pharmaceutical compositions including such cells. Nucleic acids that encode the cell surface receptors, cells including such nucleic acids, and pharmaceutical compositions including such cells, are also provided. Also provided are methods for regulating signaling of a cell surface receptor, and methods of using the cells of the present disclosure, including methods of using such cells to administer a regulatable cell-based therapy to an individual.

Before the cell surface receptors, nucleic acids, cells, compositions and methods of the present disclosure are described in greater detail, it is to be understood that the cell surface receptors, nucleic acids, cells, compositions and methods are not limited to particular embodiments described, as such may, of course, vary. It is also to be understood that the terminology used herein is for the purpose of describing particular embodiments only, and is not intended to be limiting, since the scope of the cell surface receptors, nucleic acids, cells, compositions and methods will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the cell surface receptors, nucleic acids, cells, compositions and methods. The upper and lower limits of these smaller ranges may independently be included in the smaller ranges, subject to any specifically excluded limit in the stated range. Where the stated range includes one or both of the limits, ranges excluding either or both of those included limits are also included in the cell surface receptors, nucleic acids, cells, compositions and methods.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which the cell surface receptors, nucleic acids, cells, compositions and methods belong. Although any cell surface receptors, nucleic acids, cells, compositions and methods similar or equivalent to those described herein can also be used in the practice or testing of the cell surface receptors, nucleic acids, cells, compositions and methods, representative illustrative cell surface receptors, nucleic acids, cells, compositions and methods are now described.

All publications and patents cited in this specification are herein incorporated by reference as if each individual publication or patent were specifically and individually indicated to be incorporated by reference and are incorporated herein by reference to disclose and describe the materials and/or methods in connection with which the publications are cited. The citation of any publication is for its disclosure prior to the filing date and should not be construed as an admission that the present cell surface receptors, nucleic acids, cells, compositions and methods are not entitled to antedate such publication, as the date of publication provided may be different from the actual publication date which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. It is appreciated that certain features of the cell surface receptors, nucleic acids, cells, compositions and methods, which are, for clarity, described in the context of separate embodiments, may also be provided in combination in a single embodiment. Conversely, various features of the cell surface receptors, nucleic acids, cells, compositions and methods, which are, for brevity, described in the context of a single embodiment, may also be provided separately or in any suitable sub-combination. All combinations of the embodiments are specifically embraced by the present disclosure and are disclosed herein just as if each and every combination was individually and explicitly disclosed, to the extent that such combinations embrace operable processes and/or compositions. In addition, all sub-combinations listed in the embodiments describing such variables are also specifically embraced by the present cell surface receptors, nucleic acids, cells, compositions and methods and are disclosed herein just as if each and every such sub-combination was individually and explicitly disclosed herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present methods. Any recited method can be carried out in the order of events recited or in any other order that is logically possible.

Cell Surface Receptors, Proteases and Nucleic Acids

As summarized above, aspects of the present disclosure include cell surface receptors. Signaling through the cell surface receptors is regulatable using a system sometimes referred to herein as signal neutralization by an inhibitable protease (or "SNIP") and involves a protease cleavage site disposed between the extracellular binding domain and the intracellular signaling domain of a cell surface receptor. Also present in the SNIP system is a protease, where the protease cleavage site is a cleavage site for the protease. The protease may be expressed in the cell as a molecule separate from the receptor (sometimes referred to herein as a "trans" configuration) or the cell surface receptor molecule itself may further include the protease (sometimes referred to herein as a "cis" configuration). The activity of the protease is regulatable depending upon the presence or absence of an inhibitor of the protease. In the presence of a protease inhibitor, the protease is prevented from cleaving the protease cleavage site, leaving the cell surface receptor intact and capable of transducing ligand (e.g., antigen) binding-related signals into the cell. In some embodiments, the ligand comprises an antigen or an antigen-MHC complex. In the absence of a protease inhibitor, the protease cleaves the protease cleavage site, thereby separating one or more domains of the cell surface receptor from the remaining domains of the cell surface receptor, rendering the cell surface receptor incapable of transducing ligand (e.g., antigen) binding-related signals into the cell, or rendering the cell surface receptor incapable of binding to ligand (e.g., antigen) at all, depending upon the location of the protease cleavage site in relation to the various domains of the cell surface receptor. A variety of SNIP system configurations are possible—e.g., with the protease supplied in the cis configuration or in the trans configuration, with the protease and protease cleavage site located intracellularly or extracellularly, etc. Five example SNIP systems/configurations are schematically illustrated in FIGS. 1 to 5 and described elsewhere herein.

The cell surface receptors of the present disclosure are recombinant and include an extracellular binding domain, a transmembrane domain, an intracellular signaling domain, and a protease cleavage site (e.g., a cleavable linker including a protease cleavage site) disposed between the extracellular binding domain and the intracellular signaling domain. In some embodiments, the cell surface receptors include a single polypeptide chain. A non-limiting example of a cell surface receptor that may include a single polypeptide chain is a chimeric antigen receptor (CAR).

Figure 25:
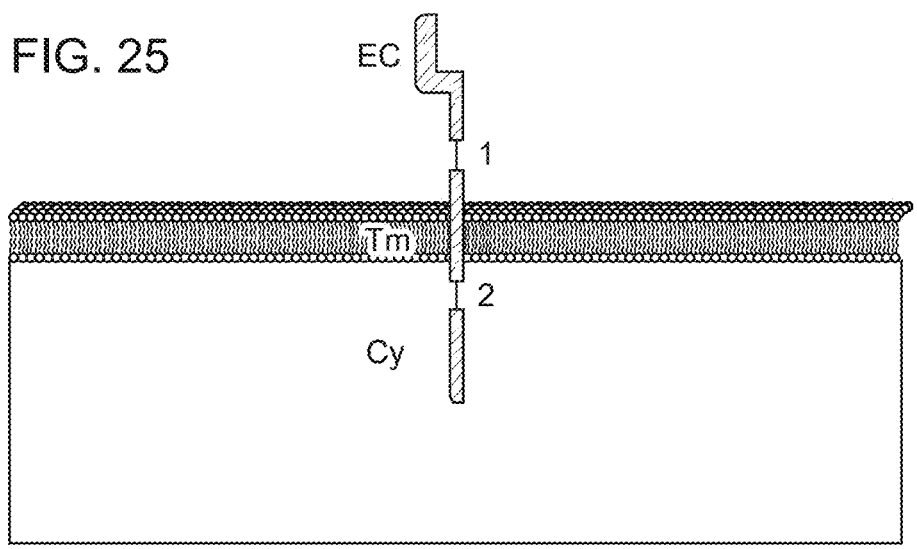
FIG. 25: A schematic illustration of a cell surface receptor and example locations therein where one or more protease cleavage sites may be disposed.
Figure 26A:
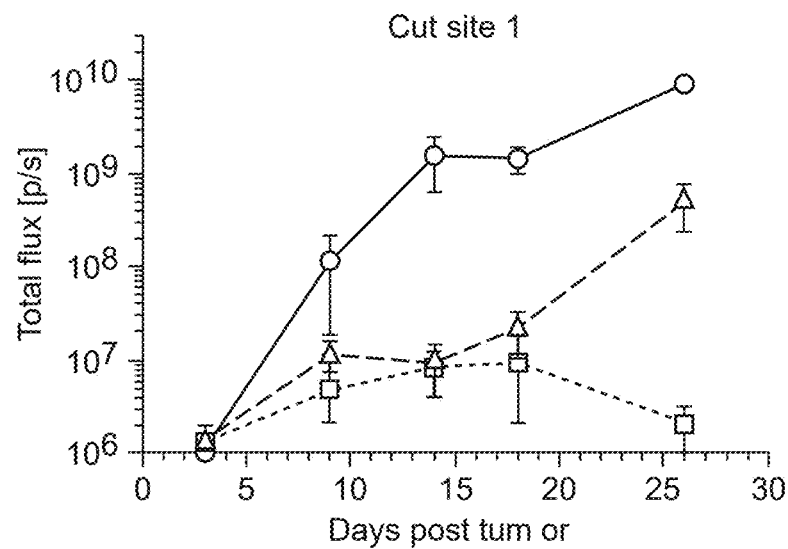
FIGS. 26A-26D: Plots quantifying tumor outgrowth in a flank mouse model of medulloblastoma treated using various iterations of the SNIP system. The protease cleavage sites ("cut sites") employed in this example were: cut site 1=4a4b (DEMEECSQH) (SEQ ID NO: 5); cut site 2=5a5b (EDVVPCSMGS) (SEQ ID NO:8); and cut site 3=4b5a (ECTTPCSGSWL) (SEQ ID NO:9).
Figure 26B:
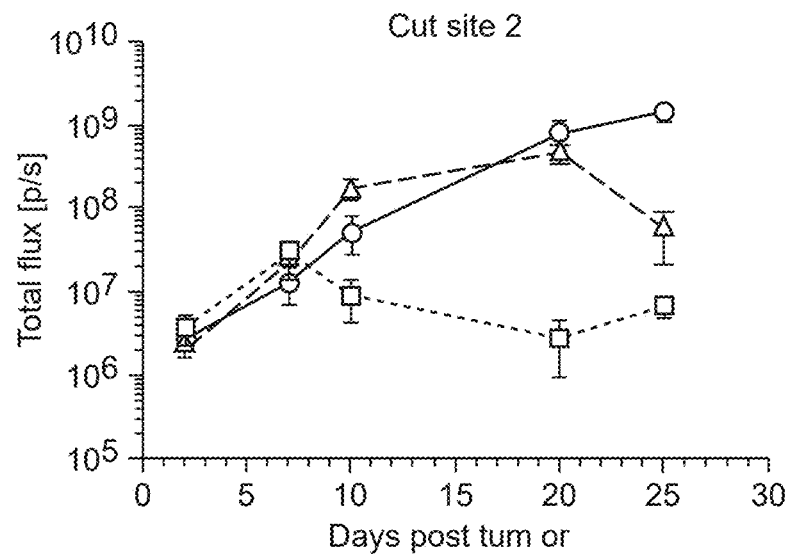
Figure 26C:
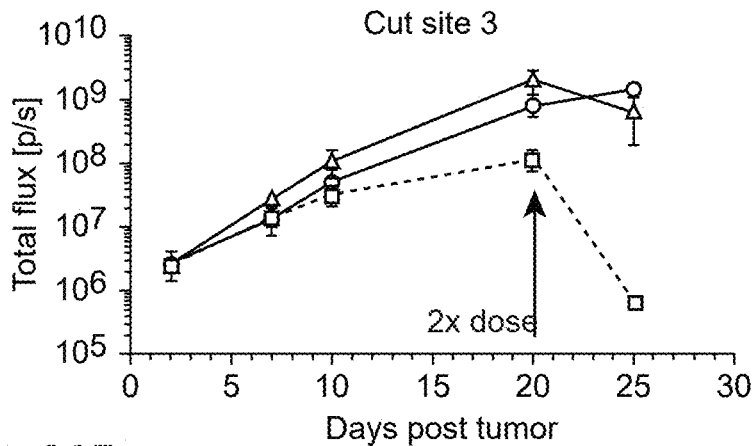
Figure 26D:
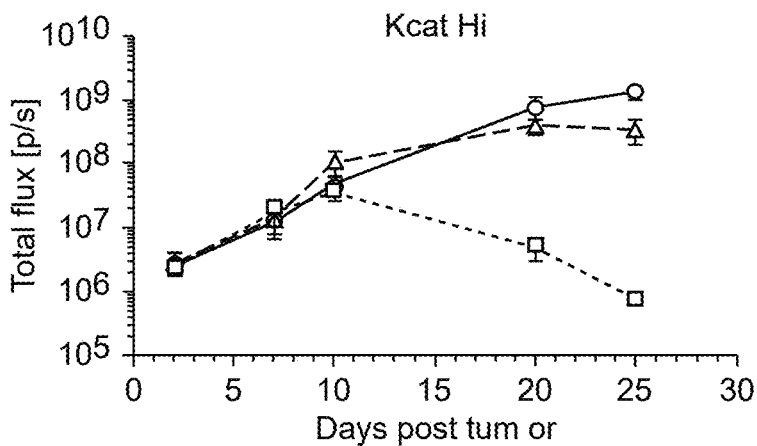

A schematic illustration of a cell surface receptor that includes a single polypeptide chain is schematically illustrated in FIG. 25. The receptor includes an extracellular binding domain (EC), a transmembrane domain (Tm), and an intracellular signaling domain (Cy) provided by a single polypeptide. FIG. 25 shows two example locations where a protease cleavage site (and optionally, a corresponding protease) may be disposed: (1) between the extracellular binding domain and the transmembrane domain; (2) between the transmembrane domain and the intracellular signaling domain; or a combination thereof when the receptor includes two or more protease cleavage sites.

In some embodiments, the cell surface receptors include two or more polypeptide chains. A non-limiting example of a cell surface receptor that may include two or more polypeptide chains is a T cell receptor (TCR). When a cell surface receptor of the present disclosure includes two or more polypeptide chains, the receptor may include a chain that includes an antigen-binding domain and a transmembrane domain, and the protease cleavage site may be provided in such a chain between the antigen-binding domain and the transmembrane domain. When a cell surface receptor of the present disclosure includes two or more polypeptide chains, the receptor may include a chain that includes a transmembrane domain and an intracellular signaling domain, and the protease cleavage site may be provided in such a chain between the transmembrane domain and the intracellular signaling domain. In some embodiments, the cell surface receptor is an engineered cell surface receptor. By "engineered" is meant the cell surface receptor does not have a native/wild-type counterpart, e.g., by virtue of the receptor including one or more heterologous domains, an engineered domain (e.g., an engineered extracellular binding domain, etc.), and/or the like. Non-limiting examples of engineered receptors include chimeric receptors (e.g., chimeric antigen receptors (CARs)), engineered T cell receptors (TCRs) (e.g., having altered (or "engineered") specificity and/or affinity for an antigen as compared to a counterpart wild-type TCR, having one or more chains covalently or non-covalently bound (e.g., fused) to one another, and/or the like), chimeric cytokine receptors (CCRs), synthetic notch receptors (synNotch), and the like.

In some embodiments, a cell surface receptor of the present disclosure does have a native/wild-type counterpart, and the cell surface receptor differs from the native/wild-type counterpart by virtue of a protease cleavage site (and optionally, a corresponding protease) being recombinantly disposed within the receptor at a selected extracellular or intracellular position, e.g., between the ligand binding domain and the transmembrane domain, between the trans- membrane domain and an intracellular signaling domain, etc. Non-limiting examples of recombinant cell surface receptors of the present disclosure having native/wild-type counterparts and modified to include a protease cleavage site (and optionally, a corresponding protease) include stem cell receptors, immune cell receptors, growth factor receptors, cytokine receptors, hormone receptors, receptor tyrosine kinases, immune receptors such as CD28, CD80, ICOS, CTLA4, PD1, PD-L1, BTLA, HVEM, CD27, 4-1BB, 4-1BBL, OX40, OX40L, DR3, GITR, CD3δ, SLAM, CD2, 2B4, TIM1, TIM2, TIM3, TIGIT, CD226, CD160, LAG3, LAIR1, B7-1, B7-H1, and B7-H3, a type I cytokine receptor such as Interleukin-1 receptor, Interleukin-2 receptor, Interleukin-3 receptor, Interleukin-4 receptor, Interleukin-5 receptor, Interleukin-6 receptor, Interleukin-7 receptor, Interleukin-9 receptor, Interleukin-11 receptor, Interleukin-12 receptor, Interleukin-13 receptor, Interleukin-15 receptor, Interleukin-18 receptor, Interleukin-21 receptor, Interleukin-23 receptor, Interleukin-27 receptor, Erythropoietin receptor, GM-CSF receptor, G-CSF receptor, Growth hormone receptor, Prolactin receptor, Leptin receptor, Oncostatin M receptor, Leukemia inhibitory factor, a type II cytokine receptor such as interferon-alpha/beta receptor, interferon-gamma receptor, Interferon type III receptor, Interleukin-10 receptor, Interleukin-20 receptor, Interleukin-22 receptor, Interleukin-28 receptor, a receptor in the tumor necrosis factor receptor superfamily such as Tumor necrosis factor receptor 2 (1B), Tumor necrosis factor receptor 1, Lymphotoxin beta receptor, OX40, CD40, Fas receptor, Decoy receptor 3, CD27, CD3δ, 4-1BB, Decoy receptor 2, Decoy receptor 1, Death receptor 5, Death receptor 4, RANK, Osteoprotegerin, TWEAK receptor, TACI, BAFF receptor, Herpesvirus entry mediator, Nerve growth factor receptor, B-cell maturation antigen, Glucocorticoid-induced TNFR-related, TROY, Death receptor 6, Death receptor 3, Ectodysplasin A2 receptor, a chemokine receptor such as CCR1, CCR2, CCR3, CCR4, CCR5, CCR6, CCR7, CCR8, CCR9, CCR10, CXCR1, CXCR2, CXCR3, CXCR4, CXCR5, CXCR6, CX3CR1, XCR1, ACKR1, ACKR2, ACKR3, ACKR4, CCRL2, a receptor in the epidermal growth factor receptor (EGFR) family, a receptor in the fibroblast growth factor receptor (FGFR) family, a receptor in the vascular endothelial growth factor receptor (VEGFR) family, a receptor in the rearranged during transfection (RET) receptor family, a receptor in the Eph receptor family, a receptor that can induce cell differentiation (e.g., a Notch receptor), a cell adhesion molecule (CAM), an adhesion receptor such as integrin receptor, cadherin, selectin, and a receptor in the discoidin domain receptor (DDR) family, transforming growth factor beta receptor 1, and transforming growth factor beta receptor 2. In some embodiments, such a receptor is an immune cell receptor selected from a T cell receptor, a B cell receptor, a natural killer (NK) cell receptor, a macrophage receptor, a monocyte receptor, a neutrophil receptor, a dendritic cell receptor, a mast cell receptor, a basophil receptor, and an eosinophil receptor.

Figure 4:
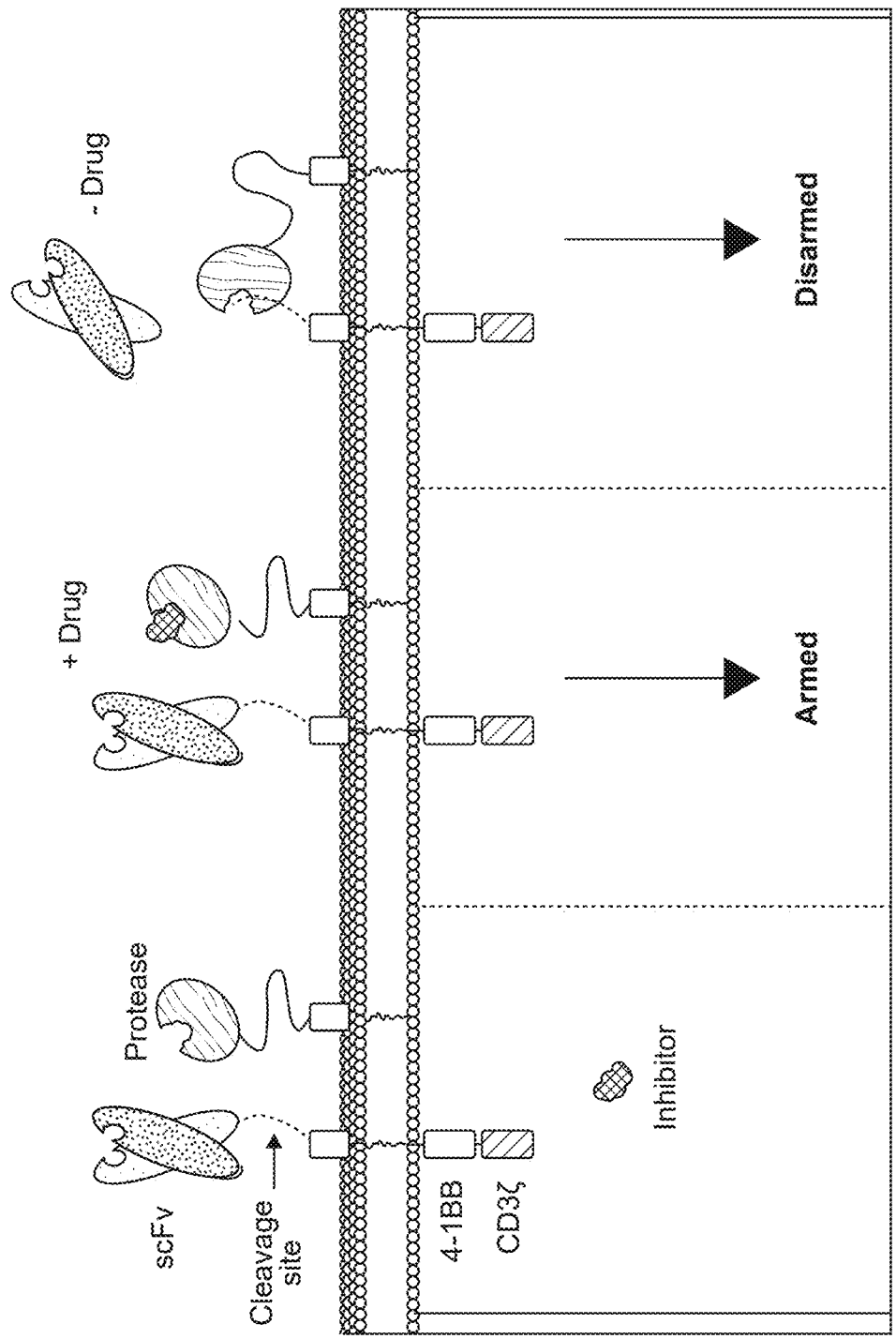
FIG. 4: A schematic illustration of an engineered cell surface receptor expressed on the surface of a cell according to one embodiment. In this example, the engineered cell surface receptor is a chimeric antigen receptor (CAR) in which the protease cleavage site is disposed between the extracellular binding domain (here, an antigen binding domain which is an scFv) and the transmembrane domain of the CAR. Also in this example, a protease capable of cleaving the protease cleavage site is tethered extracellularly to the cell membrane. As schematically illustrated, in the presence of an inhibitor of the protease (designated as "drug" in FIG. 4), the protease is prevented from cleaving the protease cleavage site, leaving the CAR intact and capable of transducing antigen-binding related signals to the cell (designated "armed" in FIG. 4). In the absence of an inhibitor of the protease, the protease cleaves the protease cleavage site, thereby removing the extracellular binding domain from the remaining domains of the CAR, rendering the CAR incapable of binding antigen (designated "disarmed" in FIG. 4).
Figure 5:
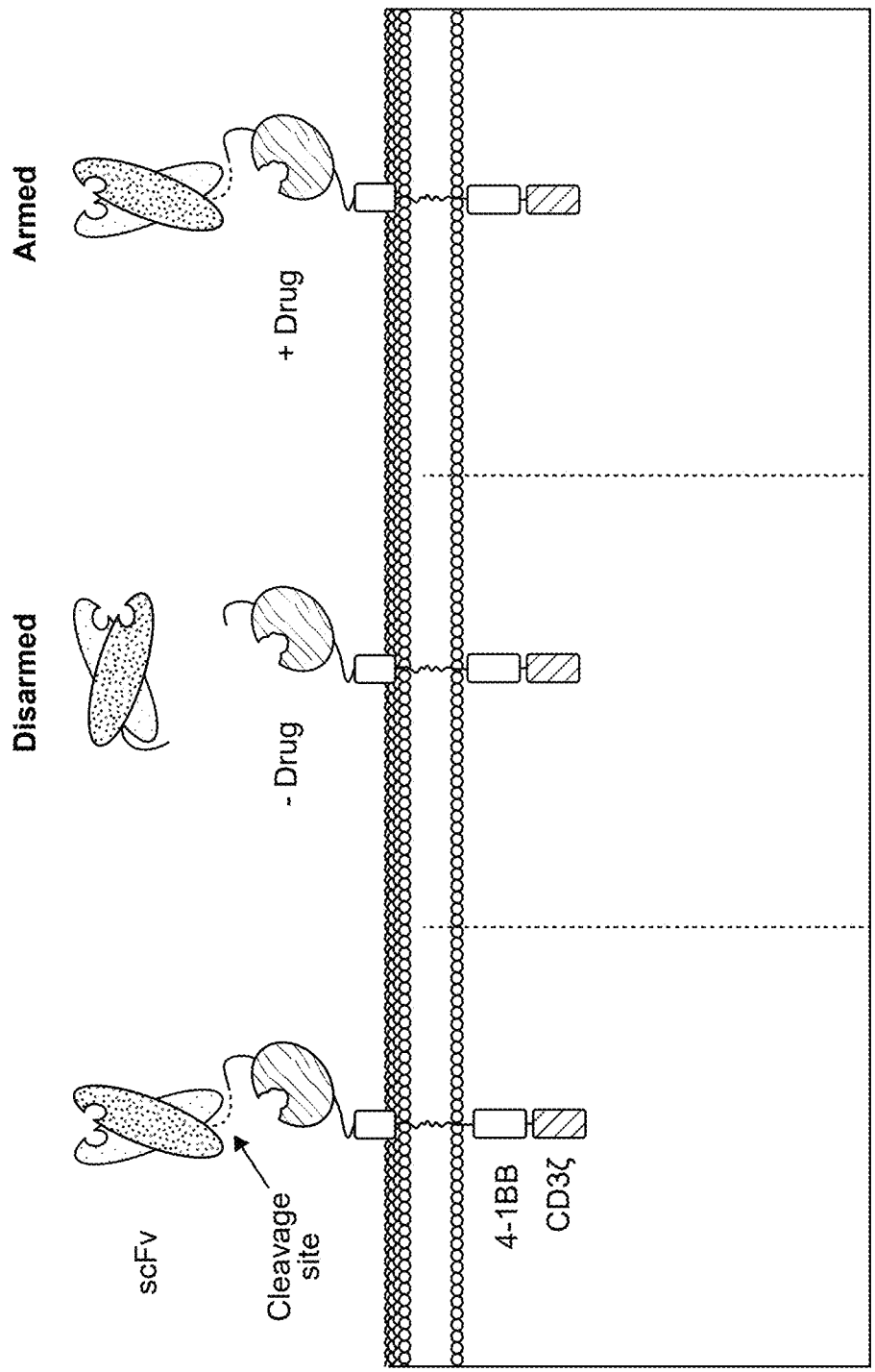
FIG. 5: A schematic illustration of an engineered cell surface receptor expressed on the surface of a cell according to one embodiment. In this example, the engineered cell surface receptor is a chimeric antigen receptor (CAR) that further comprises a protease capable of cleaving the protease cleavage site, where the protease is disposed extracellularly between the protease cleavage site and the transmembrane domain. As schematically illustrated, in the presence of an inhibitor of the protease (designated as "drug" in FIG. 5), the protease is prevented from cleaving the protease cleavage site, leaving the CAR intact and capable of transducing antigen-binding related signals to the cell (designated "armed" in FIG. 5). In the absence of an inhibitor of the protease, the protease cleaves the protease cleavage site, thereby removing the extracellular binding domain from the remaining domains of the CAR, rendering the CAR incapable of binding antigen (designated "disarmed" in FIG. 5).

In some embodiments, a cell surface receptor of the present disclosure is an engineered cell surface receptors, and the engineered cell surface receptor is a chimeric antigen receptor (CAR). As with any other cell surface receptors of the present disclosure, the protease cleavage site of the CAR may be disposed between the extracellular binding domain and the transmembrane domain. Examples of such CARs/SNIP systems are schematically illustrated in FIGS. 4 and 5. Shown in FIG. 4 is a trans SNIP system that includes a CAR having the cleavage site disposed between the extracellular binding domain and the transmembrane domain, and an extracellularly-tethered protease capable of cleaving the cleavage site in the absence of an inhibitor of the protease. Shown in FIG. 5 is a cis SNIP system that includes a CAR having the cleavage site disposed between the extracellular binding domain and the transmembrane domain, where the CAR further includes the protease disposed between the cleavage site and the transmembrane domain, the protease being capable of cleaving the cleavage site in the absence of an inhibitor of the protease.

Figure 3:
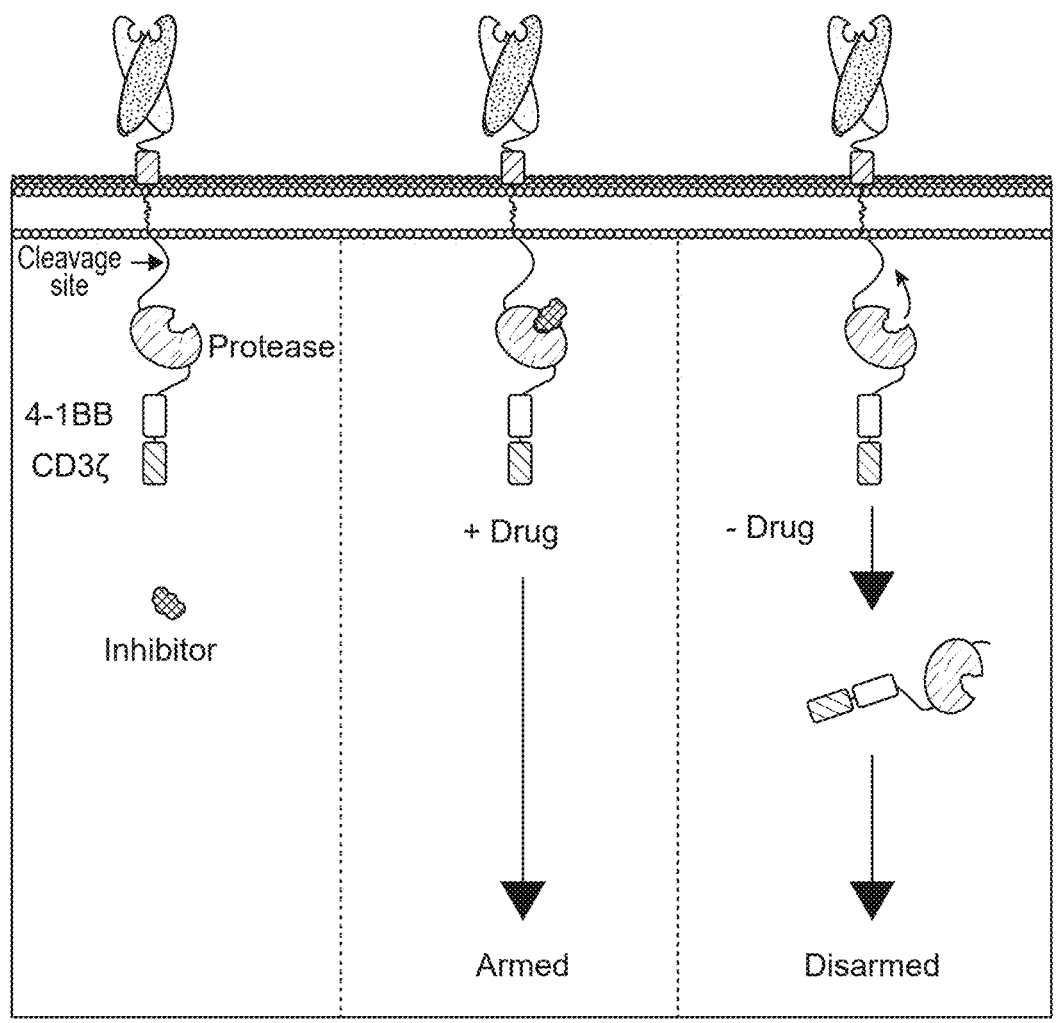
FIG. 3: A schematic illustration of an engineered cell surface receptor expressed on the surface of a cell according to one embodiment. In this example, the engineered cell surface receptor is a chimeric antigen receptor (CAR) that further comprises a protease capable of cleaving the protease cleavage site, where the protease is disposed intracellularly between the protease cleavage site and the intracellular signaling domains. As schematically illustrated, in the presence of an inhibitor of the protease (designated as "drug" in FIG. 3), the protease is prevented from cleaving the protease cleavage site, leaving the CAR intact and capable of transducing antigen-binding related signals to the cell (designated "armed" in FIG. 3). In the absence of an inhibitor of the protease, the protease cleaves the protease cleavage site, thereby removing the intracellular signaling domains (and the protease) from the remaining domains of the CAR, rendering the CAR incapable of transducing antigen-binding related signals to the cell (designated "disarmed" in FIG. 3).

As with any other cell surface receptors of the present disclosure, the protease cleavage site of a CAR of the present disclosure may be disposed between the transmembrane domain and an intracellular signaling domain. This includes instances where the intracellular signaling domain of the CAR includes two or more intracellular signaling domains (e.g., a costimulatory domain and a primary signaling domain) and the protease cleavage site is disposed between the transmembrane domain and the membrane proximal domain of the two or more intracellular signaling domains. Examples of such CAR/SNIP systems are schematically illustrated in FIGS. 1 and 3. In these examples, the CAR includes a costimulatory domain (in these examples, a 4-1BB costimulatory domain) C-terminal to the transmembrane domain, and a primary signaling domain (in these examples, a CD3ζ primary signaling domain) C-terminal to the costimulatory domain. Shown in FIG. 1 is a trans SNIP system in which the protease is provided as a separate molecule and intracellularly tethered to the cell membrane. FIG. 3 shows a corresponding cis SNIP system where the CAR further includes the protease disposed between the cleavage site and the intracellular signaling domain nearest to the transmembrane domain.

Figure 2:
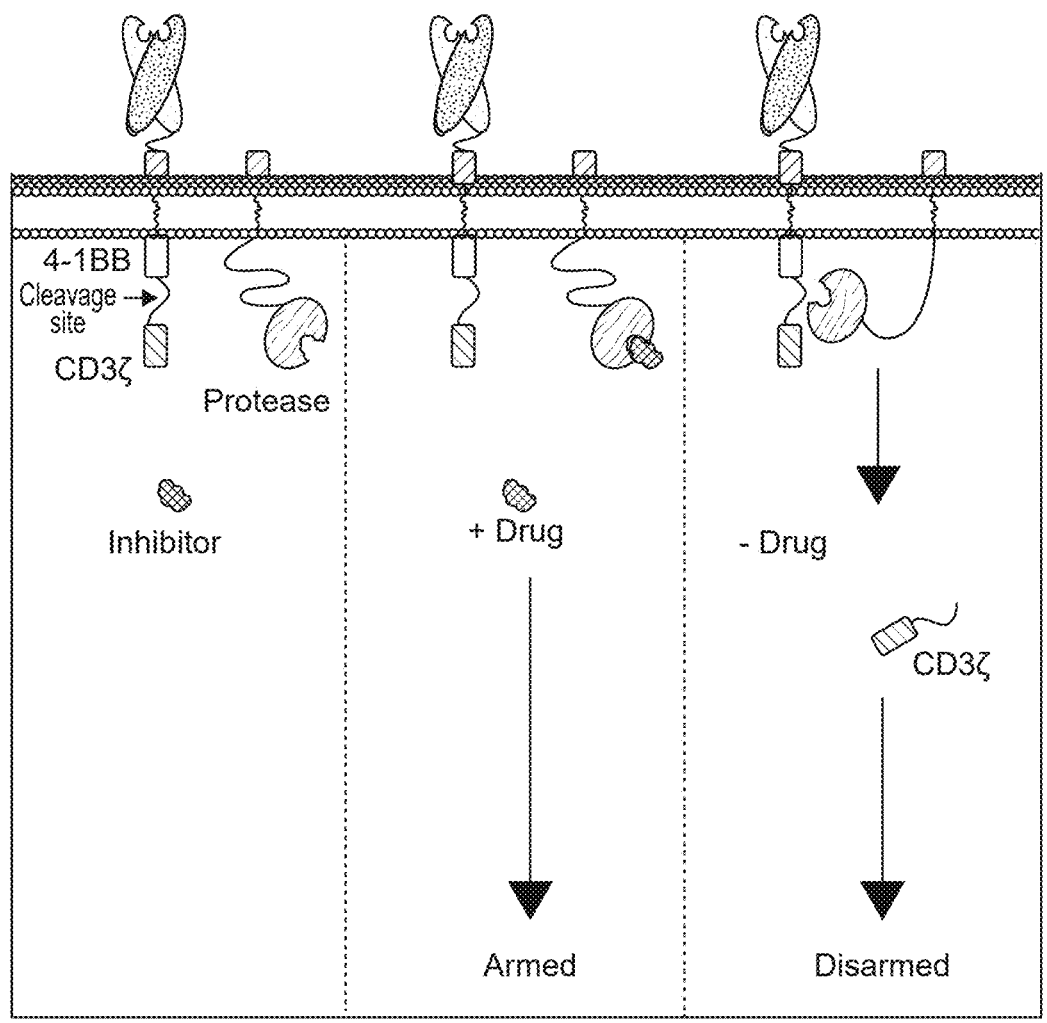
FIG. 2: A schematic illustration of an engineered cell surface receptor expressed on the surface of a cell according to one embodiment. In this example, the engineered cell surface receptor is a chimeric antigen receptor (CAR) in which the protease cleavage site is disposed between first and second intracellular signaling domains of the CAR. Also in this example, a protease capable of cleaving the protease cleavage site is tethered intracellularly to the cell membrane. As schematically illustrated, in the presence of an inhibitor of the protease (designated as "drug" in FIG. 2), the protease is prevented from cleaving the protease cleavage site, leaving the CAR intact and capable of transducing antigen-binding related signals to the cell (designated "armed" in FIG. 2). In the absence of an inhibitor of the protease, the protease cleaves the protease cleavage site, thereby removing a first intracellular signaling domain from the remaining domains of the CAR, rendering the CAR incapable of transducing antigen-binding related signals to the cell (designated "disarmed" in FIG. 2).

In some embodiments, when the CAR includes two or more intracellular signaling domains, the protease cleavage site is disposed between two of the two or more intracellular signaling domains. An example of such a CAR/SNIP system is schematically illustrated in FIG. 2. In this example, the CAR includes a first intracellular signaling domain (here, a CD3ζ primary signaling domain) and a second intracellular signaling domain (here, a 4-1BB costimulatory domain). Shown in FIG. 2 is a trans SNIP system in which the protease cleavage site is disposed between the first and second intracellular signaling domains, and the protease is provided as a separate molecule and intracellularly tethered to the cell membrane, where the protease is capable of cleaving the cleavage site in the absence of an inhibitor of the protease.

Figure 24:
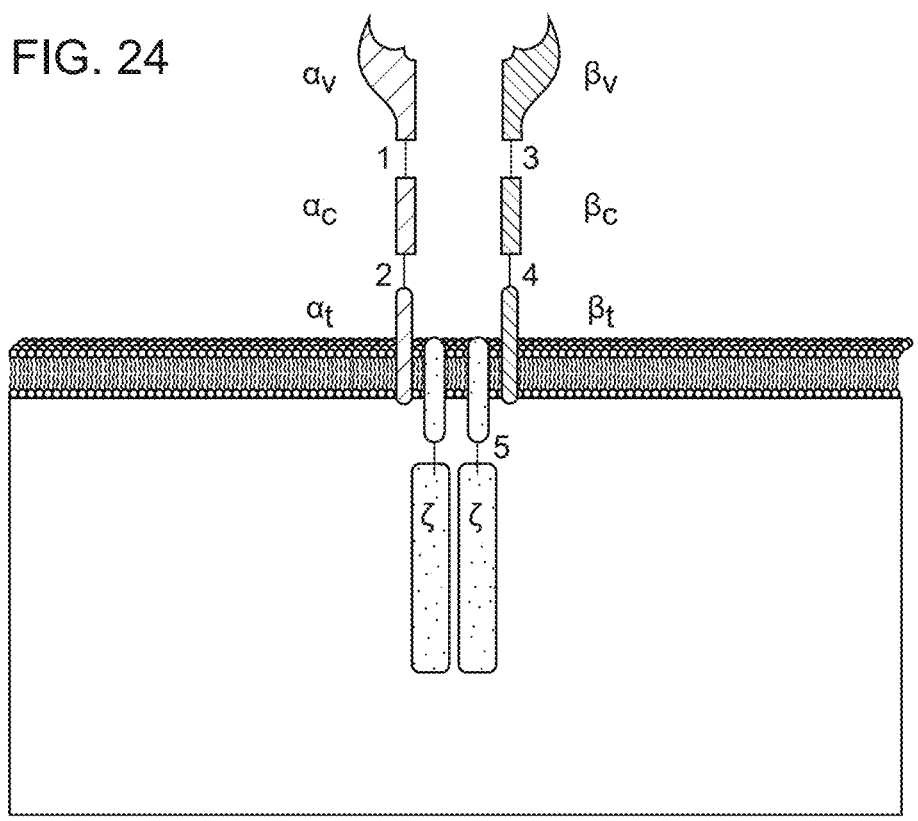
FIG. 24: A schematic illustration of a T cell receptor (TCR) and example locations therein where one or more protease cleavage sites may be disposed.

As summarized above, a cell surface receptor of the present disclosure may include two or more polypeptide chains. In some embodiments, such a cell surface receptor is a T cell receptor (TCR). In some embodiments, the TCR includes one or more CD3 polypeptides, e.g., one or more CD3ζ polypeptides. In some embodiments, the cell surface receptor is a TCR that includes a protease cleavage site disposed: between the variable region of the alpha chain (αv) and the constant region of the alpha chain (αc); between the constant region of the alpha chain (αc) and the transmembrane region of the alpha chain (αt); between the variable region of the beta chain (βv) and the constant region of the beta chain (βc); between the constant region of the beta chain (βc) and the transmembrane region of the beta chain (βt); if a CD3ζ polypeptide is present, between the transmembrane domain of the CD3ζ polypeptide and the cytoplasmic domain of the CD3ζ polypeptide; or any combination thereof when the TCR includes two or more protease cleavage sites. FIG. 24 schematically illustrates a TCR and example locations therein where one or more protease cleavage sites (and optionally, one or more corresponding proteases) may be disposed: (1) between the variable region of the alpha chain (αv) and the constant region of the alpha chain (αc); (2) between the constant region of the alpha chain (αc) and the transmembrane region of the alpha chain (αt); (3) between the variable region of the beta chain (βv) and the constant region of the beta chain (βc); (4) between the constant region of the beta chain (βc) and the transmembrane region of the beta chain (βt); and (5) between the transmembrane region of the CD3ζ and the cytoplasmic domain of CD3ζ. In some embodiments, a TCR of the present disclosure includes the cleavage site and the protease (cis configuration), e.g., present within a linker. In some embodiments, when the cell surface receptor is a TCR, the protease is supplied in trans—that is, not part of the polypeptide chain that includes the cleavage site. In some embodiments, when the protease is supplied in trans, the protease is tethered to a different chain of the TCR. For example, when the cleavage site is disposed within the α chain, the protease may be supplied on the β chain, and vice versa. Also by way of example, the cleavage site may be disposed within one of the CD3 chains (epsilon, gamma, delta, or zeta), and the protease may be supplied in a different CD3 chain.

The extracellular binding domain of an engineered receptor of the present disclosure (e.g., a CAR or engineered TCR) may specifically bind to an antigen, e.g., a cell surface antigen, such as an antigen on the surface of a cancer cell, or an antigenic peptide associated with an MHC molecule. The extracellular binding domain "specifically binds" to the antigen if it binds to or associates with the antigen with an affinity or $K_a$ (that is, an equilibrium association constant of a particular binding interaction with units of 1/M) of, for example, greater than or equal to about $10^5$ $M^{-1}$. In certain embodiments, the extracellular binding domain binds to an antigen with a $K_a$ greater than or equal to about $10^6$ $M^{-1}$, $10^7$ $M^{-1}$, $10^8$ $M^{-1}$, $10^9$ $M^{-1}$, $10^{10}$ $M^{-1}$, $10^{11}$ $M^{-1}$, $10^{12}$ $M^{-1}$ 1, or $10^{13}$ $M^{-1}$. "High affinity" binding refers to binding with a $K_a$ of at least $10^7$ $M^{-1}$, at least $10^8$ $M^{-1}$, at least $10^9$ $M^{-1}$, at least $10^{10}$ $M^{-1}$, at least $10^{11}$ $M^{-1}$, at least $10^{12}$ $M^{-1}$, at least $10^{13}$ $M^{-1}$, or greater. Alternatively, affinity may be defined as an equilibrium dissociation constant ($K_D$) of a particular binding interaction with units of M (e.g., $10^5$ M to $10^{13}$ M, or less). In some embodiments, specific binding means the extracellular binding domain binds to the target molecule with a $K_D$ of less than or equal to about $10^5$ M, less than or equal to about $10^6$ M, less than or equal to about $10^7$ M, less than or equal to about $10^8$ M, or less than or equal to about $10^9$ M, $10^{10}$ M, $10^{11}$ M, or $10^{12}$ M or less. The binding affinity of the extracellular binding domain for the target antigen can be readily determined using conventional techniques, e.g., by competitive ELISA (enzyme-linked immunosorbent assay), equilibrium dialysis, by using surface plasmon resonance (SPR) technology (e.g., the BIAcore 2000 instrument, using general procedures outlined by the manufacturer); by radioimmunoassay; or the like.

The extracellular binding domain binds to a target antigen of interest, e.g., a particular antigen on the surface of a target cell. An extracellular binding domain may include or consist of an antibody (e.g., a single-chain antibody, such as an scFv), a receptor (e.g., a variable lymphocyte receptor), a receptor fragment (e.g., an Fc receptor fragment), a ligand, a cytokine, a DARPin, an adnectin, a nanobody, and a peptide.

In some embodiments, when the cell surface receptor is a CAR, the extracellular binding domain of the CAR includes a single chain antibody, non-limiting examples of which include a single-chain variable fragment (scFv). The single-chain antibody may be a monoclonal single-chain antibody, a chimeric single-chain antibody, a humanized single-chain antibody, a fully human single-chain antibody, and/or the like. Suitable extracellular binding domains include those described in Labanieh et al. (2018) *Nature Biomedical Engineering* 2:377-391, the disclosure of which is incorporated herein by reference in its entirety for all purposes. In some embodiments, the extracellular binding domain of the CAR is an antibody approved by the United States Food and Drug Administration and/or the European Medicines Agency (EMA) for use as a therapeutic antibody (e.g., for inducing antibody-dependent cellular cytotoxicity (ADCC) of certain disease-associated cells in a patient, etc.), or a fragment thereof (e.g., a single-chain version of such an antibody, such as an scFv version of the antibody) that retains the ability to bind the target molecule.

In another aspect, the extracellular binding domain of the cell surface receptor (e.g., an engineered cell surface receptor such as a CAR, engineered TCR, or the like) specifically binds a molecule on the surface of a target cell. The target cell may be any cell type of interest. For example, the target cell may be a genetically and/or phenotypically normal cell. In other embodiments, the target cell is a genetically and/or phenotypically abnormal cell. Abnormal cells of interest include, but are not limited to, cancer cells, cells in the tumor microenvironment (e.g., tumor stromal cells) such as cancer-associated fibroblasts (CAFs), myeloid-derived suppressor cells (MDSCs), tumor-associated macrophages (TAMs), tumor endothelial cells (TECs), and the like. See, e.g., Labanieh et al. (2018) Nature Biomedical Engineering 2:377-391. By "cancer cell" is meant a cell exhibiting a neoplastic cellular phenotype, which may be characterized by one or more of, for example, abnormal cell growth, abnormal cellular proliferation, loss of density dependent growth inhibition, anchorage-independent growth potential, ability to promote tumor growth and/or development in an immunocompromised non-human animal model, and/or any appropriate indicator of cellular transformation. "Cancer cell" may be used interchangeably herein with "tumor cell", "malignant cell" or "cancerous cell", and encompasses cancer cells of a solid tumor, a semi-solid tumor, a hematological malignancy (e.g., a leukemia cell, a lymphoma cell, a myeloma cell, etc.), a primary tumor, a metastatic tumor, and the like.

In some embodiments, when the target cell is a cancer cell, the molecule on the surface of the cancer cell to which the extracellular binding domain binds is a tumor-associated cell surface molecule or a tumor-specific cell surface molecule. By "tumor-associated cell surface molecule" is meant a cell surface molecule expressed on malignant cells with limited expression on cells of normal tissues, a cell surface molecule expressed at much higher density on malignant versus normal cells.

When the target cell is a cancer cell, the cancer cell may express on its surface a tumor-associated molecule or tumor-specific molecule to which the extracellular binding domain of the cell surface receptor binds. In certain embodiments, such a tumor-associated molecule or tumor-specific molecule is selected from HER2, B7-H3 (CD276), CD19, CD20, GD2, CD22, CD3δ, CD33, CD56, CD66/CEACAM5, CD70, CD74, CD79b, CD123, CD133 CD138, CD171, B-cell maturation antigen (BCMA), Nectin-4, Mesothelin, Transmembrane glycoprotein NMB (GPNMB), Prostate-Specific Membrane Antigen (PSMA), SLC44A4, CA6, tyrosine-protein kinase Met (c-Met), epidermal growth factor receptor variant III (EGFRvIII), mucin 1 (MUC1), ephrin type-A receptor 2 (EphA2), glypican 2 (GPC2), glypican 3 (GPC3), fms-like tyrosine kinase 3 (FLT3), folate receptor alpha (FRα), IL-13 receptor alpha 2 (IL13Ra2), fibroblast activation protein (FAP), receptor tyrosine kinase-like orphan receptor 1 (ROR1), delta-like 3 (DLL3), K light chain, vascular endothelial growth factor receptor 2 (VEGFR2), Trophoblast glycoprotein (TPBG), anaplastic lymphoma kinase (ALK), CA-IX, an integrin, C—X—C chemokine receptor type 4 (CXCR4), neuropilin-1 (NRP1), matriptase, and any other tumor-associated or tumor-specific molecules of interest.

When the extracellular binding domain includes an antibody, non-limiting examples of antibodies which may be employed in the cell surface receptor (e.g., a CAR) of the present disclosure include Adecatumumab, Ascrinvacumab, Cixutumumab, Conatumumab, Daratumumab, Drozitumab, Duligotumab, Durvalumab, Dusigitumab, Enfortumab, Enoticumab, Figitumumab, Ganitumab, Glembatumumab, Intetumumab, Ipilimumab, Iratumumab, Icrucumab, Lexatumumab, Lucatumumab, Mapatumumab, Narnatumab, Necitumumab, Nesvacumab, Ofatumumab, Olaratumab, Panitumumab, Patritumab, Pritumumab, Radretumab, Ramucirumab, Rilotumumab, Robatumumab, Seribantumab, Tarextumab, Teprotumumab, Tovetumab, Vanticumab, Vesencumab, Votumumab, Zalutumumab, Flanvotumab, Altumomab, Anatumomab, Arcitumomab, Bectumomab, Blinatumomab, Detumomab, Ibritumomab, Minretumomab, Mitumomab, Moxetumomab, Naptumomab, Nofetumomab, Pemtumomab, Pintumomab, Racotumomab, Satumomab, Solitomab, Taplitumomab, Tenatumomab, Tositumomab, Tremelimumab, Abagovomab, Igovomab, Oregovomab, Capromab, Edrecolomab, Nacolomab, Amatuximab, Bavituximab, Brentuximab, Cetuximab, Derlotuximab, Dinutuximab, Ensituximab, Futuximab, Girentuximab, Indatuximab, Isatuximab, Margetuximab, Rituximab, Siltuximab, Ublituximab, Ecromeximab, Abituzumab, Alemtuzumab, Bevacizumab, Bivatuzumab, Brontictuzumab, Cantuzumab, Cantuzumab, Citatuzumab, Clivatuzumab, Dacetuzumab, Demcizumab, Dalotuzumab, Denintuzumab, Elotuzumab, Emactuzumab, Emibetuzumab, Enoblituzumab, Etaracizumab, Farletuzumab, Ficlatuzumab, Gemtuzumab, Imgatuzumab, Inotuzumab, Labetuzumab, Lifastuzumab, Lintuzumab, Lorvotuzumab, Lumretuzumab, Matuzumab, Milatuzumab, Nimotuzumab, Obinutuzumab, Ocaratuzumab, Otlertuzumab, Onartuzumab, Oportuzumab, Parsatuzumab, Pertuzumab, Pinatuzumab, Polatuzumab, Sibrotuzumab, Simtuzumab, Tacatuzumab, Tigatuzumab, Trastuzumab, Tucotuzumab, Vandortuzumab, Vanucizumab, Veltuzumab, Vorsetuzumab, Sofituzumab, Catumaxomab, Ertumaxomab, Depatuxizumab, Ontuxizumab, Blontuvetmab, Tamtuvetmab, or an antigen-binding variant thereof. As used herein, the term "variant" refers to an antibody that binds to a particular cognate antigen (e.g., HER2 for trastuzumab) but has fewer or more amino acids than the parental antibody, has one or more amino acid substitutions relative to the parental antibody, is a single-chain variant (such as an scFv variant) of the parental antibody, or any combination thereof.

In some embodiments, an engineered cell surface receptor of the present disclosure includes one or more linker sequences between the various domains. Such a receptor may include one, two, three, four, or five or more linkers. In particular embodiments, the length of a linker is about 1 to about 25 amino acids, about 5 to about 20 amino acids, or about 10 to about 20 amino acids, or any intervening length of amino acids. In some embodiments, the linker is 1, 2, 3, 4, 5, 6, 7, 8, 9, 10, 11, 12, 13, 14, 15, 16, 17, 18, 19, 20, 21, 22, 23, 24, 25, or more amino acids long. A CAR of the present disclosure may include a variable region linking sequence. By "variable region linking sequence" is meant an amino acid sequence that connects a heavy chain variable region to a light chain variable region and provides a spacer function compatible with interaction of the two sub-binding domains so that the resulting binding domain retains a specific binding affinity to the same target molecule as an antibody that includes the same light and heavy chain variable regions. A non-limiting example of a variable region linking sequence is a serine-glycine linker, such as a serine-glycine linker that includes the amino acid sequence GGGGSGGGGSGGGGS (G4S) 3 (SEQ ID NO:18). In some embodiments, a CAR of the present disclosure includes one or more linkers separating one or more heavy or light chain variable domains, hinge domains, transmembrane domains, costimulatory domains, and/or primary signaling domains. The amino acid sequences of example CARs having various domain-linking linkers are presented in Table 1.

In some embodiments, the extracellular binding domain is followed by one or more spacer domains that moves the extracellular binding domain away from the effector cell surface (e.g., the surface of a T cell expressing a CAR or TCR) to enable proper cell/cell contact (e.g., by limiting steric hindrance), antigen binding and/or activation. The spacer domain (and any other spacer domains, linkers, and/or the like described herein) may be derived either from a natural, synthetic, semi-synthetic, or recombinant source. In certain embodiments (e.g., when the cell surface receptor is a CAR), a spacer domain is a portion of an immunoglobulin, including, but not limited to, one or more heavy chain constant regions, e.g., CH2 and CH3. The spacer domain may include the amino acid sequence of a naturally occurring immunoglobulin hinge region or an altered immunoglobulin hinge region. In one embodiment, the spacer domain includes the CH2 and/or CH3 of IgG1, IgG4, or IgD. Illustrative spacer domains suitable for use in the CARs described herein include the hinge region derived from the extracellular regions of type 1 membrane proteins such as CD8α and CD4, which may be wild-type hinge regions from these molecules or variants thereof. In some embodiments, the hinge domain includes a CD8α hinge region. In some embodiments, the hinge domain includes a CD28 hinge region. In some embodiments, the hinge domain includes a CD4 hinge region. In some embodiments, the hinge is a PD-1 hinge or CD152 hinge.

The "transmembrane domain" (TM domain) is the portion of the cell surface receptor that fuses the extracellular binding portion and intracellular signaling domain and anchors the cell surface receptor to the plasma membrane of the cell (e.g., immune effector cell). The transmembrane domain may be derived either from a natural, synthetic, semi-synthetic, or recombinant source. In some embodiments, the transmembrane domain is derived from (e.g., includes at least the transmembrane region(s) or a functional portion thereof) of the alpha or beta chain of the T-cell receptor, CD3ς, CD3ζ, CD3γ, CD3δ, CD4, CD5, CD8α, CD9, CD16, CD22, CD27, CD28, CD33, CD3ζ, CD45, CD64, CD80, CD86, CD134, CD137, CD152, CD154, and PD-1.

In one embodiment, the cell surface receptor (e.g., CAR or engineered TCR) includes a transmembrane domain derived from CD8a. In some embodiments, the cell surface receptor (e.g., CAR or engineered TCR) includes a Tm domain derived from CD8α and a short oligo- or polypeptide linker, e.g., between 1, 2, 3, 4, 5, 6, 7, 8, 9, or 10 amino acids in length, that links the transmembrane domain and the intracellular signaling domain. A glycine-serine linker may be employed as such a linker, for example.

The term "intracellular signaling domain" refers to the portion of the receptor which transduces the effector function signal and that directs the cell to perform a specialized function. To the extent that a truncated portion of an intracellular signaling domain is used, such truncated portion may be used in place of a full-length intracellular signaling domain as long as it transduces the effector function signal. The term intracellular signaling domain is meant to include any truncated portion of an intracellular signaling domain sufficient for transducing effector function signal. The intracellular signaling domain of a CAR refers to the portion of the CAR that participates in transducing the signal from binding of the extracellular binding domain (e.g., a single-chain antibody, such as an scFv) to a target antigen into the interior of the immune effector cell to elicit effector cell function, e.g., activation, cytokine production, proliferation and/or cytotoxic activity, including the release of cytotoxic factors to the CAR-bound target cell, or other cellular responses elicited with target antigen binding to the extracellular binding domain of the CAR.

Signals generated through the T cell receptor (TCR) alone are insufficient for full activation of the T cell and a secondary or costimulatory signal is also required. Thus, T cell activation is mediated by two distinct classes of intracellular signaling domains: primary signaling domains that initiate antigen-dependent primary activation through the TCR (e.g., a TCR/CD3 complex) and costimulatory signaling domains that act in an antigen-independent manner to provide a secondary or costimulatory signal. As such, a CAR, engineered TCR, or the like, of the present disclosure may include an intracellular signaling domain that includes one or more costimulatory signaling domains and a primary signaling domain.

Primary signaling domains regulate primary activation of the TCR complex either in a stimulatory manner, or in an inhibitory manner. Primary signaling domains that act in a stimulatory manner may contain signaling motifs that are known as immunoreceptor tyrosine-based activation motifs (or "ITAMs"). Non-limiting examples of ITAM-containing primary signaling domains suitable for use in a CAR of the present disclosure include those derived from FcRγ, FcRβ, CD3γ, CD3δ, CD3ε, CD3ζ, CD22, CD79α, CD79β, and CD66δ. In certain embodiments, a CAR includes a CD3ζ primary signaling domain and one or more costimulatory signaling domains. The intracellular primary signaling and costimulatory signaling domains are operably linked to the carboxyl terminus of the transmembrane domain.

In some embodiments, a cell surface receptor (e.g., a CAR, TCR, or the like) of the present disclosure includes one or more costimulatory signaling domains to enhance the efficacy and expansion of T cells expressing the cell surface receptor. As used herein, the term "costimulatory signaling domain" or "costimulatory domain" refers to an intracellular signaling domain of a costimulatory molecule or an active fragment thereof. Example costimulatory molecules suitable for use in CARs, for example, include TLR1, TLR2, TLR3, TLR4, TLR5, TLR6, TLR7, TLR8, TLR9, TLR10, CARD11, CD2, CD7, CD27, CD28, CD3δ, CD40, CD54 (ICAM), CD83, CD134 (OX40), CD137 (4-1BB), CD278 (ICOS), DAP10, LAT, KD2C, SLP76, TRIM, and ZAP70. In some embodiments, a CAR of the present disclosure includes one or more costimulatory signaling domains selected from the group consisting of 4-1BB, CD28, CD137, and CD134, and a CD3ζ primary signaling domain.

In some embodiments, a CAR of the present disclosure includes a first signaling domain and a second signaling domain independently selected from a CD3ζ intracellular signaling domain, a CD28 intracellular signaling domain, a 4-1BB intracellular signaling domain, an OX-40 intracellular signaling domain, an inducible co-stimulator (ICOS) intracellular signaling domain, a CD27 intracellular signaling domain, and a MyD88/CD40 intracellular signaling domain. For example, a CAR may include a first intracellular signaling domain that is a CD3ζ intracellular signaling domain and a second intracellular signaling domain that is a CD28 intracellular signaling domain. Also by way of example, a CAR may include a first intracellular signaling domain that is a CD3ζ intracellular signaling domain and a second intracellular signaling domain that is a 4-1BB intracellular signaling domain.

In certain embodiments, a CAR of the present disclosure includes an extracellular binding domain (e.g., a single chain antibody, such as an scFv) that binds to an antigen of interest; a transmembrane domain from a polypeptide selected from the group consisting of: CD4, CD8α, CD154, and PD-1; one or more intracellular costimulatory signaling domains from a polypeptide selected from the group consisting of: 4-1BB, CD28, CD134, and CD137; and an intracellular signaling domain from a polypeptide selected from the group consisting of: FcRγ, FcRβ, CD3γ, CD3δ, CD3ε, CD3ζ, CD22, CD79α, CD79β, and CD66δ. Such a CAR may further include any linkers, spacer domains, etc. as desired, such as a spacer domain between the extracellular binding domain and the transmembrane domain, e.g., a CD8 alpha hinge.

In some embodiments, the cell surface receptors of the present disclosure may further include one or more domains useful for detecting/imaging the cell surface receptor. For example, the extracellular portion of the cell surface receptor may include a domain to which a detection reagent may bind, e.g., an epitope to which an antibody binds for detecting the cell surface receptor by immunofluorescence, or the like. In some embodiments, the intracellular portion of the cell surface receptor includes a reporter domain, such as a bioluminescence reporter domain. In some embodiments, the bioluminescence reporter domain is a luciferase, e.g., a nanoluciferase. Similarly, a membrane-tethered protease of the present disclosure may include one or more extracellular and/or intracellular domains (e.g., one or more epitopes and/or bioluminescence reporters) useful for detecting/imaging the membrane-tethered protease. In certain embodiments, a membrane-tethered protease comprises a hinge domain (e.g., a hinge domain which may be of the same type as a hinge domain of the cell surface receptor), where the hinge domain is fused directly or indirectly to an epitope tag, and where the hinge domain projects the epitope tag away from the cell membrane on the extracellular side. The epitope tag may be used to detect/monitor expression of the protease and/or be used as a selection marker. Domains that permit detection/imaging of the cell surface receptor and/or membrane-tethered protease find use in in vitro, ex vivo, and in vivo applications, e.g., for monitoring expression of the cell surface receptor and/or membrane-tethered protease on a cell or population of cells. A cell surface receptor and/or membrane-tethered protease of the present disclosure may further include one or more domains useful for purification, e.g., a purification tag, such as a FLAG tag, HIS tag, and/or the like), a localization sequence, etc. The various domains of the subject cell surface receptors and membrane-tethered proteases are operably linked to one another, meaning that such domains are linked to one another and retain their respective functions, e.g., extracellular binding function, intracellular signaling function, etc.

In some embodiments, the SNIP system comprises cell surface receptors used in conjunction with a protease. The protease may be part of the receptor molecule itself (referred to herein as a "cis" configuration) or the protease may be expressed in the cell as a molecule separate from the cell surface receptor (referred to herein as a "trans" configuration). In certain embodiments, the protease is supplied in a trans configuration comprising a membrane-tethered protease—that is, a protease having one or more additional domains that tether the protease to the cell membrane. Domains that may be employed to tether the protease to the cell membrane include, but are not limited to, domains that are post-translationally modified with one or more moieties that tether proteins to cell membranes in nature, such as domains found in prenylated proteins, fatty acylated proteins, glycosylphosphatidylinositol-linked proteins (GPI), N-myristoylation, S-palmitoylation, and the like.

In certain embodiments, the protease is supplied in a trans configuration comprising a membrane-tethered protease, and the protease is tethered to the cell membrane via a transmembrane domain. When the protease is supplied in a trans configuration comprising a membrane-tethered protease, according to some embodiments, the membrane-tethered protease (e.g., intracellularly or extracellularly tethered to the cell membrane of the cell) comprises a transmembrane domain of the same type as the transmembrane domain of the cell surface receptor. In certain embodiments, when the cell surface receptor comprises a transmembrane domain and a hinge domain, the protease is supplied in a trans configuration comprising a membrane-tethered protease (e.g., intracellularly or extracellularly tethered to the cell membrane of the cell) comprising a transmembrane domain and hinge domain of the same type as the transmembrane domain and hinge domain of the cell surface receptor. By "same type" in this context is meant that the transmembrane domain (and optional hinge domain) of the protease and cell surface receptor is a transmembrane domain (and optional hinge domain) from the same type of molecule, e.g., a CD8α transmembrane domain (and optional hinge domain), a CD28 transmembrane domain (and optional hinge domain), or the like. By way of example, in certain embodiments, the membrane-tethered protease and cell surface receptor each comprise a CD8α transmembrane domain, or each comprise a CD8α transmembrane domain and a CD8α hinge domain. Also by way of example, according to some embodiments, the membrane-tethered protease and cell surface receptor each comprise a CD28 transmembrane domain, or each comprise a CD28 transmembrane domain and a CD28 hinge domain. The amino acid sequences of exemplary CD8α and CD28 transmembrane and hinge domains are provided below:

```
CD8α hinge domain
                                       (SEQ ID NO: 19)
TTTPAPRPPTPAPTIASQPLSLRPEACRPAAGGAVHTRGLDFACD CD8α transmembrane domain
                                       (SEQ ID NO: 20)
IYIWAPLAGTCGVLLLSLVITLYC CD28 hinge domain
                                       (SEQ ID NO: 21)
IEVMYPPPYLDNEKSNGTIIHVKGKHLCPSPLFPGPSKP
```

-continued

CD28 transmembrane domain
(SEQ ID NO: 22)
FWVLVVVGGVLACYSLLVTVAFIIFWV

In some embodiments, the protease is supplied in a trans configuration comprising a soluble cytosolic protease—that is, present in the cytosol and not tethered to a membrane.

According to some embodiments, a protease is supplied in a trans configuration, and the protease comprises an engineered domain that dimerizes with an engineered domain of the cell surface receptor, e.g., to promote association of the protease and cell surface receptor—in turn facilitating cleavage of the protease cleavage site of the cell surface receptor by the protease in the absence of an inhibitor of the protease. For example, the cell surface receptor and trans protease may be engineered to include complementary dimerization domains including, but not limited to, leucine zipper domains, helix-loop-helix domains, or the like. Examples of proteins having dimerization domains that may be employed in the cell surface receptors and trans proteases of the present disclosure are known and described, e.g., in Mei et al. (2005) *FEBS J.* 272 (1): 16-27. In certain embodiments, the protease comprises a domain that binds to a domain on the cell surface receptor, non-limiting examples of which include prey and bait systems, SpyTag-SpyCatcher systems, and the like.

In some embodiments, the SNIP system comprises a protease that is highly selective for the cleavage site in the cell surface receptor. Additionally, protease activity is preferably capable of inhibition by known small molecule inhibitors that are cell-permeable and not toxic to the cell or individual under study or treatment. For a discussion of proteases, see, e.g., V. Y. H. Hook, Proteolytic and cellular mechanisms in prohormone and proprotein processing, RG Landes Company, Austin, Tex., USA (1998); N. M. Hooper et al., Biochem. J. 321:265-279 (1997); Z. Werb, *Cell* 91:439-442 (1997); T. G. Wolfsberg et al., J. Cell Biol. 131:275-278 (1995); T. Berg et al., *Biochem. J.* 307:313-326 (1995); M. J. Smyth and J. A. Trapani, Immunology Today 16:202-206 (1995); R. V. Talanian et al., *J. Biol. Chem.* 272:9677-9682 (1997); and N. A. Thornberry et al., *J. Biol. Chem.* 272:17907-17911 (1997), the disclosures of which are incorporated herein by reference in their entireties for all purposes.

In some embodiments, the protease employed is a sequence-specific non-human protease for which pharmacological inhibitors are available. In some embodiments, the protease employed is a viral protease. Non-limiting example viral proteases that may be used with the systems, compositions, and methods provided herein include a hepatitis C virus (HCV) protease, a rhinovirus protease, a coxsackie virus protease, a dengue virus protease, and a tev protease. In some embodiments, the viral protease may be a HCV protease. In certain embodiments, the viral protease is derived from HCV nonstructural protein 3 (NS3). NS3 consists of an N-terminal serine protease domain and a C-terminal helicase domain. By "derived from HCV NS3" is meant the protease is the serine protease domain of HCV NS3 or a proteolytically active variant thereof capable of cleaving a cleavage site for the serine protease domain of HCV NS3. The protease domain of NS3 forms a heterodimer with the HCV nonstructural protein 4A (NS4A), which activates proteolytic activity. A protease derived from HCV NS3 may include the entire NS3 protein or a proteolytically active fragment thereof, and may further include a cofactor polypeptide, such as a cofactor polypeptide derived from HCV nonstructural protein 4A (NS4A), e.g., an activating NS4A region. NS3 protease is highly selective and can be inhibited by a number of non-toxic, cell-permeable drugs, which are currently available for use in humans. NS3 protease inhibitors that may be employed include, but are not limited to, simeprevir, danoprevir, asunaprevir, ciluprevir, boceprevir, sovaprevir, paritaprevir, telaprevir, grazoprevir, and any combination thereof. Non-limiting examples of proteases derived from HCV NS3 are provided below.

Example Proteases Derived from HCV NS3

(SEQ ID NO: 1)
APITAYAQQTRGLLGCIITSLTGRDKNQVEGEVQIVSTATQTFLATCIN

GVCWAVYHGAGTRTIASPKGPVIQMYTNVDQDLVGWPAPQGSRSLTPCT

CGSSDLYLVTRHADVIPVRRRGDSRGSLLSPRPISYLKGSSGGPLLCPA

GHAVGLFRAAVCTRGVAKAVDFIPVENLETTMRSPVFTD (SEQ ID NO: 2)
APITAYAQQTRGLLGCIITSLTGRDKNOVEGEVQ1MSTATQTFLATCIN

GVCWTVYHGAGTRTIASPKGPVIQMYTNVDQDLVGWPAPQGSRSLTPCT

CGSSDLYLVTRHADVIPVRRRGDGRGSLLSPRPISYLKGSSGGPLLCPA

GHAVGLFRAAVCTRGVAKAVDFIPVENLETTMRSPVFTD (SEQ ID NO: 3)
APITAYAQQTRGLLGCIITSLTGRDKNQVEGEVQIVSTATQTFLATCIN

GVCWAVYHGAGTRTIASPKGPVIQMYTNVDQDLVGWPAPQGSRSLTPCT

CGSSDLYLVTRHADVIPVRRRGDSRGSLLSPRPISYLKGSSGGPLLCPA

GHAVGLFRAAVCTRGVAKAVDFIPVENLETTMRSPVFTD (SEQ ID NO: 4)
APITAYAQQTRGLLGCIITSLTGRDKNOVEGEVQIVSTATQTFLATCIN

GVCWTVYHGAGTRTIASPKGPVIQMYTNVDQDLVGWPAPQGSRSLTPCT

CGSSDLYLVTRHADVIPVRRRGDSRGSLLSPRPISYLKGSSGGPLLCPA

GHAVGLFRAAVCTRGVAKAVDFIPVENLETTMRSPVFTD

In some embodiments, the protease includes the sequence set forth in SEQ ID NO:1, SEQ ID NO:2, SEQ ID NO:3, or SEQ ID NO:4, or is a functional (proteolytic) variant thereof having 70% or greater, 75% or greater, 80% or greater, 85% or greater, 90% or greater, 95% or greater, or 99% or greater amino acid sequence identity to SEQ ID NO:1, SEQ ID NO:2, SEQ ID NO: 3, or SEQ ID NO:4, and/or a functional (proteolytic) fragment thereof such as a fragment having a length of from 100 to 185, 120 to 185, 140 to 185, 160 to 185, 170 to 185, from 180 to 185, from 182 to 185, or from 184 to 185 amino acids.

In some embodiments, the protease cleavage site is a viral protease cleavage site. For example, when a protease derived from HCV NS3 is employed, the cleavage site should include a NS3 protease cleavage site. An NS3 protease cleavage site may include the four junctions between nonstructural (NS) proteins of the HCV polyprotein normally cleaved by the NS3 protease during HCV infection, including the NS3/NS4A, NS4A/NS4β, NS4β/NS5A, and NS5A/NS5B junction cleavage sites. For a description of NS3 protease and representative sequences of its cleavage sites for various strains of HCV, see, e.g., Hepatitis C Viruses: *Genomes and Molecular Biology* (S. L. Tan ed., Taylor & Francis, 2006), Chapter 6, pp. 163-206; the disclosure of which is incorporated herein by reference in its entirety.

In some embodiments, the protease is derived from HCV NS3 and engineered to include one or more amino acid substitutions relative to the amino acid sequence set forth in SEQ ID NO: 1. For example, the protease may include a substitution at the position corresponding to position 54 of the amino acid sequence set forth in SEQ ID NO:1. In some embodiments, such a substitution is a threonine to alanine substitution.

NS3 nucleic acid and protein sequences may be derived from HCV, including any isolate of HCV having any genotype (e.g., seven genotypes 1-7) or subtype. A number of NS3 nucleic acid and protein sequences are known and described, e.g., in U.S. Ser. No. 15/737,712, the disclosure of which is incorporated herein by reference in their entirety for all purposes. Additional representative NS3 sequences are listed in the National Center for Biotechnology Information (NCBI) database. See, for example, NCBI entries: Accession Nos. YP_001491553, YP_001469631, YP_001469632, NP_803144, NP_671491, YP_001469634, YP_001469630, YP_001469633, ADA68311, ADA68307, AFP99000, AFP98987, ADA68322, AFP99033, ADA68330, AFP99056, AFP99041, CBF60982, CBF60817, AHH29575, AIZ00747, AIZ00744, ABI36969, ABN05226, KF516075, KF516074, KF516056, AB826684, AB826683, JX171009, JX171008, JX171000, EU847455, EF154714, GU085487, JX171065, and JX171063; all of which sequences are herein incorporated by reference. Any of these sequences or functional variants thereof having 70% or greater, 75% or greater, 80% or greater, 85% or greater, 90% or greater, 95% or greater, or 99% or greater amino acid sequence identity to any one of these sequences, or proteolytic fragments thereof, may be employed.

NS4A nucleic acid and protein sequences may be derived from HCV, including any isolate of HCV having any genotype (e.g., seven genotypes 1-7) or subtype. A number of NS4A nucleic acid and protein sequences are known. Representative NS4A sequences are listed in the National Center for Biotechnology Information (NCBI) database. See, for example, NCBI entries: Accession Nos. NP_751925, YP_001491554, GU945462, HQ822054, FJ932208, FJ932207, FJ932205, and FJ932199; all of which sequences (as entered by the date of filing of this application) are herein incorporated by reference. Any of these sequences or functional variants thereof having 70% or greater, 75% or greater, 80% or greater, 85% or greater, 90% or greater, 95% or greater, or 99% or greater amino acid sequence identity to any one of these sequences, or proteolytic fragments thereof, may be employed.

HCV polyprotein nucleic acid and protein sequences may be derived from HCV, including any isolate of HCV having any genotype (e.g., seven genotypes 1-7) or subtype. A number of HCV polyprotein nucleic acid and protein sequences are known. Representative HCV polyprotein sequences are listed in the National Center for Biotechnology Information (NCBI) database. See, for example, NCBI entries: Accession Nos. YP_001469631, NP_671491, YP_001469633, YP_001469630, YP_001469634, YP_001469632, NC_009824, NC_004102, NC_009825, NC_009827, NC_009823, NC_009826, and EF108306; all of which sequences (as entered by the date of filing of this application) are herein incorporated by reference. Any of these sequences or functional variants thereof having 70% or greater, 75% or greater, 80% or greater, 85% or greater, 90% or greater, 95% or greater, or 99% or greater amino acid sequence identity to any one of these sequences, or proteolytic fragments thereof, may be employed.

As summarized above, the cell surface receptors of the present disclosure include a protease cleavage site disposed between the extracellular binding domain and the intracellular signaling domain. The term "cleavage site" refers to the bond (e.g., a scissile bond) cleaved by an agent, e.g., a protease. A cleavage site for a protease includes the specific amino acid sequence recognized by the protease during proteolytic cleavage and may include surrounding amino acids (e.g., from one to six amino acids) on either side of the scissile bond, which bind to the active site of the protease and are needed for recognition as a substrate. In some embodiments, the cleavage site is provided as a cleavable linker, where "cleavable linker" refers to a linker including the cleavage site. A cleavable linker may include a cleavage site specific for an enzyme, such as a protease or other cleavage agent. A cleavable linker is typically cleavable under physiological conditions.

In some embodiments, the protease is derived from HCV NS3 and the cleavage site includes an NS3 protease cleavage site. An NS3 protease cleavage site may include the HCV polyprotein NS3/NS4A, NS4A/NS4β, NS4β/NS5A, and NS5A/NS5B junction cleavage sites. Representative HCV NS4A/4B protease cleavage sites include DEMEECSQH (SEQ ID NO:5) and DEMEECSQHL (SEQ ID NO:6). Representative HCV NS5A/5B protease cleavage sites include EDVVPCSMG (SEQ ID NO:7) and EDVVPCSMGS (SEQ ID NO:8). A representative NS4β/5A protease cleavage site is ECTTPCSGSWL (SEQ ID NO:9).

Also provided are functional variants of any of the particular cell surface receptors, proteases, or domains thereof (e.g., protease cleavage sites) described herein. In some embodiments, a "variant" of a cell surface receptor, protease, or domain thereof contains one or more amino acid substitutions, which may be one or more conservative amino acid substitutions. A "conservative substitution" is one in which an amino acid is substituted for another amino acid that has similar properties, such that one skilled in the art of peptide chemistry would expect the secondary structure and hydropathic nature of the cell surface receptor, protease, or domain thereof, to be substantially unchanged. Modifications may be made in the structure of the polynucleotides and polypeptides contemplated in particular embodiments, polypeptides include polypeptides having at least about and still obtain a functional molecule that encodes a variant or derivative polypeptide with desirable characteristics. When it is desired to alter the amino acid sequence of a cell surface receptor, protease, or domain thereof to create an equivalent, or even an improved, variant cell surface receptor, protease, or domain thereof, one skilled in the art, for example, can change one or more of the codons of the encoding DNA sequence.

Also provided by the present disclosure are nucleic acids encoding any of the cell surface receptors and/or proteases (e.g., extracellularly- or intracellularly-tethered protease constructs) described herein, including any of the cell surface receptors and/or proteases having any of the features (e.g., domains, etc.) and combinations thereof described hereinabove. As a result of the degeneracy of the genetic code, there are many nucleotide sequences that may encode the cell surface receptors and/or proteases of the present disclosure. Some of these polynucleotides may bear minimal homology to the nucleotide sequence of any native gene. Polynucleotides that vary due to differences in codon usage are specifically contemplated in particular embodiments, for example polynucleotides that are optimized for human and/or primate codon selection.

Shown in Table 1 below are amino acid sequences of example cell surface receptors and proteases of the present disclosure (from N- to C-terminus), and nucleotide sequences of nucleic acids encoding such cell surface receptors and proteases. Included in these examples are the CARs and proteases employed in the Experimental section below. Not shown are signal sequences initially present at the N-termini of the polypeptides. Segments/domains of the polypeptides are indicated by alternating stretches of underlined and non-underlined text, and the identities of the segments/domains are provided in the left column.

TABLE 1

Example Cell Surface Receptors and Proteases

| | |
|---|---|
| B7H3-SNIP-BBz CAR (intracellular; trans) amino acid sequence (SEQ ID NO: 10)<br>B7H3 scFv (MGA271) heavy chain<br>linker<br>B7H3 scFv (MGA271) light chain<br>linker<br>CD8 alpha hinge<br>CD8 alpha transmembrane domain<br>HCV NS3 protease cleavage site<br>linker<br>4-1BB costimulatory domain<br>CD3 zeta domain | EVQLVESGGGLVQPGGSLRLSCAASGFTFSSFGMHWVRQ APGKGLEWVAYISSDSSAIYYADTVKGRFTISRDNAKNSLYL QMNSLRDEDTAVYYCGRGRENIYYGSRLDYWGQGTTVTVS SGGGGSGGGGSGGGGSDIQLTQSPSFLSASVGDRVTITCK ASQNVDTNVAWYQQKPGKAPKALIYSASYRYSGVPSRFSG SGSGTDFTLTISSLQPEDFATYYCQQYNNYPFTFGQGTKLEI KAAATTTPAPRPPTPAPTIASQPLSLRPEACRPAAGGAVHT RGLDFACDIYIWAPLAGTCGVLLLSLVITLYCKGGGGSGGG GSGGGGSPGDEMEECSQHLPGAGSSNASRGRKKLLYIFKQ PFMRPVQTTQEEDGCSCRFPEEEEGGCELRVKFSRSADAP AYKQGQNQLYNELNLGRREEYDVLDKRRGRDPEMGGKPR RKNPQEGLYNELQKDKMAEAYSEIGMKGERRRGKGHDGL YQGLSTATKDTYDALHMQALPPR |
| B7H3-SNIP-BBz CAR (intracellular; trans) nucleic acid sequence (SEQ ID NO: 11) | GAGGTGCAGCTGGTGGAATCTGGCGGCGGACTGGTGCA GCCTGGCGGATCTCTGAGACTGAGCTGTGCCGCCAGCG GCTTCACCTTCAGCAGCTTCGGAATGCACTGGGTGCGCC AGGCCCCTGGCAAAGGACTGGAATGGGTGGCCTACATCA GCAGCGACAGCAGCGCCATCTACTACGCCGACACCGTG AAGGGCCGGTTCACCATCTCCCGGGACAACGCCAAGAAC AGCCTGTACCTGCAGATGAACTCCCTGCGGGACGAGGAC ACCGCCGTGTACTATTGCGGCAGAGGCAGAGAGAACATC TATTACGGCAGCAGACTGGACTACTGGGGCCAGGGCACA ACCGTGACAGTGTCTAGCGGAGGCGGAGGATCAGGCGG CGGAGGAAGTGGCGGAGGGGGATCTGATATCCAGCTGA CCCAGAGCCCCAGCTTCCTGAGCGCCTCTGTGGGCGAC AGAGTGACCATCACATGCAAGGCCAGCCAGAACGTGGAC ACCAACGTGGCCTGGTATCAGCAGAAGCCCGGCAAGGC CCCTAAGGCCCTGATCTACAGCGCCAGCTACCGGTACAG CGGCGTGCCCAGCAGATTTTCTGGCAGCGGCTCCGGCA CCGACTTCACCCTGACAATCAGCAGCCTGCAGCCCGAGG ACTTCGCCACCTACTACTGCCAGCAGTACAACAACTACCC TTTCACCTTCGGCCAGGGGACCAAGCTGGAAATCAAAGC GGCCGCAACCACGACGCCAGCGCCGACCACCAACAC CGGCGCCCACCATCGCGTCGCAGCCCCTGTCCCTGCGC CCAGAGGCGTGCCGGCCAGCGGCGGGGGGCAGTGC ACACGAGGGGGCTGGACTTCGCCTGTGATATCTACATCT GGGCGCCCTTGGCCGGGACTTGTGGGGTCCTTCTCCTG TCACTGGTTATCACCCTTTACTGCAAAGGTGGCGGAGGA TCTGGCGGCGGAGGAAGCGGAGGCGGCGATCTCCTGG CGACGAAATGGAAGAGTGTAGCCAGCATCTGCCTGGCGC CGGATCTAGCAATGCATCCCGGGGCAGAAAGAAACTCCT GTATATATTCAAACAACCATTTATGAGACCAGTACAAACTA CTCAAGAGGAAGATGGCTGTAGCTGCCGATTTCCAGAAG AAGAAGAAGGAGGATGTGAACTGAGAGTGAAGTTCAGCA GGAGCGCAGACGCCCCCGCGTACAAGCAGGGCCAGAAC CAGCTCTATAACGAGCTCAATCTAGGACGAAGAGAGGAG TACGATGTTTTGGACAAGAGACGTGGCCGGGACCCTGAG ATGGGGGGAAAGCCGAGAAGGAAGAACCCTCAGGAAGG CCTGTACAATGAACTGCAGAAAGATAAGATGGCGGAGGC CTACAGTGAGATTGGGATGAAAGGCGAGCGCCGGAGGG GCAAGGGGCACGATGGCCTTTACCAGGGTCTCAGTACAG CCACCAAGGACACCTACGACGCCCTTCACATGCAGGCCC TGCCACCTCGC |
| HCV NS3 Protease (Intracellularly Tethered) amino acid sequence (SEQ ID NO: 12)<br>CD20 epitope<br>linker<br>CD34 epitope<br>CD8 alpha peptide fragment<br>CD20 alpha stalk<br>CD8 alpha transmembrane<br>CD8 alpha intracellular fragment<br>linker<br>NS4a cofactor domain<br>linker<br>NS3 protease<br>NS3 helicase fragment | ACPYSNPSLCSGGGGSELPTQGTFSNVSTNVSPAKPTTTA CPYSNPSLCSGGGGSPAPRPPTPAPTIASQPLSLRPEACRP AAGGAVHTRGLDFACDIYIWAPLAGTCGVLLLSLVITLYCNH RNRRRVCKCPRPVVGSSGNSSGG TABLE 1-continued Example Cell Surface Receptors and Proteases

| | |
|---|---|
| | AACGATTGCCTCACAGCCCCTCAGTTTGCGACCCGAAGC<br>ATGCCGACCTGCGGCAGGAGGTGCTGTTCATACGCGGG<br>GCTTGGACTTTGCCTGTGACATTTATATTTGGGCTCCACT<br>CGCAGGCACATGCGGCGTGCTGTTGCTCAGTCTCGTCAT<br>AACATTGTATTGCAATCACAGGAACAGGAGGCGAGTTTG<br>CAAGTGCCCCCGACCAGTTGTCGGCAGTTCTGGGAATTC<br>CTCTGGAGGTTCTACAGGCTGCGTGGTCATAGTGGGCAG<br>GATCGTCTTGTCCGGATCCGGCACTAGTGCGCCCATCAC<br>GGCGTACGCCCAGCAGACGAGAGGCCTCCTAGGGTGTA<br>TAATCACCAGCCTGACTGGCCGGGACAAAAACCAAGTGG<br>AGGGTGAGGTCCAGATCATGTCAACTGCTACCCAAACCT<br>TCCTGGCAACGTGCATCAATGGGGTATGCTGGGCAGTCT<br>ACCACGGGGCCGGAACGAGGACCATCGCATCACCCAAG<br>GGTCCTGTCATCCAGATGTATACCAATGTGGACCAAGAC<br>CTTGTGGGCTGGCCCGCTCCTCAAGGTTCCCGCTCATTG<br>ACACCCTGTACCTGCGGCTCCTCGGACCTTTACCTGGTC<br>ACGAGGCACGCCGATGTCATTCCCGTGCGCCGGCGAGG<br>TGATGGCAGGGGTAGCCTGCTTTCGCCCCGGCCCATTTC<br>CTACTTGAAAGGCTCCTCGGGGGGTCCGCTGTTGTGCCC<br>CGCGGGACACGCCGTGGGCCTATTCAGGGCCGCGGTGT<br>GCACCCGTGGAGTGGCTAAAGCGGTGGACTTTATCCCTG<br>TGGAGAACCTAGAGACAACCATGAGATCCCCGGTGTTCA<br>CGGACAACTCCTCTCCACCAGCAGTCACCCTGACGCAC |
| B7H3-BB-SNIP-z CAR (intracellular; trans) amino acid sequence (SEQ ID NO: 14)<br>B7H3 scFv (MGA271) heavy chain<br>linker<br>B7H3 scFv (MGA271) light chain<br>linker<br>CD8 alpha hinge<br>CD8 alpha transmembrane domain<br>linker<br>4-1BB costimulatory domain<br>linker<br>HCV NS3 protease cleavage site<br>linker<br>CD3 zeta domain | EVQLVESGGGLVQPGGSLRLSCAASGFTFSSFGMHWVRQ<br><u>APGKGLEWVAYISSDSSAIYYADTVKGRFTISRDNAKNSLYL</u><br><u>QMNSLRDEDTAVYYCGRGRENIYYGSRLDYWGQGTTVTVS</u><br>SGGGGSGGGGSGGGGSDIQLTQSPSFLSASVGDRVTITCK<br><u>ASQNVDTNVAWYQQKPGKAPKALIYSASYRYSGVPSRFSG</u><br><u>SGSGTDFTLTISSLQPEDFATYYCQQYNNYPFTFGQGTKLEI</u><br>KAAATTTPAPRPPTPAPTIASQPLSLRPEACRPAAGGAVHT<br><u>RGLDFACDIYIWAPLAGTCGVLLLSLVITLYCKRGRKKLLYIF</u><br>KQPFMRPVQTTQEEDGCSCRFPEEEEGGCEGGGGSGGG<br>GSGGGGSPGDEMEECSQHLPGAGSSNASLRVKFSRSADA<br>PAYKQGQNQLYNELNLGRREEYDVLDKRRGRDPEMGGKP<br>RRKNPQEGLYNELQKDKMAEAYSEIGMKGERRRGKGHDG<br>LYQGLSTATKDTYDALHMQALPPR |
| B7H3-BB-SNIP-z CAR (intracellular; trans) nucleic acid sequence (SEQ ID NO: 15) | GAGGTGCAGCTGGTGGAATCTGGCGGCGGACTGGTGCA<br>GCCTGGCGGATCTCTGAGACTGAGCTGTGCCGCCAGCG<br>GCTTCACCTTCAGCAGCTTCGGAATGCACTGGGTGCGCC<br>AGGCCCCTGGCAAAGGACTGGAATGGGTGGCCTACATCA<br>GCAGCGACAGCAGCGCCATCTACTACGCCGACACCGTG<br>AAGGGCCGGTTCACCATCTCCCGGGACAACGCCAAGAAC<br>AGCCTGTACCTGCAGATGAACTCCCTGCGGGACGAGGAC<br>ACCGCCGTGTACTATTGCGGCAGAGGCAGAGAGAACATC<br>TATTACGGCAGCAGACTGGACTACTGGGGCCAGGGCACA<br>ACCGTGACAGTGTCTAGCGGAGGCGGAGGATCAGGCGG<br>CGGAGGAAGTGGCGGAGGGGGATCTGATATCCAGCTGA<br>CCCAGAGCCCCAGCTTCCTGAGCGCCTCTGTGGGCGAC<br>AGAGTGACCATCACATGCAAGGCCAGCCAGAACGTGGAC<br>ACCAACGTGGCCTGGTATCAGCAGAAGCCCGGCAAGGC<br>CCCTAAGGCCCTGATCTACAGCGCCAGCTACCGGTACAG<br>CGGCGTGCCCAGCAGATTTTCTGGCAGCGGCTCCGGCA<br>CCGACTTCACCCTGACAATCAGCAGCCTGCAGCCCGAGG<br>ACTTCGCCACCTACTACTGCCAGCAGTACAACAACTACCC<br>TTTCACCTTCGGCCAGGGGACCAAGCTGGAAATCAAAGC<br>GGCCGCAACCACGACGCCAGCGCCGCGACCACCAACAC<br>CGGCGCCCACCATCGCGTCGCAGCCCCTGTCCCTGCGC<br>CCAGAGGCGTGCCGGCCAGCGGCGGGGGCGCAGTGC<br>ACACGAGGGGCTGGACTTCGCCTGTGATATCTACATCT<br>GGGCGCCCTTGGCCGGGACTTGTGGGGTCCTTCTCCTG<br>TCACTGGTTATCACCCTTTACTGCAAACGGGCAGAAAG<br>AAACTCCTGTATATATTCAAACAACCATTTATGAGACCAGT<br>ACAAACTACTCAAGAGGAAGATGGCTGTAGCTGCCGATT<br>TCCAGAAGAAGAAGAGGAGGATGTGAAGGTGGCGGAG<br>GATCTGGCGGCGGAGGAAGCGGAGGCGGCGGATCTCCT<br>GGCGACGAAATGGAAGAGTGTAGCCAGCATCTGCCTGG<br>CGCCGGATCTAGCAATGCATCCCTGAGAGTGAAGTTCAG<br>CAGGAGCGCAGACGCCCCCGCGTACAAGCAGGGCCAGA<br>ACCAGCTCTATAACGAGCTCAATCTAGGACGAAGAGAGG<br>AGTACGATGTTTTGGACAAGAGACGTGGCCGGGACCCTG<br>AGATGGGGGGAAAGCCGAGAAGGAAGAACCCTCAGGAA<br>GGCCTGTACAATGAACTGCAGAAAGATAAGATGGCGGAG |

TABLE 1-continued

Example Cell Surface Receptors and Proteases

|  |  |
|---|---|
|  | GCCTACAGTGAGATTGGGATGAAAGGCGAGCGCCGGAG<br>GGGCAAGGGGCACGATGGCCTTTACCAGGGTCTCAGTA<br>CAGCCACCAAGGACACCTACGACGCCCTTCACATGCAGG<br>CCCTGCCACCTCGC |
| B7H3-SNIP-scFv CAR<br>(extracellular; cis) amino acid<br>sequence (SEQ ID NO: 16)<br>B7H3 scFv (MGA271) heavy<br>chain<br>linker<br>B7H3 scFv (MGA271) light chain<br>linker<br>HA epitope tag<br>linker<br>HCV NS3 protease cleavage site<br>linker<br>NS4A cofactor domain<br>linker<br>NS3 protease<br>NS3 helicase fragment<br>linker<br>CD8 alpha hinge<br>CD8 alpha transmembrane<br>domain<br>4-1BB costimulatory domain<br>CD3 zeta domain | EVQLVESGGGLVQPGGSLRLSCAASGFTFSSFGMHWVRQ<br>APGKGLEWVAYISSDSSAIYYADTVKGRFTISRDNAKNSLYL<br>QMNSLRDEDTAVYYCGRGRENIYYGSRLDYWGQGTTVTVS<br>SGGGGSGGGGSGGGGSDIQLTQSPSFLSASVGDRVTITCK<br>ASQNVDTNVAWYQQKPGKAPKALIYSASYRYSGVPSRFSG<br>SGSGTDFTLTISSLQPEDFATYYCQQYNNYPFTFGQGTKLEI<br>KAAAGGSGGSGRAYPYDVPDYAGGSGGSDEMEECSQHG<br>GSGGSTGCVVIVGRIVLSGSGTSAPITAYAQQTRGLLGCIITS<br>LTGRDKNQVEGEVQIMSTATQTFLATCINGVCWAVYHGAGT<br>RTIASPKGPVIQMYTNVDQDLVGWPAPQGSRSLTPCTCGS<br>SDLYLVTRHADVIPVRRRGDGRGSLLSPRPISYLKGSSGGP<br>LLCPAGHAVGLFRAAVCTRGVAKAVDFIPVENLETTMRSPV<br>FTDNSSPPAVTLTHGGSGGSGCIGAATTTPAPRPPTPAPTIA<br>SQPLSLRPEACRPAAGGAVHTRGLDFACDIYIWAPLAGTCG<br>VLLLSLVITLYCKRGRKKLLYIFKQPFMRPVQTTQEEDGCSC<br>RFPEEEEGGCELRVKFSRSADAPAYKQGQNQLYNELNLGR<br>REEYDVLDKRRGRDPEMGGKPRRKNPQEGLYNELQKDKM<br>AEAYSEIGMKGERRRGKGHDGLYQGLSTATKDTYDALHMQ<br>ALPPR |
| B7H3-SNIP-scFv CAR<br>(intracellular; trans) nucleic acid<br>sequence (SEQ ID NO: 17) | ATGGTTGCCACCCTGCTCGTGACAAGCCTGCTGCTGTGC<br>GAGCTGCCCCACCCTGCCTTTCTGCTGATCCCCGATACC<br>GAGGTGCAGCTGGTGGAATCTGGCGGCGGACTGGTGCA<br>GCCTGGCGGATCTCTGAGACTGAGCTGTGCCGCCAGCG<br>GCTTCACCTTCAGCAGCTTCGGAATGCACTGGGTGCGCC<br>AGGCCCCTGGCAAAGGACTGGAATGGGTGGCCTACATCA<br>GCAGCGACAGCAGCGCCATCTACTACGCCGACACCGTG<br>AAGGGCCGGTTCACCATCTCCCGGGACAACGCCAAGAAC<br>AGCCTGTACCTGCAGATGAACTCCCTGCGGGACGAGGAC<br>ACCGCCGTGTACTATTGCGGCAGAGGCAGAGAGAACATC<br>TATTACGGCAGCAGACTGGACTACTGGGGCCAGGGCACA<br>ACCGTGACAGTGTCTAGCGGAGGCGGAGGATCAGGCGG<br>CGGAGGAAGTGGCGGAGGGGGATCTGATATCCAGCTGA<br>CCCAGAGCCCCAGCTTCCTGAGCGCCTCTGTGGGCGAC<br>AGAGTGACCATCACATGCAAGGCCAGCCAGAACGTGGAC<br>ACCAACGTGGCCTGGTATCAGCAGAAGCCCGGCAAGGC<br>CCCTAAGGCCCTGATCTACAGCGCCAGCTACCGGTACAG<br>CGGCGTGCCCAGCAGATTTTCTGGCAGCGGCTCCGGCA<br>CCGACTTCACCCTGACAATCAGCAGCCTGCAGCCCGAGG<br>ACTTCGCCACCTACTACTGCCAGCAGTACAACAACTACCC<br>TTTCACCTTCGGCCAGGGGACCAAGCTGGAAATCAAAGC<br>GGCCGCAGGGGGCAGTGGCGGGAGCGGGCGCGCCTAT<br>CCCTACGATGTGCCCGATTACGCTGGTGGATCCGGCGG<br>GTCAGATGAGATGGAAGAGTGCTCTCAGCACGGCGGATC<br>TGGAGGTTCTACAGGCTGCGTGGTCATAGTGGGCAGGAT<br>CGTCTTGTCCGGATCCGGCACTAGTGCGCCCATCACGGC<br>GTACGCCCAGCAGACGAGAGGCCTCCTAGGGTGTATAAT<br>CACCAGCCTGACTGGCCGGGACAAAAACCAAGTGGAGG<br>GTGAGGTCCAGATCATGTCAACTGCTACCCAAACCTTCCT<br>GGCAACGTGCATCAATGGGGTATGCTGGGCAGTCTACCA<br>CGGGGCCGGAACGAGGACCATCGCATCACCCAAGGGTC<br>CTGTCATCCAGATGTATACCAATGTGGACCAAGACCTTGT<br>GGGCTGGCCCGCTCCTCAAGGTTCCCGCTCATTGACACC<br>CTGTACCTGCGGCTCCTCGGACCTTTACCTGGTCACGAG<br>GCACGCCGATGTCATTCCCGTGCGCCGGCGAGGTGATG<br>GCAGGGGTAGCCTGCTTTCGCCCCGGCCCATTTCCTACT<br>TGAAAGGCTCCTCGGGGGGTCCGCTGTTGTGCCCCGCG<br>GGACACGCCGTGGGCCTATTCAGGGCCGCGGTGTGCAC<br>CCGTGGAGTGGCTAAAGCGGTGGACTTTATCCCTGTGGA<br>GAACCTAGAGACAACCATGAGATCCCCGGTGTTCACGGA<br>CAACTCCTCTCCACCAGCAGTCACCCTGACGCACGGGGG<br>TTCAGGCGGTAGTGGATGCATTGGGGCCGCAACCACGA<br>CGCCAGCGCCGCGACCACCAACACCGGCGCCCACCATC<br>GCGTCGCAGCCCCTGTCCCTGCGCCCAGAGGCGTGCCG<br>GCCAGCGGCGGGGGCGCAGTGCACACGAGGGGCTG<br>GACTTCGCCTGTGATATCTACATCTGGGCGCCCTTGGCC<br>GGGACTTGTGGGGTCCTTCTCCTGTCACTGGTTATCACC<br>CTTTACTGCAAACGGGGCAGAAAGAAACTCCTGTATATAT<br>TCAAACAACCATTTATGAGACCAGTACAAACTACTCAAGA<br>GGAAGATGGCTGTAGCTGCCGATTCCAGAAGAAGAAGA |

TABLE 1-continued

Example Cell Surface Receptors and Proteases

```
AGGAGGATGTGAACTGAGAGTGAAGTTCAGCAGGAGCG
CAGACGCCCCGCGTACAAGCAGGGCCAGAACCAGCTC
TATAACGAGCTCAATCTAGGACGAAGAGAGGAGTACGAT
GTTTTGGACAAGAGACGTGGCCGGGACCCTGAGATGGG
GGGAAAGCCGAGAAGGAAGAACCCTCAGGAAGGCCTGT
ACAATGAACTGCAGAAAGATAAGATGGCGGAGGCCTACA
GTGAGATTGGGATGAAAGGCGAGCGCCGGAGGGGCAAG
GGGCACGATGGCCTTTACCAGGGTCTCAGTACAGCCACC
AAGGACACCTACGACGCCCTTCACATGCAGGCCCTGCCA
CCTCGC
```

Also provided are expression vectors that include any of the nucleic acids of the present disclosure. A "vector" is capable of transferring nucleic acid sequences to target cells (e.g., viral vectors, non-viral vectors, particulate carriers, and liposomes). Typically, "vector construct," "expression vector," and "gene transfer vector," mean any nucleic acid construct capable of directing the expression of a nucleic acid of interest and which can transfer nucleic acid sequences to target cells. Thus, the term includes cloning and expression vehicles, as well as viral vectors.

In order to express a desired cell surface receptor and/or protease, a nucleotide sequence encoding the cell surface receptor and/or protease can be inserted into an appropriate vector, e.g., using recombinant DNA techniques known in the art. Exemplary viral vectors include, without limitation, retrovirus (including lentivirus), adenovirus, adeno-associated virus, herpesvirus (e.g., herpes simplex virus), poxvirus, papillomavirus, and papovavirus (e.g., SV40). Illustrative examples of expression vectors include, but are not limited to pClneo vectors (Promega) for expression in mammalian cells; pLenti4/V 5-DEST™, pLenti6/V 5-DEST™, murine stem cell virus (MSCV), MSGV, moloney murine leukemia virus (MMLV), and pLenti6.2/V5-GW/lacZ (Invitrogen) for lentivirus-mediated gene transfer and expression in mammalian cells. In certain embodiments, a nucleic acid sequence encoding a cell surface receptor and/or protease of the present disclosure may be ligated into any such expression vectors for the expression of the cell surface receptor and/or protease in mammalian cells.

In some embodiments, when the cell surface receptor and the protease are employed in trans, the cell surface receptor and the protease are expressed from separate expression vectors. In some embodiments, when the cell surface receptor and the protease are employed in trans, the cell surface receptor and the protease are expressed from the same expression vector. In some embodiments, such an expression vector is a bicistronic expression vector where the cell surface receptor and the protease are expressed under the same promoter. For example, the expression vector may include an internal ribosome entry site (IRES) or a ribosome skipping site (sometimes referred to as a self-cleaving peptide sequence) such as a porcine teschovirus-1 2A (P2A) sequence, Thosea asigna virus 2A (T2A) sequence, foot-and-mouth disease virus 2A (F2A) sequence, and equine rhinitis A virus 2A (E2A) sequence between the cell surface receptor and the protease, permitting the cell surface receptor and the protease to be expressed as separate polypeptides from the same promoter. Further details regarding ribosome skipping sites for use in polycistronic vectors may be found, e.g., in Liu et al. (2017) Scientific Reports 7:2193.

Expression control sequences, control elements, or regulatory sequences present in an expression vector are those non-translated regions of the vector—origin of replication, selection cassettes, promoters, enhancers, translation initiation signals (Shine Dalgarno sequence or Kozak sequence), introns, a polyadenylation sequence, 5' and 3' untranslated regions, and/or the like-which interact with host cellular proteins to carry out transcription and translation. Such elements may vary in their strength and specificity. Depending on the vector system and host utilized, any number of suitable transcription and translation elements, including ubiquitous promoters and inducible promoters may be used.

Components of the expression vector are operably linked such that they are in a relationship permitting them to function in their intended manner. In some embodiments, the term refers to a functional linkage between a nucleic acid expression control sequence (such as a promoter, and/or enhancer) and a second polynucleotide sequence, e.g., a nucleic acid encoding the cell surface receptor and/or the protease, where the expression control sequence directs transcription of the nucleic acid encoding the cell surface receptor and/or the protease.

In some embodiments, the expression vector is an episomal vector or a vector that is maintained extrachromosomally. As used herein, the term "episomal" refers to a vector that is able to replicate without integration into the host cell's chromosomal DNA and without gradual loss from a dividing host cell also meaning that said vector replicates extrachromosomally or episomally. Such a vector may be engineered to harbor the sequence coding for the origin of DNA replication or "ori" from an alpha, beta, or gamma herpesvirus, an adenovirus, SV40, a bovine papilloma virus, a yeast, or the like. The host cell may include a viral replication transactivator protein that activates the replication. Alpha herpes viruses have a relatively short reproductive cycle, variable host range, efficiently destroy infected cells and establish latent infections primarily in sensory ganglia. Illustrative examples of alpha herpes viruses include HSV 1, HSV 2, and VZV. Beta herpesviruses have long reproductive cycles and a restricted host range. Infected cells often enlarge. Non-limiting examples of beta herpes viruses include CMV, HHV-6 and HHV-7. Gamma-herpesviruses are specific for either T or B lymphocytes, and latency is often demonstrated in lymphoid tissue. Illustrative examples of gamma herpes viruses include EBV and HHV-8.

Other gene delivery systems which may be used include mRNA electroporation, CRISPR-Cas9, TALENs, zinc fingers, transposase vectors, and the like. See, e.g., Labanieh et al. (2018) Nature Biomedical Engineering 2:377-391.

Cells

Also provided are cells that include any of the cell surface receptors, proteases, nucleic acids, and/or expression vectors of the present disclosure. In certain aspects, provided are cells where a cell surface receptor and/or a protease of the present disclosure is expressed on the surface of the cell. By "expressed on the surface of the cell" is meant the cell surface receptor and/or a protease has been trafficked to the cell membrane such that—in the case of a cell surface receptor—the extracellular binding domain is displayed on the cell surface, the transmembrane portion passes through the cell membrane, and the one or more intracellular signaling domains are disposed adjacent to the intracellular side of the cell membrane. Upon binding of the extracellular binding domain to the target ligand/antigen, the intracellular signaling domain of the cell surface receptor participates in transducing the signal from the binding into the interior of the cell (e.g., an effector cell, such as a T cell, to elicit effector cell function).

In some embodiments, the cells are eukaryotic cells. Eukaryotic cells of interest include, but are not limited to, yeast cells, insect cells, mammalian cells, and the like. Mammalian cells of interest include, e.g., murine cells, non-human primate cells, human cells, and the like.

"Recombinant host cells," "host cells," "cells," "cell lines," "cell cultures," and other such terms denoting microorganisms or higher eukaryotic cell lines, refer to cells which can be, or have been, used as recipients for a recombinant vector or other transferred DNA, and include the progeny of the cell which has been transfected. Host cells may be cultured as unicellular or multicellular entities (e.g., tissue, organs, or organoids) including an expression vector of the present disclosure.

In one aspect, the cells provided herein include immune cells. Non-limiting examples of immune cells which may include any of the cell surface receptors, proteases, nucleic acids, and/or expression vectors of the present disclosure include T cells, B cells, natural killer (NK) cells, a macrophages, monocytes, neutrophils, dendritic cells, mast cells, basophils, and eosinophils. In some embodiments, the immune cell comprises a T cell. Examples of T cells include naive T cells ($T_N$), cytotoxic T cells ($T_{CTL}$), memory T cells ($T_{MEM}$), T memory stem cells ($T_{SCM}$), central memory T cells ($T_{CM}$), effector memory T cells ($T_{EM}$), tissue resident memory T cells ($T_{RM}$), effector T cells ($T_{EFF}$), regulatory T cells ($T_{REGs}$), helper T cells ($T_H$, $T_H1$, $T_H2$, $T_H17$) CD4+ T cells, CD8+ T cells, virus-specific T cells, alpha beta T cells ($T_{\alpha\beta}$), and gamma delta T cells ($T_{\gamma\delta}$). In some embodiments, the cell is a T cell and the cell surface receptor is a CAR, e.g., any of the CARs described herein. In another aspect, the cells provided herein comprise stem cells, e.g., an embryonic stem cell or an adult stem cell.

In one aspect, the cells provided herein comprise stem cells and progenitor cells. Non-limiting examples of stem cells which may include any of the cell surface receptors, proteases, nucleic acids, and/or expression vectors of the present disclosure include hematopoietic stem cells (HSCs), induced pluripotent stem cells (iPSCs), mesenchymal stem cells (MSCs), and neural stem cells (NSCs).

When a cell of the present disclosure includes the protease for use in a SNIP system, the protease may be a soluble cytosolic protease (that is—not associated/tethered to a membrane), or the protease may be tethered intracellularly or extracellularly to the cell membrane. In some embodiments, when a cell of the present disclosure includes the protease for use in a SNIP system, the receptor further includes the protease—that is, the protease is integrated into the receptor.

Also provided are methods of making the cells of the present disclosure. In some embodiments, such methods include transfecting or transducing cells with a nucleic acid or expression vector of the present disclosure. The term "transfection" or "transduction" is used to refer to the introduction of foreign DNA into a cell. A cell has been "transfected" when exogenous DNA has been introduced inside the cell membrane. A number of transfection techniques are generally known in the art. See, e.g., Sambrook et al. (2001) Molecular Cloning, a laboratory manual, 3rd edition, Cold Spring Harbor Laboratories, New York, Davis et al. (1995) Basic Methods in Molecular Biology, 2nd edition, McGraw-Hill, and Chu et al. (1981) Gene 13:197. Such techniques can be used to introduce one or more exogenous DNA moieties into suitable host cells. The term refers to both stable and transient uptake of the genetic material.

In some embodiments, a cell of the present disclosure is produced by transfecting the cell with a viral vector encoding the cell surface receptor. In some embodiments, the cell surface receptor is a CAR and the cell is a T cell, such that provided are methods of producing a CAR T cell. In some embodiments, such methods include activating a population of T cells (e.g., T cells obtained from an individual to whom a CAR T cell therapy will be administered), stimulating the population of T cells to proliferate, and transducing the T cell with a viral vector encoding the CAR. In some embodiments, the T cells are transduced with a retroviral vector, e.g., a gamma retroviral vector or a lentiviral vector, encoding the CAR. In some embodiments, the T cells are transduced with a lentiviral vector encoding the CAR.

Cells of the present disclosure may be autologous/autogeneic ("self") or non-autologous ("non-self," e.g., allogeneic, syngeneic or xenogeneic). "Autologous" as used herein, refers to cells from the same individual. "Allogeneic" as used herein refers to cells of the same species that differ genetically from the cell in comparison. "Syngeneic," as used herein, refers to cells of a different individual that are genetically identical to the cell in comparison. In some embodiments, the cells are T cells obtained from a mammal. In some embodiments, the mammal is a primate. In some embodiments, the primate is a human.

T cells may be obtained from a number of sources including, but not limited to, peripheral blood, peripheral blood mononuclear cells, bone marrow, lymph node tissue, cord blood, thymus tissue, tissue from a site of infection, ascites, pleural effusion, spleen tissue, and tumors. In certain embodiments, T cells can be obtained from a unit of blood collected from an individual using any number of known techniques such as sedimentation, e.g., FICOLL™ separation.

In some embodiments, an isolated or purified population of T cells is used. In some embodiments, $T_{CTL}$ and $T_H$ lymphocytes are purified from PBMCs. In some embodiments, the $T_{CTL}$ and $T_H$ lymphocytes are sorted into naïve ($T_N$), memory ($T_{MEM}$), and effector ($T_{EFF}$) T cell subpopulations either before or after activation, expansion, and/or genetic modification. Suitable approaches for such sorting are known and include, e.g., magnetic-activated cell sorting (MACS), where TN are CD45RA$^+$CD62L$^+$CD95$^-$; TSCM are CD45RA$^+$CD62L$^+$CD95$^+$; TCM are CD45RO$^+$CD62L$^+$ CD95$^+$; and TEM are CD45RO$^+$CD62L CD95$^+$. An example approach for such sorting is described in Wang et al. (2016) Blood 127 (24): 2980-90.

A specific subpopulation of T cells expressing one or more of the following markers: CD3, CD4, CD8, CD28, CD45RA, CD45RO, CD62, CD127, and HLA-DR can be further isolated by positive or negative selection techniques. In some embodiments, a specific subpopulation of T cells, expressing one or more of the markers selected from the group consisting of CD62L, CCR7, CD28, CD27, CD122, CD127, CD197; or CD38 or CD62L, CD127, CD197, and CD38, is further isolated by positive or negative selection techniques. In some embodiments, the manufactured T cell compositions do not express one or more of the following markers: CD57, CD244, CD 160, PD-1, CTLA4, TIM3, and LAG3. In some embodiments, the manufactured T cell compositions do not substantially express one or more of the following markers: CD57, CD244, CD 160, PD-1, CTLA4, TIM3, and LAG3.

In order to achieve therapeutically effective doses of T cell compositions, the T cells may be subjected to one or more rounds of stimulation, activation and/or expansion. T cells can be activated and expanded generally using methods as described, for example, in U.S. Pat. Nos. 6,352,694; 6,534,055; 6,905,680; 6,692,964; 5,858,358; 6,887,466; 6,905,681; 7,144,575; 7,067,318; 7,172,869; 7,232,566; 7,175,843; 5,883,223; 6,905,874; 6,797,514; and 6,867,041, each of which is incorporated herein by reference in its entirety for all purposes. In some embodiments, T cells are activated and expanded for about 1 to 21 days, e.g., about 5 to 21 days. In some embodiments, T cells are activated and expanded for about 1 day to about 4 days, about 1 day to about 3 days, about 1 day to about 2 days, about 2 days to about 3 days, about 2 days to about 4 days, about 3 days to about 4 days, or about 1 day, about 2 days, about 3 days, or about 4 days prior to introduction of a nucleic acid (e.g., expression vector) encoding the polypeptide into the T cells.

In some embodiments, T cells are activated and expanded for about 6 hours, about 12 hours, about 18 hours or about 24 hours prior to introduction of a nucleic acid (e.g., expression vector) encoding the cell surface receptor the into the T cells. In some embodiments, T cells are activated at the same time that a nucleic acid (e.g., an expression vector) encoding the cell surface receptor is introduced into the T cells.

In some embodiments, conditions appropriate for T cell culture include an appropriate media (e.g., Minimal Essential Media or RPMI Media 1640 or, X-vivo 15, (Lonza)) and one or more factors necessary for proliferation and viability including, but not limited to serum (e.g., fetal bovine or human serum), interleukin-2 (IL-2), insulin, IFN-γ, IL-4, IL-7, IL-21, GM-CSF, IL-10, IL-12, IL-15, TGFβ, and TNF-α or any other additives suitable for the growth of cells known to the skilled artisan. Further illustrative examples of cell culture media include, but are not limited to RPMI 1640, Clicks, AEVI-V, DMEM, MEM, a-MEM, F-12, X-Vivo 15, and X-Vivo 20, Optimizer, with added amino acids, sodium pyruvate, and vitamins, either serum-free or supplemented with an appropriate amount of serum (or plasma) or a defined set of hormones, and/or an amount of cytokine(s) sufficient for the growth and expansion of T cells.

In some embodiments, the nucleic acid (e.g., an expression vector) encoding the cell surface receptor is introduced into the cell (e.g., a T cell) by microinjection, transfection, lipofection, heat-shock, electroporation, transduction, gene gun, microinjection, DEAE-dextran-mediated transfer, and the like. In some embodiments, the nucleic acid (e.g., expression vector) encoding the cell surface receptor is introduced into the cell (e.g., a T cell) by AAV transduction. The AAV vector may comprise ITRs from AAV2, and a serotype from any one of AAV1, AAV2, AAV3, AAV4, AAV5, AAV6, AAV7, AAV8, AAV9, or AAV 10. In some embodiments, the AAV vector comprises ITRs from AAV2 and a serotype from AAV6. In some embodiments, the nucleic acid (e.g., expression vector) encoding the cell surface receptor is introduced into the cell (e.g., a T cell) by lentiviral transduction. The lentiviral vector backbone may be derived from HIV-1, HIV-2, visna-maedi virus (VMV) virus, caprine arthritis-encephalitis virus (CAEV), equine infectious anemia virus (EIAV), feline immunodeficiency virus (FIV), bovine immune deficiency virus (BIV), or simian immunodeficiency virus (SIV). The lentiviral vector may be integration competent or an integrase deficient lentiviral vector (TDLV). In one embodiment, IDLV vectors including an HIV-based vector backbone (i.e., HIV cis-acting sequence elements) are employed.

Also provided are viruses that include any of the cell surface receptors, nucleic acids, and/or expression vectors of the present disclosure.

Compositions

In another aspect, provided herein are compositions comprising any of the cell surface receptors, proteases, nucleic acids, expression vectors, and/or cells described herein.

In some embodiments, the compositions include any of the cell surface receptors, proteases, nucleic acids, expression vectors, and/or cells of the present disclosure present in a liquid medium. The liquid medium may be an aqueous liquid medium, such as water, a buffered solution, or the like. One or more additives such as a salt (e.g., NaCl, $MgCl_2$, KCl, $MgSO_4$), a buffering agent (a Tris buffer, N-(2-Hydroxyethyl) piperazine-N'-(2-ethanesulfonic acid) (HEPES), 2-(N-Morpholino) ethanesulfonic acid (MES), 2-(N-Morpholino) ethanesulfonic acid sodium salt (MES), 3-(N-Morpholino) propanesulfonic acid (MOPS), N-tris [Hydroxymethyl]methyl-3-aminopropanesulfonic acid (TAPS), etc.), a solubilizing agent, a detergent (e.g., a non-ionic detergent such as Tween-20, etc.), a nuclease inhibitor, glycerol, a chelating agent, and the like may be present in such compositions.

Pharmaceutical compositions are also provided. The pharmaceutical compositions may include any of the cells of the present disclosure, and a pharmaceutically acceptable carrier. The pharmaceutical compositions generally include a therapeutically effective amount of the cells. By "therapeutically effective amount" is meant a number of cells sufficient to produce a desired result, e.g., an amount sufficient to effect beneficial or desired therapeutic (including preventative) results, such as a reduction in a symptom of a disease or disorder associated, e.g., with the target cell or a population thereof, as compared to a control. An effective amount can be administered in one or more administrations.

The cells of the present disclosure can be incorporated into a variety of formulations for therapeutic administration. More particularly, the cells of the present disclosure can be formulated into pharmaceutical compositions by combination with appropriate, pharmaceutically acceptable excipients or diluents.

Formulations of the cells suitable for administration to a patient (e.g., suitable for human administration) are generally sterile and may further be free of detectable pyrogens or other contaminants contraindicated for administration to a patient according to a selected route of administration.

The cells may be formulated for parenteral (e.g., intravenous, intra-arterial, intraosseous, intramuscular, intracerebral, intracerebroventricular, intrathecal, subcutaneous, etc.) administration, or any other suitable route of administration.

Pharmaceutical compositions that include the cells of the present disclosure may be prepared by mixing the cells having the desired degree of purity with optional physiologically acceptable carriers, excipients, stabilizers, surfactants, buffers and/or tonicity agents. Acceptable carriers, excipients and/or stabilizers are nontoxic to recipients at the dosages and concentrations employed, and include buffers such as phosphate, citrate, and other organic acids; antioxidants including ascorbic acid, glutathione, cysteine, methionine and citric acid; preservatives (such as ethanol, benzyl alcohol, phenol, m-cresol, p-chlor-m-cresol, methyl or propyl parabens, benzalkonium chloride, or combinations thereof); amino acids such as arginine, glycine, ornithine, lysine, histidine, glutamic acid, aspartic acid, isoleucine, leucine, alanine, phenylalanine, tyrosine, tryptophan, methionine, serine, proline and combinations thereof; monosaccharides, disaccharides and other carbohydrates; low molecular weight (less than about 10 residues) polypeptides; proteins, such as gelatin or serum albumin; chelating agents such as EDTA; sugars such as trehalose, sucrose, lactose, glucose, mannose, maltose, galactose, fructose, sorbose, raffinose, glucosamine, N-methylglucosamine, galactosamine, and neuraminic acid; and/or non-ionic surfactants such as Tween, Brij Pluronics, Triton-X, or polyethylene glycol (PEG).

An aqueous formulation of the cell surface receptors, proteases, nucleic acids, expression vectors, and/or cells may be prepared in a pH-buffered solution, e.g., at pH ranging from about 4.0 to about 7.0, or from about 5.0 to about 6.0, or alternatively about 5.5. Examples of buffers that are suitable for a pH within this range include phosphate-, histidine-, citrate-, succinate-, acetate-buffers and other organic acid buffers. The buffer concentration can be from about 1 mM to about 100 mM, or from about 5 mM to about 50 mM, depending, e.g., on the buffer and the desired tonicity of the formulation.

A tonicity agent may be included in the formulation to modulate the tonicity of the formulation. Example tonicity agents include sodium chloride, potassium chloride, glycerin and any component from the group of amino acids, sugars as well as combinations thereof. In some embodiments, the aqueous formulation is isotonic, although hypertonic or hypotonic solutions may be suitable. The term "isotonic" denotes a solution having the same tonicity as some other solution with which it is compared, such as physiological salt solution or serum. Tonicity agents may be used in an amount of about 5 mM to about 350 mM, e.g., in an amount of 100 mM to 350 mM.

A surfactant may also be added to the formulation to reduce aggregation and/or minimize the formation of particulates in the formulation and/or reduce adsorption. Example surfactants include polyoxyethylensorbitan fatty acid esters (Tween), polyoxyethylene alkyl ethers (Brij), alkylphenylpolyoxyethylene ethers (Triton-X), polyoxyethylene-polyoxypropylene copolymer (Poloxamer, Pluronic), and sodium dodecyl sulfate (SDS). Examples of suitable polyoxyethylenesorbitan-fatty acid esters are polysorbate 20, (sold under the trademark Tween 20TM) and polysorbate 80 (sold under the trademark Tween 80™). Examples of suitable polyethylene-polypropylene copolymers are those sold under the names Pluronic® F68 or Poloxamer 188™. Examples of suitable Polyoxyethylene alkyl ethers are those sold under the trademark Brij™. Example concentrations of surfactant may range from about 0.001% to about 1% w/v.

In some embodiments, the pharmaceutical composition includes cells of the present disclosure, and one or more of the above-identified agents (e.g., a surfactant, a buffer, a stabilizer, a tonicity agent) and is essentially free of one or more preservatives, such as ethanol, benzyl alcohol, phenol, m-cresol, p-chlor-m-cresol, methyl or propyl parabens, benzalkonium chloride, and combinations thereof. In other embodiments, a preservative is included in the formulation, e.g., at concentrations ranging from about 0.001 to about 2% (w/v).

In certain aspects, provided is a pharmaceutical composition that includes a therapeutically effective amount of cells (e.g., T cells, such as CAR T cells) of the present disclosure. A "therapeutically effective amount" of such cells may vary according to factors such as the disease state, age, sex, and weight of the individual, and the ability of the cells to elicit a desired response in the individual. A therapeutically effective amount is also one in which any toxic or detrimental effects of the cells are outweighed by the therapeutically beneficial effects. The term "therapeutically effective amount" includes an amount that is effective to "treat" an individual (e.g., a patient). When a therapeutic amount is indicated, the precise amount of the compositions contemplated in particular embodiments, to be administered, can be determined by a physician in view of the specification and with consideration of individual differences in age, weight, tumor size, extent of infection or metastasis, and condition of the patient (individual). In some embodiments, a pharmaceutical composition of the present disclosure includes from $1 \times 10^6$ to $5 \times 10^{10}$ of the cells of the present disclosure.

Methods of Use

In another aspect, provided herein are methods that employ the cell surface receptors, proteases, nucleic acids, expression vectors, and/or cells described herein.

In certain embodiments, methods for regulating signaling of a cell surface receptor are provided. Such methods include contacting a cell of the present disclosure with an inhibitor of the protease when signaling through the cell surface receptor is desired. In some embodiments, the protease is derived from HCV NS3, and the inhibitor of the protease is selected from imeprevir, danoprevir, asunaprevir, grazoprevir, simeprevir, ciluprevir, boceprevir, sovaprevir, paritaprevir, telaprevir, and any combination thereof. The methods may be carried out in vitro or ex vivo (e.g., in cultured cells), or in vivo, e.g., in an individual in a therapeutic context (e.g., an individual receiving a regulatable CAR cell-based therapy of the present disclosure). In some embodiments, the methods for regulating signaling of a cell surface receptor further include ceasing the contacting when signaling through the cell surface receptor is no longer desired.

In some embodiments, provided are methods of administering a regulatable cell-based therapy (e.g., CAR cell-based therapy) to an individual in need thereof. In some embodiments, the individual in need thereof has cancer, and the cell surface receptor (e.g., CAR) binds to a molecule on the surface of cells of the cancer. The methods of administering a regulatable cell-based therapy to the individual include administering to the individual a pharmaceutical composition that includes cells that express any of the cell surface receptors of the present disclosure on the cell surface and a compatible protease, e.g., a protease that is part of the receptor, a cytosolic protease, an intracellularly tethered protease, or an extracellularly tethered protease, where the protease cleavage site is a cleavage site for the protease. The pharmaceutical composition typically includes a therapeutically effective amount of such cells as described above. The cells may be any cells capable of effecting the desired therapy. In some embodiments, the cells are immune cells. Non-limiting examples of immune cells which may be administered include T cells, B cells, natural killer (NK) cells, macrophages, monocytes, neutrophils, dendritic cells, mast cells, basophils, and eosinophils. In some embodiments, the cells are T cells. In some embodiments, the cells are T cells and the cell surface receptor is a CAR, such that the cells are CAR T cells. In some embodiments, the cells are stem cells, e.g., embryonic stem cells or adult stem cells. In some embodiments, the pharmaceutical composition is produced by a method including removing cells from the individual and introducing into the removed cells or progeny thereof the desired nucleic acid or expression vector.

The methods of administering a regulatable cell-based therapy to an individual may further include contacting the administered cells or progeny thereof with an inhibitor of the protease when signaling through the cell surface receptor is desired, where the contacting includes administering the inhibitor of the protease to the individual. Contacting the administered cells or progeny thereof with the protease inhibitor may include administering to the individual an amount of the inhibitor effective to inhibit the protease. As just one example, when the protease is derived from HCV NS3 as described elsewhere herein, the contacting may include administering to the individual by a suitable route of administration simeprevir, danoprevir, asunaprevir, ciluprevir, boceprevir, sovaprevir, paritaprevir, telaprevir, grazoprevir, or any combination thereof, in an amount effective to inhibit the protease expressed by the administered cells or progeny thereof. According to the methods of administering a regulatable cell-based therapy to an individual, the inhibitor of the protease may be administered to the individual prior to, concurrently with (that is, co-administered), and/or subsequent to administration of the pharmaceutical composition to the individual.

The methods of administering a regulatable cell-based therapy to an individual may further include ceasing administration of the protease inhibitor when signaling through the cell surface receptor is no longer desired. Signaling through the cell surface receptor may no longer be desired for a variety of reasons. For example, in the case of CAR T cells, such signaling may not be desired in order to prevent or delay the onset of cell exhaustion (e.g., T cell exhaustion) resulting from CAR activity. As such, the inhibitor of the protease may be withheld to prevent or delay the onset of cell exhaustion resulting from CAR activity. As another example, such expression may not be desired in order to reduce adverse side effects caused by the cells or progeny thereof, e.g., side effects relating to activity of the CAR expressed on the surface of the cells or progeny thereof.

In some embodiments, the protease inhibitor is provided in such a manner to yield a receptor (e.g., CAR) activation profile that: (1) promotes persistence of the cells that include the receptor (e.g., CAR-T cells); (2) promotes the formation of memory T cells ($T_{MEM}$), T memory stem cells ($T_{SCM}$), central memory T cells ($T_{CM}$), and/or effector memory T cells ($T_{EM}$); (3) promotes long-term functionality and proliferative potential of T cells; and/or reduces activation induced cell death (AICD) of T cells. The beneficial effects of providing CAR-T cells with periods of rest are described, e.g., in Viaud et al. (2018) *PNAS* 115 (46): E10898-E10906.

According to the methods of administering a regulatable cell-based therapy (e.g., CAR T cell-based therapy), the methods may include administering the pharmaceutical composition to the individual under conditions in which the protease inhibitor is present in the individual in an amount effective to allow signaling of the cell surface receptor expressed by the cells or progeny thereof in the individual, and subsequently ceasing administration of the protease inhibitor when signaling of the cell surface receptor expressed by the cells or progeny thereof is no longer desired. Signaling through the cell surface receptor may no longer be desired for one or more reasons. For example, signaling of a CAR expressed on the surface of T cells may no longer be desired in order to delay or prevent cell exhaustion resulting from CAR signaling. Accordingly, the methods may include withholding or ceasing administration of the protease inhibitor to delay or prevent cell exhaustion resulting from CAR activity. In some embodiments, T cell exhaustion resulting from CAR activity may be due to antigen-independent tonic signaling and/or prolonged antigen-dependent signaling through antigen engagement. Alternatively, or additionally, signaling through a CAR may no longer be desired because of adverse side effects caused by the cells or progeny thereof, such that the methods may include ceasing administration of the protease inhibitor to reduce adverse side effects caused by the cells or progeny thereof. Adverse side effects may include, but are not limited to, off tumor effects, toxicity resulting from, e.g., unrestricted antigen-driven proliferation of the cells, and the like. Such toxicity may include cytokine release syndrome and/or neurotoxicity. Accordingly, in some embodiments, the methods may further include ceasing administration of the protease inhibitor to reduce adverse side effects caused by the cells or progeny thereof.

In some embodiments, signaling of the receptor (e.g., a CAR) is regulated in order to optimize the activation profile of the cells that include the receptor, e.g., CAR T cells. Optimizing the activation profile finds use, e.g., for retaining high functionality and persistence. For example, with respect to CAR T cells, "always on" CAR-T cells may tend to have a higher fraction of short-lived effector T cell subsets, whereas regulated CAR-T cells may be tuned so that they have a higher fraction of long-lived memory T cell subsets. Regulated CAR T cells may also be able to undergo more rounds of expansion than unregulated CAR-T cells.

In some embodiments, the amount of signaling through the receptor is tuned by selecting a protease cleavage site having a particular "strength" (where a "stronger" cleavage site is cleaved by the protease more efficiently than a "weaker" cleavage site is cleaved by the protease), the amount of the protease inhibitor administered to the individual, or a combination thereof. By way of example, when the protease is derived from HCV NS3, non-limiting examples of protease cleavage sites having varying strengths are provided in Example 4 below.

When the protease is derived from HCV NS3, the methods of administering a regulatable cell-based therapy to an individual may include administering a protease inhibitor selected from imeprevir, danoprevir, asunaprevir, grazoprevir, simeprevir, ciluprevir, boceprevir, sovaprevir, paritaprevir, telaprevir, and any combination thereof, when signaling through the cell surface receptor is desired.

The methods of administering a regulatable cell-based therapy to an individual may further include producing the pharmaceutical composition. Producing the pharmaceutical composition may include introducing an expression vector of the present disclosure into cells or progeny thereof obtained from the individual. The introducing may include contacting the cells or progeny thereof obtained from the individual with an inhibitor of the protease prior to administering the pharmaceutical composition to the individual.

Kits

Also provided by the present disclosure are kits. In some embodiments, provided are kits that include any of the nucleic acids and/or expression vectors of the present disclosure, and instructions for introducing the nucleic acid or expression vector into a cell. In some embodiments, the expression vector encodes a protease, where the protease cleavage site is a cleavage site for the protease. In some embodiments, the expression vector is configured to express the cell surface receptor and the protease from the same promoter. For example, the expression vector may be a bicistronic expression vector for expression of separate cell surface receptor and protease molecules under the same promoter.

The kits find use in a variety of in vitro, ex vivo, and in vivo applications. The instructions of such kits may further include instructions for regulatable signaling through the cell surface receptor. For example, the instructions of such kits may further include instructions for contacting the cell or progeny thereof with an inhibitor of the protease when signaling through the cell surface receptor is desired. The instructions of such kits may further include instructions for withholding the protease inhibitor and/or ceasing contacting of the inhibitor when signaling through the cell surface receptor is not/no longer desired.

The kits of the present disclosure may further include any other reagents useful for regulatable signaling of the cell surface receptor, such as transfection/transduction reagents useful for introducing the nucleic acid or expression vector into a cell of interest, e.g., a T cell or other cell of interest.

In some embodiments, the kits further include an inhibitor of the protease. For example, when a protease derived from HCV NS3 as described elsewhere herein is employed, the kit may include a suitable inhibitor of the protease, including but not limited to, imeprevir, danoprevir, asunaprevir, grazoprevir, simeprevir, ciluprevir, boceprevir, sovaprevir, paritaprevir, telaprevir, or any combination thereof.

Components of the kits may be present in separate containers, or multiple components may be present in a single container. A suitable container includes a single tube (e.g., vial), one or more wells of a plate (e.g., a 96-well plate, a 384-well plate, etc.), or the like.

The instructions of the kits may be recorded on a suitable recording medium. For example, the instructions may be printed on a substrate, such as paper or plastic, etc. As such, the instructions may be present in the kits as a package insert, in the labeling of the container of the kit or components thereof (i.e., associated with the packaging or sub-packaging), etc. In other embodiments, the instructions are present as an electronic storage data file present on a suitable computer readable storage medium, e.g., portable flash drive, DVD, CD-ROM, diskette, etc. In yet other embodiments, the actual instructions are not present in the kit, but means for obtaining the instructions from a remote source, e.g. via the internet, are provided. An example of this embodiment is a kit that includes a web address where the instructions can be viewed and/or from which the instructions can be downloaded. As with the instructions, the means for obtaining the instructions is recorded on a suitable substrate.

Notwithstanding the appended claims, the present disclosure is also defined by the following embodiments:

1. An engineered cell surface receptor comprising:
   an extracellular binding domain;
   a transmembrane domain;
   an intracellular signaling domain; and a protease cleavage site disposed between the extracellular binding domain and the intracellular signaling domain.
2. The cell surface receptor of embodiment 1, wherein the cell surface receptor is a chimeric antigen receptor (CAR).
3. The cell surface receptor of embodiment 2, wherein the protease cleavage site is disposed between the extracellular binding domain and the transmembrane domain.
4. The cell surface receptor of embodiment 2, wherein the protease cleavage site is disposed between the transmembrane domain and the intracellular signaling domain.
5. The cell surface receptor of any one of embodiments 2 to 4, wherein:
   the intracellular signaling domain is a first intracellular signaling domain;
   the CAR further comprises a second intracellular signaling domain disposed between the transmembrane domain and the first intracellular signaling domain; and
   the protease cleavage site is disposed between the second intracellular signaling domain and the first intracellular signaling domain.
6. The cell surface receptor of embodiment 5, wherein the first and second intracellular signaling domains are independently selected from the group consisting of: a CD3ζ intracellular signaling domain, a CD28 intracellular signaling domain, a 4-1BB intracellular signaling domain, an OX-40 intracellular signaling domain, an inducible co-stimulator (ICOS) intracellular signaling domain, an CD27 intracellular signaling domain, and a MyD88/CD40 intracellular signaling domain.
7. The cell surface receptor of embodiment 6, wherein the first intracellular signaling domain is a CD3ζ intracellular signaling domain and the second intracellular signaling domain is a CD28 intracellular signaling domain.
8. The cell surface receptor of embodiment 6, wherein the first intracellular signaling domain is a CD3ζ intracellular signaling domain and the second intracellular signaling domain is a 4-1BB intracellular signaling domain.
9. The cell surface receptor of any one of embodiments 2 to 8, wherein the extracellular binding domain of the CAR comprises a single chain antibody.
10. The cell surface receptor of embodiment 9, wherein the single chain antibody is a single chain variable fragment (scFv).
11. The cell surface receptor of any one of embodiments 2 to 10, wherein the extracellular binding domain of the CAR specifically binds an antigen on the surface of a cancer cell.
12. The cell surface receptor of embodiment 11, wherein the antigen on the surface of the cancer cell is a tumor-associated antigen or a tumor-specific antigen.
13. The cell surface receptor of embodiment 11, wherein the antigen on the surface of the cancer cell is selected from the group consisting of: B7-H3 (CD276), CD19, GD2, CD22, and HER2.
14. The cell surface receptor of embodiment 1, wherein the cell surface receptor is an engineered T cell receptor (TCR).
15. The cell surface receptor of embodiment 14, wherein the protease cleavage site is disposed between the extracellular binding domain and the transmembrane domain.
16. The cell surface receptor of embodiment 14, wherein the protease cleavage site is disposed between the transmembrane domain and the intracellular signaling domain.

17. The cell surface receptor of any one embodiments 14 to 16, wherein the engineered TCR specifically binds a tumor-associated antigen or a tumor-specific antigen.
18. A cell surface receptor comprising:
an extracellular binding domain;
a transmembrane domain;
an intracellular signaling domain; and
a protease cleavage site disposed between the extracellular binding domain and the intracellular signaling domain.
19. The cell surface receptor of embodiment 18, wherein the protease cleavage site is disposed between the extracellular binding domain and the transmembrane domain.
20. The cell surface receptor of embodiment 18, wherein the protease cleavage site is disposed between the transmembrane domain and the intracellular signaling domain.
21. The cell surface receptor of any one of embodiments 18 to 20, wherein the cell surface receptor is a stem cell receptor.
22. The cell surface receptor of any one of embodiments 18 to 21, wherein the cell surface receptor is an immune cell receptor.
23. The cell surface receptor of embodiment 22, wherein the immune cell receptor is selected from the group consisting of: a T cell receptor, a B cell receptor, a natural killer (NK) cell receptor, a macrophage receptor, a monocyte receptor, a neutrophil receptor, a dendritic cell receptor, a mast cell receptor, a basophil receptor, and an eosinophil receptor.
24. The cell surface receptor of embodiment 23, wherein the immune cell receptor is a T cell receptor (TCR).
25. The cell surface receptor of embodiment 24, wherein the protease cleavage site is disposed: between the variable region of the alpha chain ($\alpha v$) and the constant region of the alpha chain ($\alpha c$); between the constant region of the alpha chain ($\alpha c$) and the transmembrane region of the alpha chain ($\alpha t$); between the variable region of the beta chain ($\beta v$) and the constant region of the beta chain ($\beta c$); between the constant region of the beta chain ($\beta c$) and the transmembrane region of the beta chain ($\beta t$); if a CD3$\zeta$ polypeptide is present, between the transmembrane domain of the CD3$\zeta$ polypeptide and the cytoplasmic domain of the CD3$\zeta$ polypeptide; and any combination thereof.
26. The cell surface receptor of any one of embodiments 1 to 25, wherein the protease cleavage site is a viral protease cleavage site.
27. The cell surface receptor of embodiment 26, wherein the viral protease cleavage site is for a viral protease derived from hepatitis C virus (HCV) nonstructural protein 3 (NS3).
28. The cell surface receptor of embodiment 27, wherein the viral protease further comprises a cofactor polypeptide derived from HCV nonstructural protein 4A (NS4A).
29. The cell surface receptor of any one of embodiments 26 to 28, wherein the viral protease cleavage site is selected from the group consisting of: an NS4A/4B junction cleavage site, an NS3/NS4A junction cleavage site, an NS4A/NS4B junction cleavage site, an NS4$\beta$/NS5A junction cleavage site, an NS5A/NS5B junction cleavage site, and variants thereof cleavable by the viral protease.
30. The cell surface receptor of any one of embodiments 1 to 29, wherein the cell surface receptor further comprises a protease dimerization domain that dimerizes with a domain of a protease, wherein the protease cleavage site is a cleavage site for the protease.
31. The cell surface receptor of embodiment 30, wherein the protease dimerization domain comprises a leucine zipper domain, a helix-loop-helix domain, or both.
32. The cell surface receptor of any one of embodiments 1 to 29, wherein the cell surface receptor further comprises a protease, and wherein the protease cleavage site is a cleavage site for the protease.
33. A cell comprising the cell surface receptor of any one of embodiments 1 to 32.
34. The cell of embodiment 33, wherein the cell is a mammalian cell.
35. The cell of embodiment 34, wherein the cell is a human cell.
36. The cell of any one of embodiments 33 to 35, wherein the cell is a stem cell.
37. The cell of embodiment 36, wherein the stem cell is selected from the group consisting of: a hematopoietic stem cell (HSC), an induced pluripotent stem cell (iPSC), a mesenchymal stem cell (MSC), and a neural stem cell (NSC).
38. The cell of any one of embodiments 33 to 35, wherein the cell is an immune cell.
39. The cell of embodiment 38, wherein the immune cell is selected from the group consisting of: a T cell, a B cell, a natural killer (NK) cell, a macrophage, a monocyte, a neutrophil, a dendritic cell, a mast cell, a basophil, and an eosinophil.
40. The cell of embodiment 38, wherein the immune cell is a T cell.
41. The cell of embodiment 40, wherein the cell surface receptor is a CAR.
42. The cell of embodiment 41, wherein the cell surface receptor is the CAR of any one of embodiments 2 to 13.
43. The cell of embodiment 40, wherein the cell surface receptor is a TCR.
44. The cell of any one of embodiments 33 to 43, wherein the cell surface receptor further comprises a protease, and wherein the protease cleavage site is a cleavage site for the protease.
45. The cell of any one of embodiments 33 to 44, wherein the protease cleavage site is disposed between the transmembrane domain and the intracellular signaling domain.
46. The cell of embodiment 45, wherein the cell further comprises a protease intracellularly tethered to the cell membrane, and wherein the protease cleavage site is a cleavage site for the protease intracellularly tethered to the cell membrane.
47. The cell of embodiment 46, wherein the protease is intracellularly tethered to the cell membrane via a transmembrane domain.
48. The cell of embodiment 47, wherein the protease intracellularly tethered to the cell membrane comprises a transmembrane domain of the same type as the transmembrane domain of the cell surface receptor.
49. The cell of embodiment 48, wherein the protease and cell surface receptor each comprise a CD8$\alpha$ transmembrane domain.
50. The cell of embodiment 48, wherein the protease and cell surface receptor each comprise a CD28 transmembrane domain.
51. The cell of any one of embodiments 48 to 50, wherein the protease and cell surface receptor each further comprise a hinge domain of the same type.

52. The cell of embodiment 46, wherein the protease comprises a domain that is post-translationally modified with a moiety that tethers the protease to the cell membrane.
53. The cell of embodiment 52, wherein the domain that is post-translationally modified is a domain that is palmitoylated or myristoylated.
54. The cell of any one of embodiments 45 to 53, wherein the cell comprises a soluble cytosolic protease, and wherein the protease cleavage site is a cleavage site for the soluble cytosolic protease.
55. The cell of any one of embodiments 33 to 44, wherein the protease cleavage site is disposed between the extracellular binding domain and the transmembrane domain.
56. The cell of embodiment 55, wherein the cell further comprises a protease extracellularly tethered to the cell membrane, and wherein the protease cleavage site is a cleavage site for the protease extracellularly tethered to the cell membrane.
57. The cell of embodiment 56, wherein the protease is extracellularly tethered to the cell membrane via a transmembrane domain.
58. The cell of embodiment 57, wherein the protease extracellularly tethered to the cell membrane comprises a transmembrane domain of the same type as the transmembrane domain of the cell surface receptor.
59. The cell of embodiment 56, wherein the protease is extracellularly tethered to the cell membrane via a glycolipid anchor.
60. The cell of embodiment 59, wherein the glycolipid anchor is a glycosylphosphatidylinositol (GPI) anchor.
61. The cell of any one of embodiments 46 to 58, wherein the protease comprises a dimerization domain that dimerizes with a domain of the cell surface receptor to promote association of the protease and cell surface receptor.
62. The cell of embodiment 61, wherein the dimerization domain comprises a leucine zipper domain, a helix-loop-helix domain, or both.
63. A pharmaceutical composition, comprising:
the cell of any one of embodiments 33 to 62; and a pharmaceutically-acceptable carrier.
64. A nucleic acid encoding the cell surface receptor of any one of embodiments 1 to 32.
65. An expression vector comprising the nucleic acid of embodiment 64.
66. A cell comprising the nucleic acid of embodiment 64 or the expression vector of embodiment 65.
67. The cell of embodiment 66, wherein the cell is a mammalian cell.
68. The cell of embodiment 67, wherein the cell is a human cell.
69. The cell of any one of embodiments 66 to 68, wherein the cell is an immune cell.
70. The cell of embodiment 69, wherein the immune cell is selected from the group consisting of: a T cell, a B cell, a natural killer (NK) cell, a macrophage, a monocyte, a neutrophil, a dendritic cell, a mast cell, a basophil, and an eosinophil.
71. The cell of embodiment 69, wherein the immune cell is a T cell.
72. The cell of embodiment 71, wherein the cell surface receptor is a CAR.
73. The cell of embodiment 72, wherein the cell surface receptor is the CAR of any one of embodiments 2 to 13.
74. The cell of embodiment 71, wherein the cell surface receptor is a TCR.
75. The cell of any one of embodiments 66 to 74, wherein the cell surface receptor further comprises a protease, and wherein the protease cleavage site is a cleavage site for the protease of the cell surface receptor.
76. The cell of any one of embodiments 66 to 75, wherein the protease cleavage site is disposed between the transmembrane domain and the intracellular signaling domain.
77. The cell of embodiment 76, wherein the cell further comprises a protease tethered intracellularly to the cell membrane of the cell, and wherein the protease cleavage site is a cleavage site for the protease tethered intracellularly to the cell membrane of the cell.
78. The cell of embodiment 77, wherein the protease is intracellularly tethered to the cell membrane via a transmembrane domain.
79. The cell of embodiment 78, wherein the protease intracellularly tethered to the cell membrane comprises a transmembrane domain of the same type as the transmembrane domain of the cell surface receptor.
80. The cell of embodiment 79, wherein the protease and cell surface receptor each comprise a CD8α transmembrane domain.
81. The cell of embodiment 79, wherein the protease and cell surface receptor each comprise a CD28 transmembrane domain.
82. The cell of any one of embodiments 79 to 81, wherein the protease and cell surface receptor each further comprise a same type of hinge domain.
83. The cell of embodiment 77, wherein the protease comprises a domain that is post-translationally modified with a moiety that tethers the protease to the cell membrane.
84. The cell of embodiment 83, wherein the domain that is post-translationally modified is a domain that is palmitoylated or myristoylated.
85. The cell of any one of embodiments 76 to 84, wherein the cell comprises a soluble cytosolic protease, and wherein the protease cleavage site is a cleavage site for the soluble cytosolic protease.
86. The cell of any one of embodiments 66 to 75, wherein the protease cleavage site is disposed between the extracellular binding domain and the transmembrane domain.
87. The cell of embodiment 86, wherein the cell comprises a protease tethered extracellularly to the cell membrane of the cell, and wherein the protease cleavage site is a cleavage site for the protease tethered extracellularly to the cell membrane of the cell.
88. The cell of embodiment 87, wherein the protease is extracellularly tethered to the cell membrane via a transmembrane domain.
89. The cell of embodiment 88, wherein the protease extracellularly tethered to the cell membrane comprises a transmembrane domain of the same type as the transmembrane domain of the cell surface receptor.
90. The cell of embodiment 87, wherein the protease is extracellularly tethered to the cell membrane via a glycolipid anchor.
91. The cell of embodiment 90, wherein the glycolipid anchor is a glycosylphosphatidylinositol (GPI) anchor.
92. The cell of any one of embodiments 77 to 91, wherein the protease comprises a dimerization domain that dimerizes with a domain of the cell surface receptor to promote association of the protease and cell surface receptor.

93. The cell of embodiment 92, wherein the dimerization domain comprises a leucine zipper domain, a helix-loop-helix domain, or both.

94. A method of making the cell of any one of embodiments 66 to 93, comprising introducing the nucleic acid of embodiment 64 or the expression vector of embodiment 65 into the cell.

95. A method of making the cell of any one of embodiments 75 to 93, comprising:
introducing the nucleic acid of embodiment 64 or the expression vector of embodiment 65 into the cell, wherein the nucleic acid further encodes the protease.

96. A method of making the cell of any one of embodiments 75 to 93, comprising:
introducing the nucleic acid of embodiment 64 or the expression vector of embodiment 65 into the cell; and introducing a nucleic acid or expression vector that encodes the protease into the cell.

97. A method for regulating signaling of a cell surface receptor, comprising:
contacting the cell of any one of embodiments 75 to 93 with an inhibitor of the protease when signaling through the cell surface receptor is desired.

98. The method according to embodiment 97, wherein the protease is derived from HCV NS3, and wherein the inhibitor of the protease is selected from the group consisting of: asunaprevir (ASV), danoprevir (DPV), simeprevir (SPV), grazoprevir (GPV), and any combination thereof.

99. The method according to embodiment 97 or embodiment 98, further comprising ceasing the contacting when signaling through the cell surface receptor is no longer desired.

100. The method according to any one of embodiments 97 to 99, wherein the method is performed in vitro.

101. The method according to any one of embodiments 97 to 99, wherein the method is performed ex vivo.

102. The method according to any one of embodiments 97 to 99, wherein the method is performed in vivo.

103. A pharmaceutical composition, comprising:
the cell of any one of embodiments 75 to 93; and
a pharmaceutically-acceptable carrier.

104. A method of making the pharmaceutical composition of embodiment 103, comprising introducing the expression vector of embodiment 65 into cells obtained from an individual.

105. A method of administering a regulatable cell-based therapy to an individual in need thereof, comprising administering to the individual the pharmaceutical composition of embodiment 103.

106. The method according to embodiment 105, further comprising administering to the individual an inhibitor of the protease when signaling through the cell surface receptor is desired.

107. The method according to embodiment 106, wherein the inhibitor of the protease is administered concurrently with the pharmaceutical composition.

108. The method according to embodiment 106 or embodiment 107, wherein the inhibitor of the protease is administered subsequently to administration of the pharmaceutical composition.

109. The method according to any one of embodiments 106 to 108, further comprising ceasing administration of the protease inhibitor when signaling through the cell surface receptor is no longer desired.

110. The method according to any one of embodiments 106 to 109, wherein the protease portion of the membrane-tethered protease is derived from HCV NS3, and wherein the inhibitor of the membrane-tethered protease is selected from the group consisting of: asunaprevir (ASV), danoprevir (DPV), simeprevir (SPV), grazoprevir (GPV), and any combination thereof.

111. The method according to any one of embodiments 105 to 110, wherein the pharmaceutical composition comprises immune cells comprising the expression vector of embodiment 65.

112. The method according to embodiment 111, wherein the expression vector encodes a protease, wherein the protease cleavage site is a cleavage site for the protease.

113. The method according to embodiment 112, wherein the cell surface receptor and the protease are expressed from the same promoter.

114. The method according to any one of embodiments 111 to 113, wherein the immune cells are selected from the group consisting of: T cells, B cells, natural killer (NK) cells, macrophages, monocytes, neutrophils, dendritic cells, mast cells, basophils, and eosinophils.

115. The method according to any one of embodiments 111 to 113, wherein the immune cells are T cells.

116. The method according to embodiment 115, wherein the cell surface receptor is a CAR.

117. The method according to embodiment 115, wherein the cell surface receptor is a TCR.

118. The method according to any one of embodiments 105 to 117, further comprising producing the pharmaceutical composition.

119. The method according to embodiment 118, wherein producing the pharmaceutical composition comprises introducing the expression vector of embodiment 65 into cells or progeny thereof obtained from the individual.

120. The method according to embodiment 119, wherein the expression vector encodes a protease, wherein the protease cleavage site is a cleavage site for the protease.

121. The method according to embodiment 118, wherein producing the pharmaceutical composition comprises co-introducing the expression vector of embodiment 65 and an expression vector that encodes the protease into cells or progeny thereof obtained from the individual.

122. The method according to any one of embodiments 118 to 121, comprising contacting the cells obtained from the individual, or progeny thereof, with an inhibitor of the protease prior to administering the pharmaceutical composition to the individual.

123. A kit, comprising:
the nucleic acid of embodiment 64 or the expression vector of embodiment 65; and instructions for introducing the nucleic acid or expression vector into a cell.

124. The kit of embodiment 123, wherein the expression vector encodes a protease, and wherein the protease cleavage site is a cleavage site for the protease.

125. The kit of embodiment 124 wherein the expression vector is configured to express the cell surface receptor and the protease from the same promoter.

126. The kit of embodiment 123, further comprising a nucleic acid or expression vector that encodes a protease, wherein the protease cleavage site is a cleavage site for the protease.

127. The kit of any one of embodiments 123 to 126, wherein the instructions further comprise instructions for regulating signaling through the cell surface receptor.

128. The kit of embodiment 127, wherein the instructions comprise instructions for contacting the cell or progeny thereof with an inhibitor of the protease when signaling through the cell surface receptor is desired.

129. The kit of any one of embodiments 123 to 128, further comprising an inhibitor of the protease.

The following examples are offered by way of illustration and not by way of limitation.

EXPERIMENTAL

Introduction

Described herein are cell surface receptors having regulatable signaling. The approach is sometimes referred to herein as signal neutralization by an inhibitable protease (or "SNIP") and involves the disposal of a protease cleavage site within a cell surface receptor. The cell surface receptor is expressed on the surface of a cell. Also present in the SNIP system is a protease, where the protease cleavage site is a cleavage site for the protease. The protease may be expressed in the cell as a separate molecule (sometimes referred to herein as a "trans" configuration) or the protease may be included in the cell surface receptor itself (sometimes referred to herein as a "cis" configuration). The activity of the protease is regulated depending upon the presence or absence of an inhibitor of the protease. In the presence of a protease inhibitor, the protease is prevented from cleaving the protease cleavage site, leaving the cell surface receptor intact and capable of transducing ligand/antigen binding-related signals to the cell. In the absence of a protease inhibitor, the protease cleaves the protease cleavage site, thereby separating one or more domains of the cell surface receptor from the remaining domains of the cell surface receptor, rendering the cell surface receptor incapable of transducing ligand/antigen binding-related signals to the cell or incapable of binding to ligand/antigen at all. In the present Examples, the cell surface receptors are engineered cell surface receptors—in particular, chimeric antigen receptors (CARs).

Example 1-A Regulatable Cell Surface Receptor Having a Protease Cleavage Site Disposed Between the Transmembrane Domain and an Intracellular Signaling Domain The present example involves a CAR that includes an intracellular protease cleavage site disposed between the transmembrane domain and an intracellular signaling domain. The configuration of the CAR is schematically illustrated in FIG. 1. In this particular example, the CAR includes (inter alia), from N- to C-terminus: an anti-B7H3 scFv; a CD8 alpha hinge region; a CD8 alpha transmembrane domain; a HCV NS3 protease cleavage site; a 4-1BB intracellular signaling domain; and a CD3 ζ intracellular signaling domain. The amino acid sequence of this CAR—sometimes referred to herein as "B7H3-SNIP-BBz"—is provided in Table 1. Because the CAR of the present example does not include the protease as a domain of the CAR, the protease is expressed in the cell as a separate molecule. The protease employed in this example is a HCV NS3 protease, the amino acid sequence for which is provided in Table 1.

Figure 6:
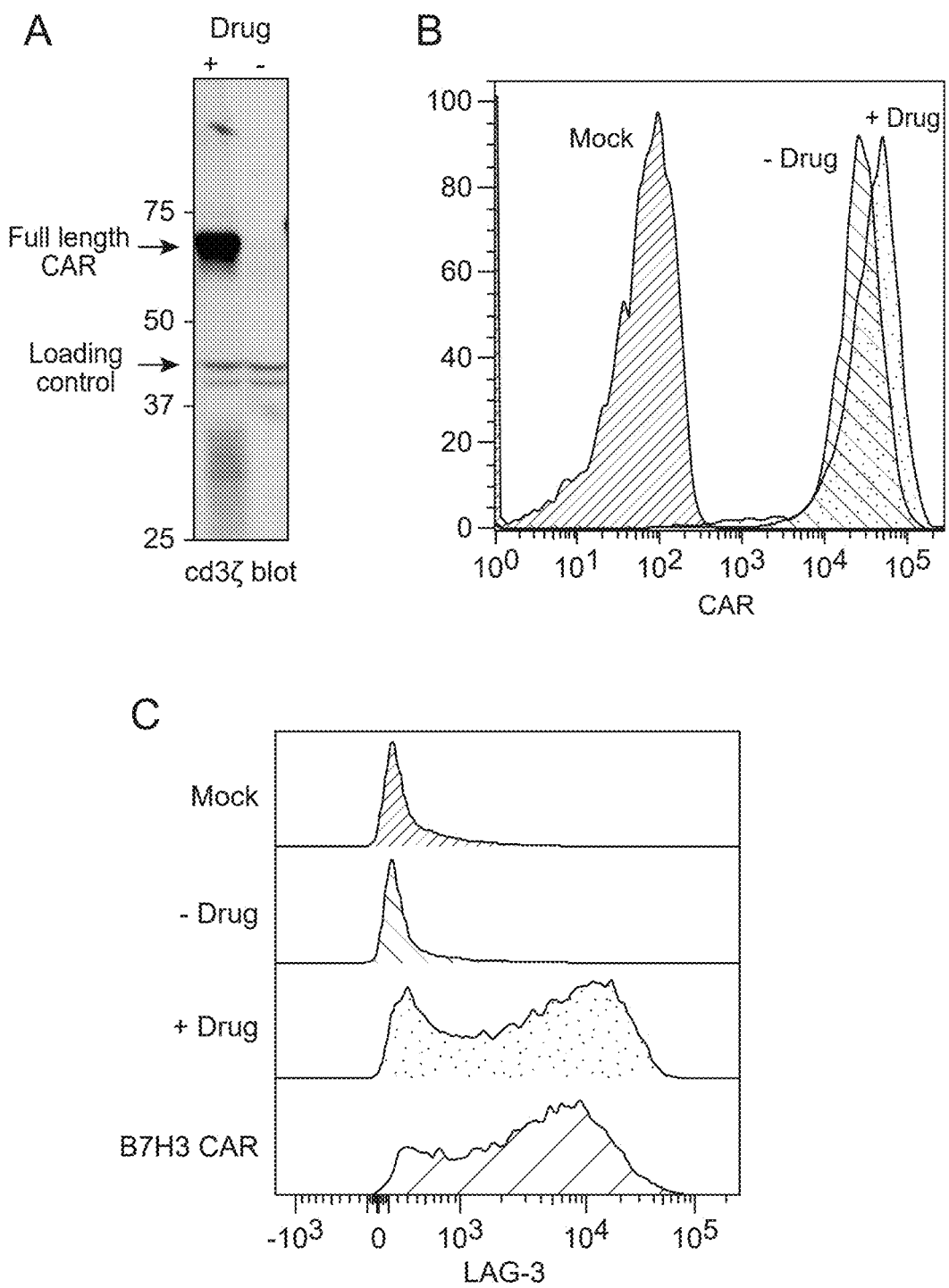
FIG. 6: Panel A: Western blot of protein extracted from primary human T cells transduced with a CAR having the configuration shown in FIG. 1 and cultured in the presence (+) or absence (−) of an inhibitor of the protease. In this example, the antigen binding portion of the CAR binds to B7H3, and the CAR includes a 4-1BB intracellular signaling domain and a CD3ζ intracellular signaling domain. Panel B: A flow cytometry plot showing the same T cells as panel A stained with B7H3-Fc, which recognizes both cleaved and full-length CAR. Panel C: A flow cytometry plot showing the expression of the activation and exhaustion marker LAG-3 on the same T cells as panels A and B. Controls for panels B and C included: mock (T cells that do not express a CAR); and B7H3 CAR (constitutive unregulated CAR T cells).

A series of experiments demonstrating control of cleavage and signaling of the B7H3-SNIP-BBz CAR were carried out. Shown in FIG. 6 (panel A) is an anti-CD3 ζ western blot of protein extracted from primary human T cells expressing the CAR and cultured in the presence (+) or absence (−) of 3μ M of the HCV NS3 protease inhibitor grazoprevir. FIG. 6 (panel B) is a flow cytometry plot showing the CAR T cells stained with B7H3-Fc, which recognizes both cleaved and full length surface CAR. FIG. 6 (panel C) is a flow cytometry plot showing the expression of the activation and exhaustion marker LAG-3 on the CAR T cells. Taken together, the data demonstrates that signaling through the CAR can be negatively regulated by withholding the protease inhibitor and positively regulated by providing the protease inhibitor.

Figure 7:
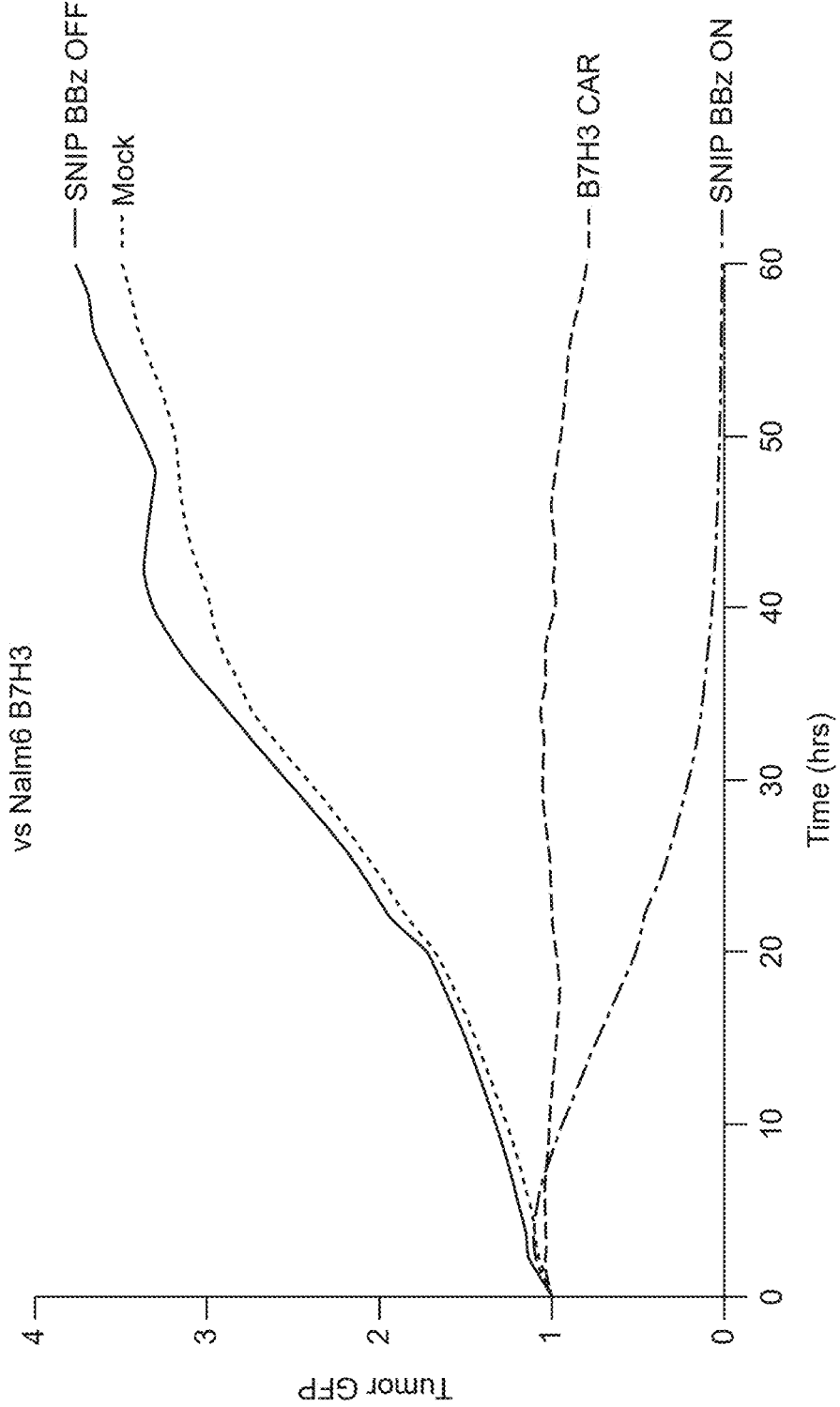
FIG. 7: A graph showing the GFP fluorescence of GFP-labeled Nalm6 leukemia cells which were engineered to express the B7H3 antigen. The tumor cells were co-cultured with the CAR T cells described for FIG. 6 in the presence (ON) or absence (OFF) of an inhibitor of the protease.

Shown in FIG. 7 is a graph of GFP fluorescence from GFP-labeled Nalm6 leukemia cells which were engineered to express the B7H3 antigen. The tumor cells were co-cultured with the B7H3-SNIP-BBz CAR T cells in the presence (ON) or absence (OFF) of 3 μM grazoprevir. As indicated by tumor GFP fluorescence, the cytotoxic capacity of B7H3-SNIP-BBz cells can be controlled by the addition of the protease inhibitor. Mock untransduced T cells served as a negative control. B7H3-CAR T cells lacking the SNIP tag served as a positive control. The data demonstrates that B7H3-SNIP-BBz CAR T cells in the ON state have a superior cytotoxic effect against the tumor cells compared to B7H3-CAR T cells.

Figure 8:
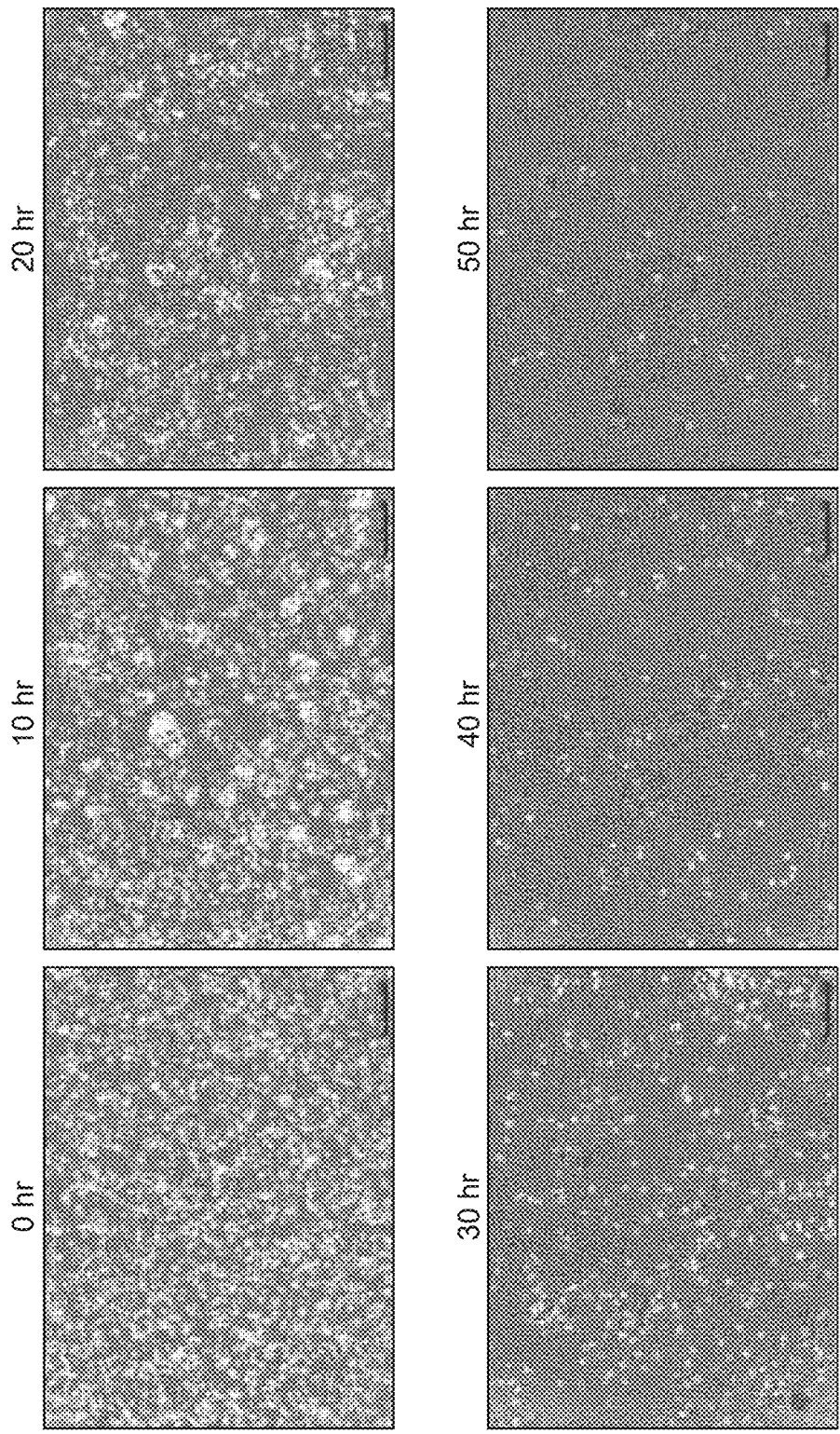
FIG. 8: A series of images at various time points of the CAR T cells described for FIG. 6 co-cultured with GFP-labeled Nalm6 leukemia cells expressing the B7H3 antigen. In this example, the cells were co-cultured in the presence of an inhibitor of the protease.
Figure 9:
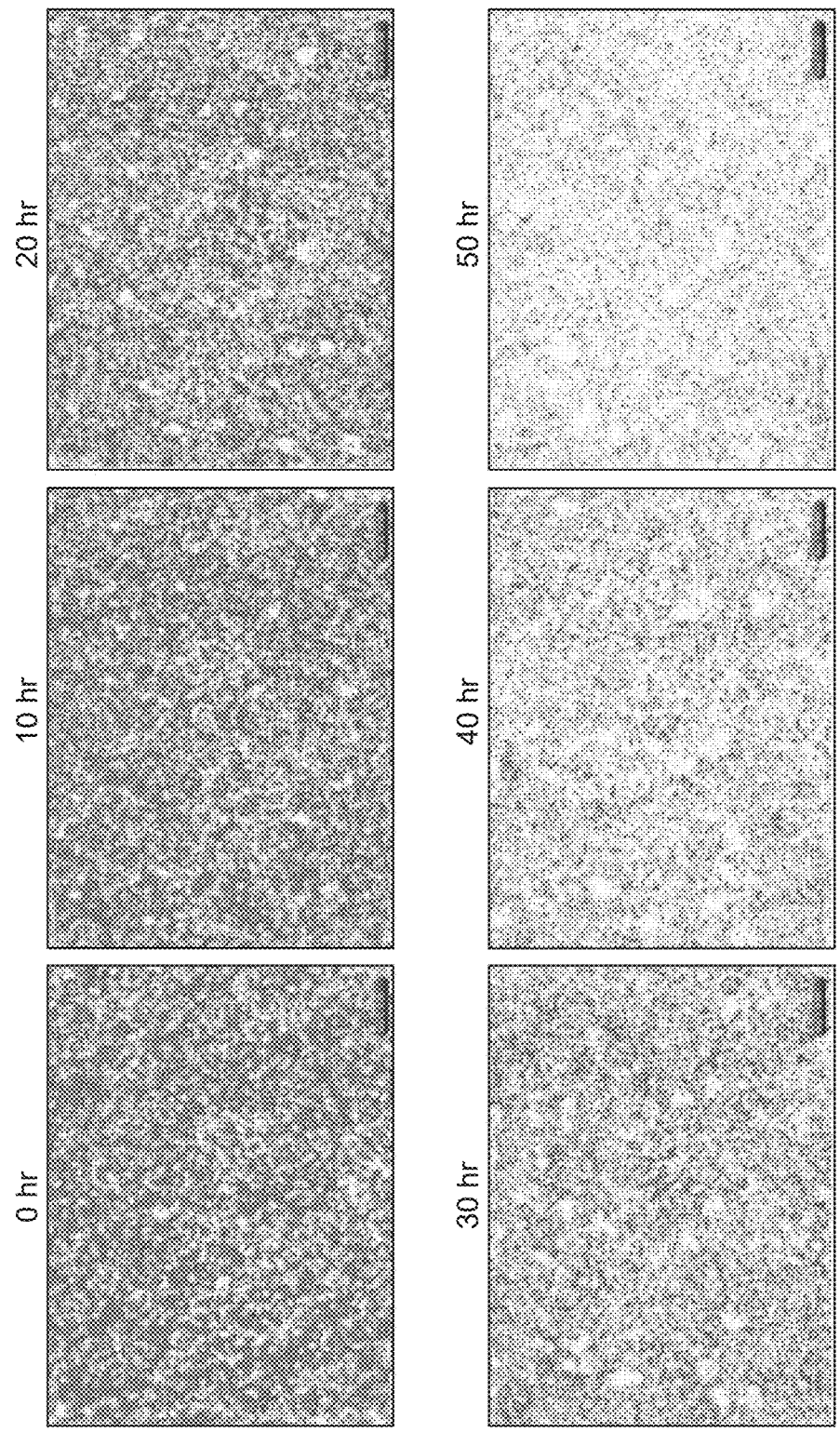
FIG. 9: A series of images at various time points of the CAR T cells described for FIG. 6 co-cultured with GFP-labeled Nalm6 leukemia cells expressing the B7H3 antigen. In this example, the cells were co-cultured in the absence of an inhibitor of the protease.

FIG. 8 shows a series of images at various time points of the GFP-labeled Nalm6 leukemia cells expressing the B7H3 antigen co-cultured with B7H3-SNIP-BBz CAR T cells. In this experiment, the cells were co-cultured in the presence of 3 μM grazoprevir. As can be seen in the data, B7H3-SNIP-BBz CAR T cells cultured in the presence of drug have a cytotoxic effect on the Nalm6 tumor cells, as determined by the decrease in GFP fluorescence during the course of the co-culture. FIG. 9 shows a series of images at various time points of GFP-labeled Nalm6 leukemia cells expressing the B7H3 antigen co-cultured with B7H3-SNIP-BBz CAR T cells. In this experiment, the cells were co-cultured in the absence of grazoprevir. As can be seen in the data, B7H3-SNIP-BBz CAR T cells cultured in the absence of drug do not have a cytotoxic effect on the Nalm6 tumor cells, as determined by the increase in GFP fluorescence during the course of the co-culture.

Figure 10:
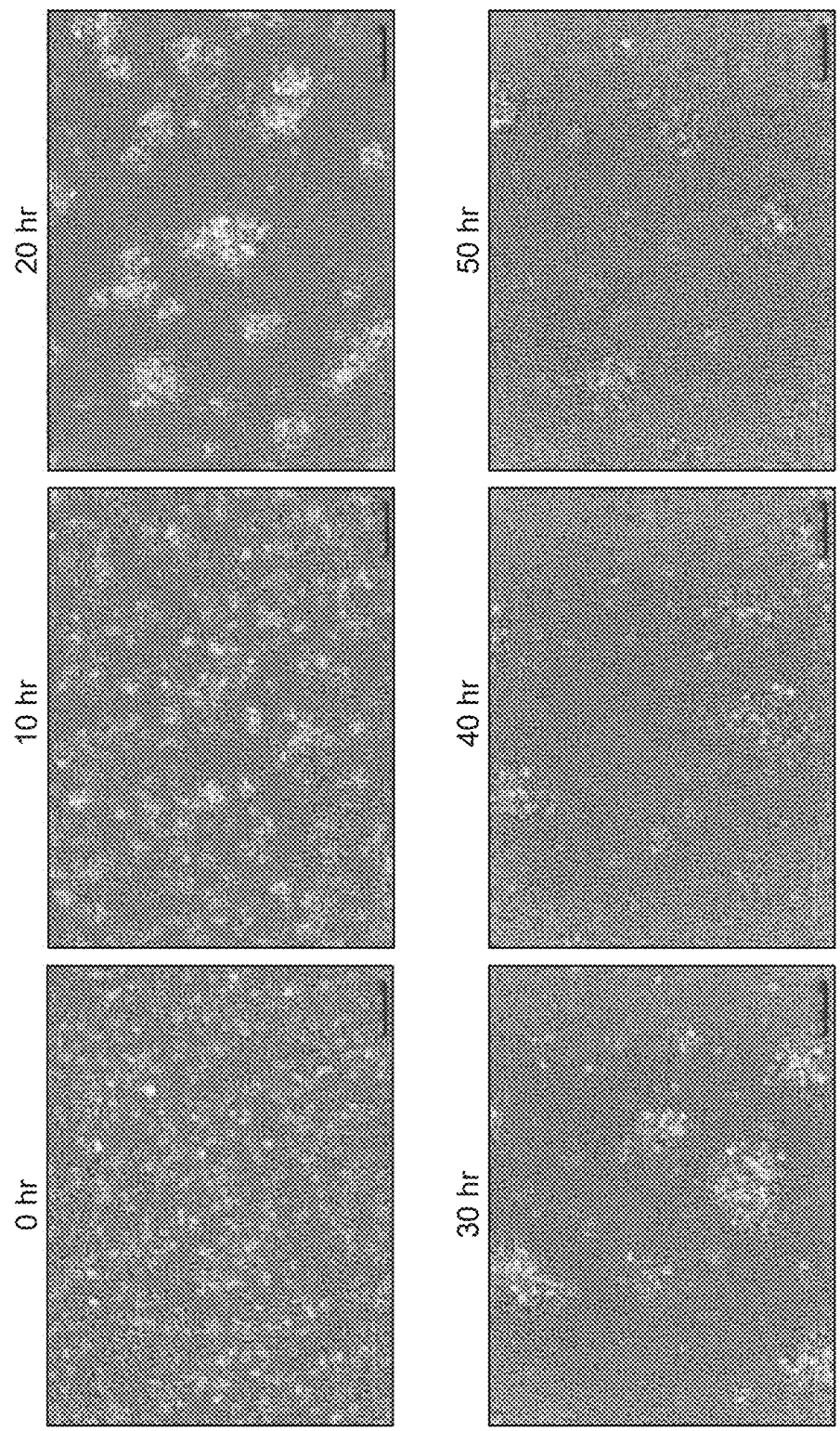
FIG. 10: A series of images at various time points of the CAR T cells described for FIG. 6 co-cultured with RFP-labeled 143B osteosarcoma cells expressing the B7H3 antigen. In this example, the cells were co-cultured in the presence of an inhibitor of the protease.
Figure 11:
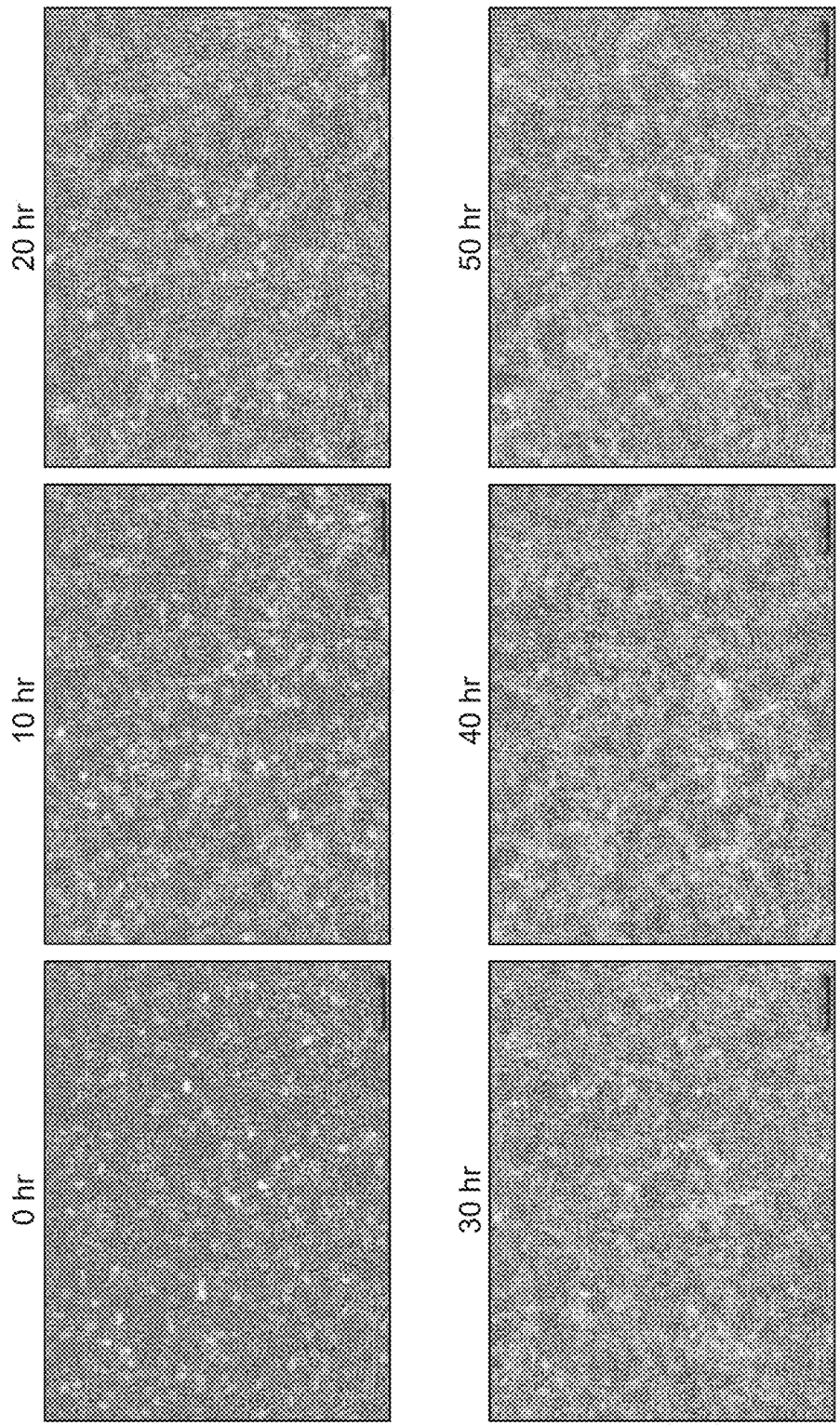
FIG. 11: A series of images at various time points of the CAR T cells described for FIG. 6 co-cultured with RFP-labeled 143B osteosarcoma cells expressing the B7H3 antigen. In this example, the cells were co-cultured in the absence of an inhibitor of the protease.

FIG. 10 shows a series of images at various time points of RFP-labeled 143B osteosarcoma cells expressing the B7H3 antigen co-cultured with B7H3-SNIP-BBz CAR T cells. In this example, the cells were co-cultured in the presence of 3 μM grazoprevir. As can be seen in the data, B7H3-SNIP-BBz CAR T cells cultured in the presence of drug have a cytotoxic effect on the 143B osteosarcoma cells, as determined by the decrease in RFP fluorescence during the course of the co-culture. FIG. 11 shows a series of images at various time points of RFP-labeled 143B osteosarcoma cells expressing the B7H3 antigen co-cultured with B7H3-SNIP-BBz CAR T cells. In this example, the cells were co-cultured in the absence of grazoprevir. As can be seen in the data, B7H3-SNIP-BBz CAR T cells cultured in the absence of drug do not have a cytotoxic effect on the 143B osteosarcoma cells, as determined by the increase in RFP fluorescence during the course of the co-culture.

The levels of interferon gamma (IFNγ) and interleukin-2 (IL-2) in co-culture supernatant were quantified. FIG. 12 (panel A) provides a graph showing quantification of IFNγ levels in co-culture supernatant of B7H3-expressing Nalm6 or 143B tumor cells co-cultured with B7H3-SNIP-BBz CAR T cells. The B7H3-BBz CAR T cells were exposed to 3 µM grazoprevir for 120 hrs (ON), 24 hrs (ON 24 hr), or not exposed to the protease inhibitor (OFF). FIG. 12 (panel B) provides a graph showing quantification of interleukin-2 (IL-2) levels in co-culture supernatant of B7H3-expressing Nalm6 or 143B tumor cells co-cultured with B7H3-SNIP-BBz CAR T cells. The B7H3-BBz CAR T cells were exposed to 3 µM grazoprevir for 120 hrs (ON), 24 hrs (ON 24 hr), or not exposed to the protease inhibitor (OFF). The data demonstrates that the CAR T cells secrete cytokines during tumor cell co-cultures only in the presence of the protease inhibitor.

Figure 13:
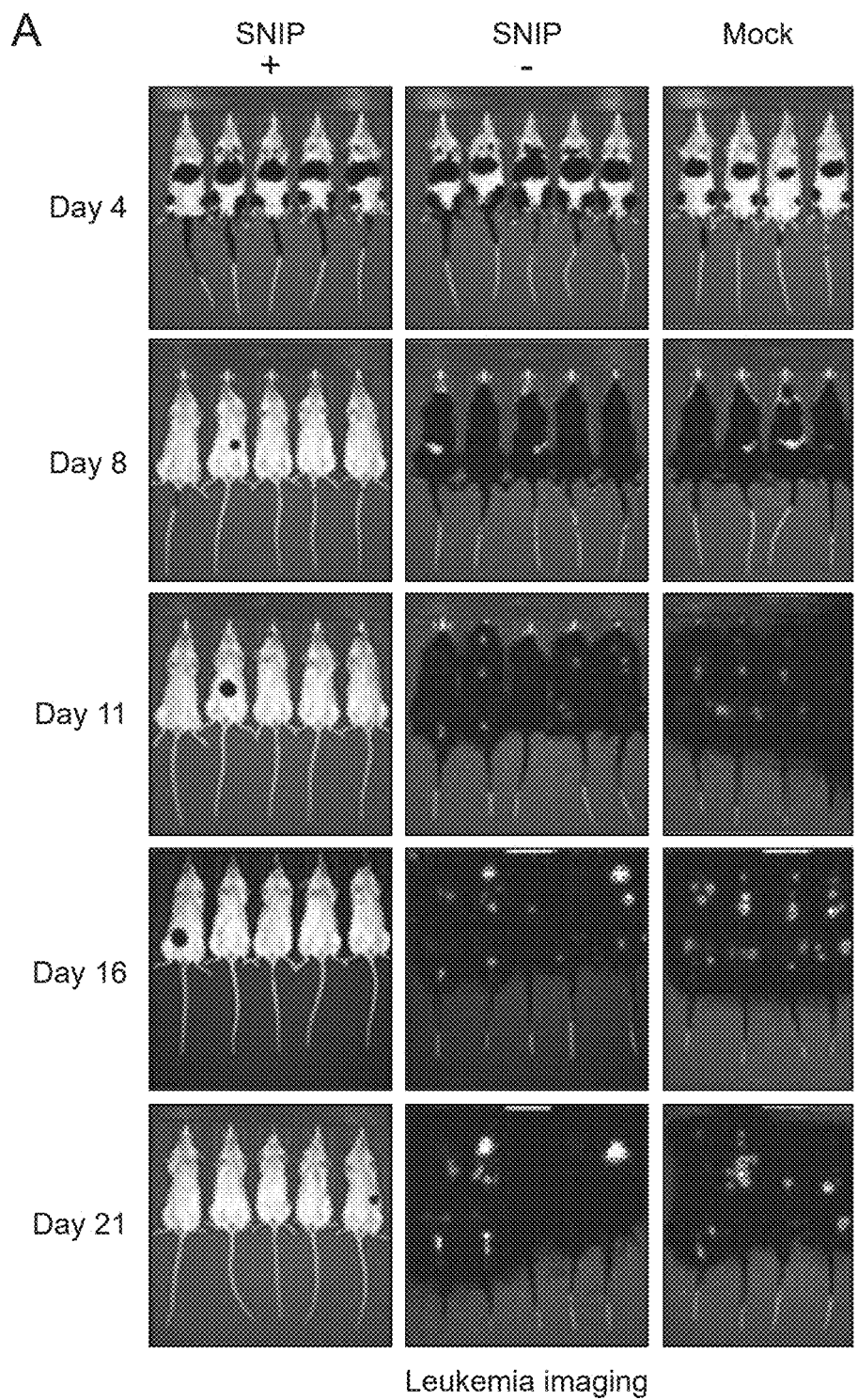
FIG. 13: Panel A: Imaging data demonstrating in vivo control of CAR activity against Nalm6 leukemia cells. Panel B: A graph showing the average bioluminescence flux values for the imaging data shown in panel A.
Figure 13:
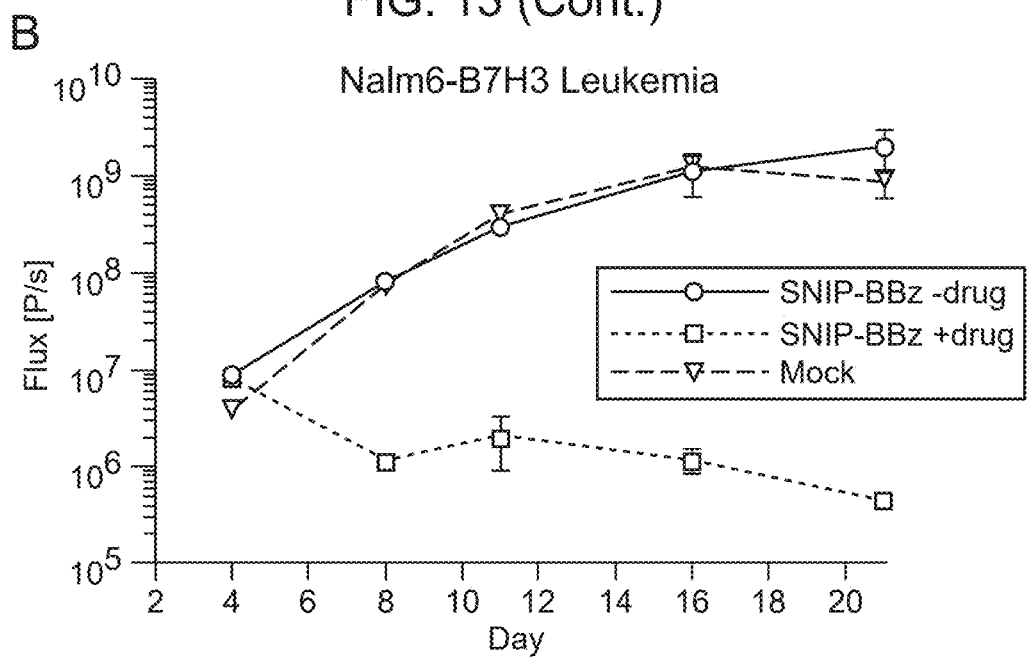

Next, it was determined that B7H3-SNIP-BBz CAR T cell activity against Nalm6 leukemia cells could be regulated in vivo. NOD scid gamma (NSG) mice were infused with 10^6 Nalm6 leukemia cells expressing B7H3 antigen and firefly luciferase. Four days later, mice were infused with 8×10^6 β7H3-SNIP-BBz CAR T cells or mock untransduced control T cells. Mice that received B7H3-SNIP-BBz CAR-T cells were either administered 50 mg/kg grazoprevir +25 mg/kg ritonavir (SNIP+) or vehicle containing 50% polyethylene glycol 300 (SNIP−) three times per day by oral gavage. Bioluminescence imaging was used to follow the expansion of the firefly luciferase-expressing Nalm6 cells. As seen in the data, B7H3-SNIP-BBz CAR T cells kill the leukemia cells in the presence of drug but have no observable cytotoxicity in the absence of drug, as determined by bioluminescence imaging. FIG. 13 (panel A) provides a series of images showing the bioluminescence of the Nalm6 leukemia cells throughout the time course of the experiment. FIG. 13 (panel B) is a graph showing the average bioluminescence flux values of the various experimental groups throughout the time course of the experiment. Error bars represent standard error of mean.

Example 2-A Regulatable Cell Surface Receptor Having a Protease Cleavage Site Disposed Between First and Second Intracellular Signaling Domains This example involves a CAR that includes an intracellular protease cleavage site disposed between first and second intracellular signaling domains. The configuration of the CAR is schematically illustrated in FIG. 2. In this particular example, the CAR includes (inter alia), from N- to C-terminus: an anti-B7H3 scFv; a CD8 alpha hinge region; a CD8 alpha transmembrane domain; a 4-1BB intracellular signaling domain; a HCV NS3 protease cleavage site; and a CD3ζ intracellular signaling domain. The amino acid sequence of this CAR-sometimes referred to herein as "B7H3-BB-SNIP-z"—is provided in Table 1. Because the CAR of the present example does not include the protease as a domain of the CAR, the protease is expressed in the cell as a separate molecule. The protease employed in this example is a HCV NS3 protease, the amino acid sequence for which is provided in Table 1.

Figure 14:
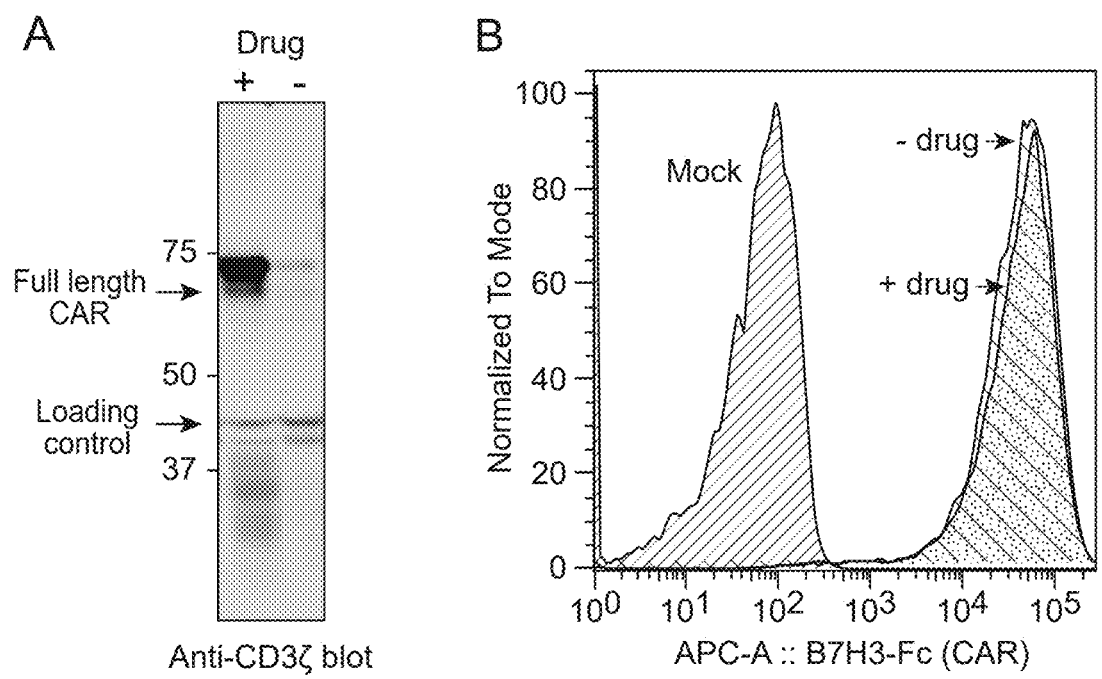
FIG. 14: Panel A: Western blot of protein extracted from primary human T cells transduced with a CAR having the configuration shown in FIG. 2 and cultured in the presence (+) or absence (−) of an inhibitor of the protease. In this example, the antigen binding portion of the CAR binds to B7H3, and the CAR includes a 4-1BB intracellular signaling domain and a CD3ζ intracellular signaling domain. Panel B: A flow cytometry plot showing the same T cells as panel A stained with B7H3-Fc, which recognizes both cleaved and full-length CAR.
Figure 15:
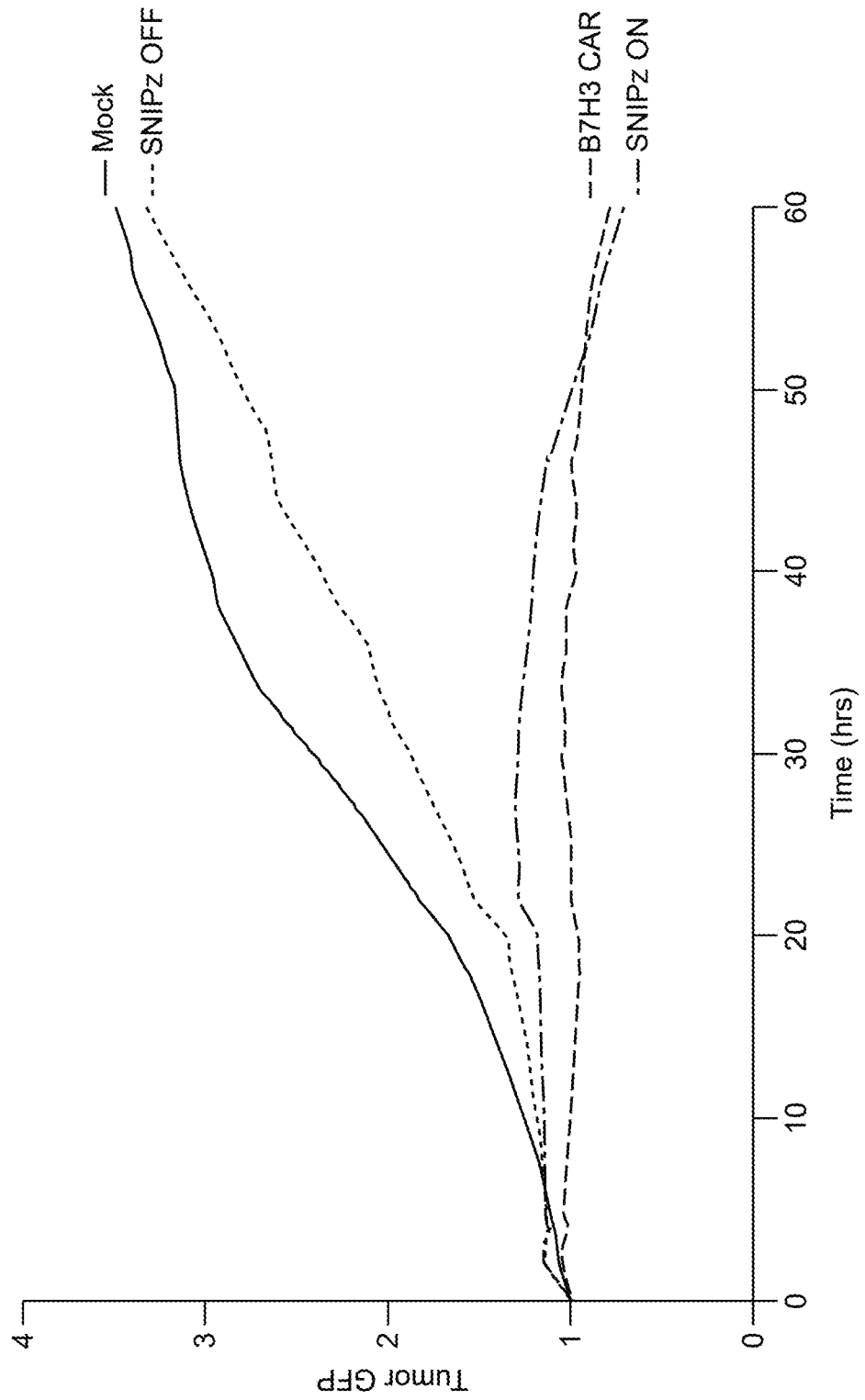
FIG. 15: A graph showing the GFP fluorescence of GFP-labeled Nalm6 leukemia cells which were engineered to express the B7H3 antigen. The tumor cells were co-cultured with the CAR T cells as described for FIG. 14 in the presence (ON) or absence (OFF) of an inhibitor of the protease.

A series of experiments demonstrating control of cleavage and signaling of the B7H3-BB-SNIP-z CAR were carried out. Shown in FIG. 14 (panel A) is an anti-CD3 & western blot of protein extracted from primary human T cells expressing the CAR and cultured in the presence (+) or absence (−) of 3| M of the HCV NS3 protease inhibitor grazoprevir. FIG. 14 (panel B) is a flow cytometry plot showing the CAR T cells stained with B7H3-Fc, which recognizes both cleaved and full length surface B7H3-BB-SNIP-z CAR. The data demonstrates control of B7H3-BB-SNIP-z CAR cleavage and signaling by grazoprevir.

Shown in FIG. 12 is a graph of GFP fluorescence from GFP-labeled Nalm6 leukemia cells which were engineered to express the B7H3 antigen. The tumor cells were co-cultured with the B7H3-BB-SNIP-z CAR T cells in the presence (ON) or absence (OFF) of 3 µM grazoprevir. As indicated by tumor GFP fluorescence, the cytotoxic capacity of B7H3-BB-SNIP-z CAR T cells can be controlled by the addition of the inhibitor. Mock untransduced T cells served as a negative control. B7H3-CAR T cells lacking the SNIP tag served as a positive control. The data demonstrates that B7H3-BB-SNIP-z CAR T cells in the ON state have a superior cytotoxic effect against the tumor cells compared to B7H3-CAR T cells.

The levels of interferon gamma (IFN γ) and interleukin-2 (IL-2) in co-culture supernatant were quantified. FIG. 16 (panel A) provides a graph showing quantification of IFN γ levels in co-culture supernatant of B7H3-expressing Nalm6 or 143B tumor cells co-cultured with B7H3-BB-SNIP-z CAR T cells. The B7H3-BB-SNIP-z CAR T cells were exposed to 3/1 M grazoprevir for 120 hrs (ON), 24 hrs (ON 24 hr), or not exposed to the protease inhibitor (OFF). FIG. 16 (panel B) provides a graph showing quantification of interleukin-2 (IL-2) levels in co-culture supernatant of B7H3-expressing Nalm6 or 143B tumor cells co-cultured with B7H3-BB-SNIP-z CAR T cells. The B7H3-BB-SNIP-z CAR T cells were exposed to 3µM grazoprevir for 120 hrs (ON), 24 hrs (ON 24 hr), or not exposed to the protease inhibitor (OFF). The data demonstrates that the CAR T cells secrete cytokines during tumor cell co-cultures only in the presence of the protease inhibitor.

Example 3-A Regulatable Cell Surface Receptor Having an Extracellular Protease Cleavage Site and Protease Disposed Between the Transmembrane Domain and the Extracellular Binding Domain The present example involves a CAR that includes an extracellular protease cleavage site and protease disposed between the transmembrane domain and the extracellular binding domain. The configuration of the CAR is schematically illustrated in FIG. 5. In this particular example, the CAR includes (inter alia), from N- to C-terminus: an anti-B7H3 scFv; a HCV NS3 protease cleavage site; a HCV NS3 protease; a CD8 alpha hinge region; a CD8 alpha transmembrane domain; a 4-1BB intracellular signaling domain; and a CD3ζ intracellular signaling domain. The amino acid sequence of this CAR-sometimes referred to herein as "B7H3-cis SNIP scFv"—is provided in Table 1.

Figure 17:
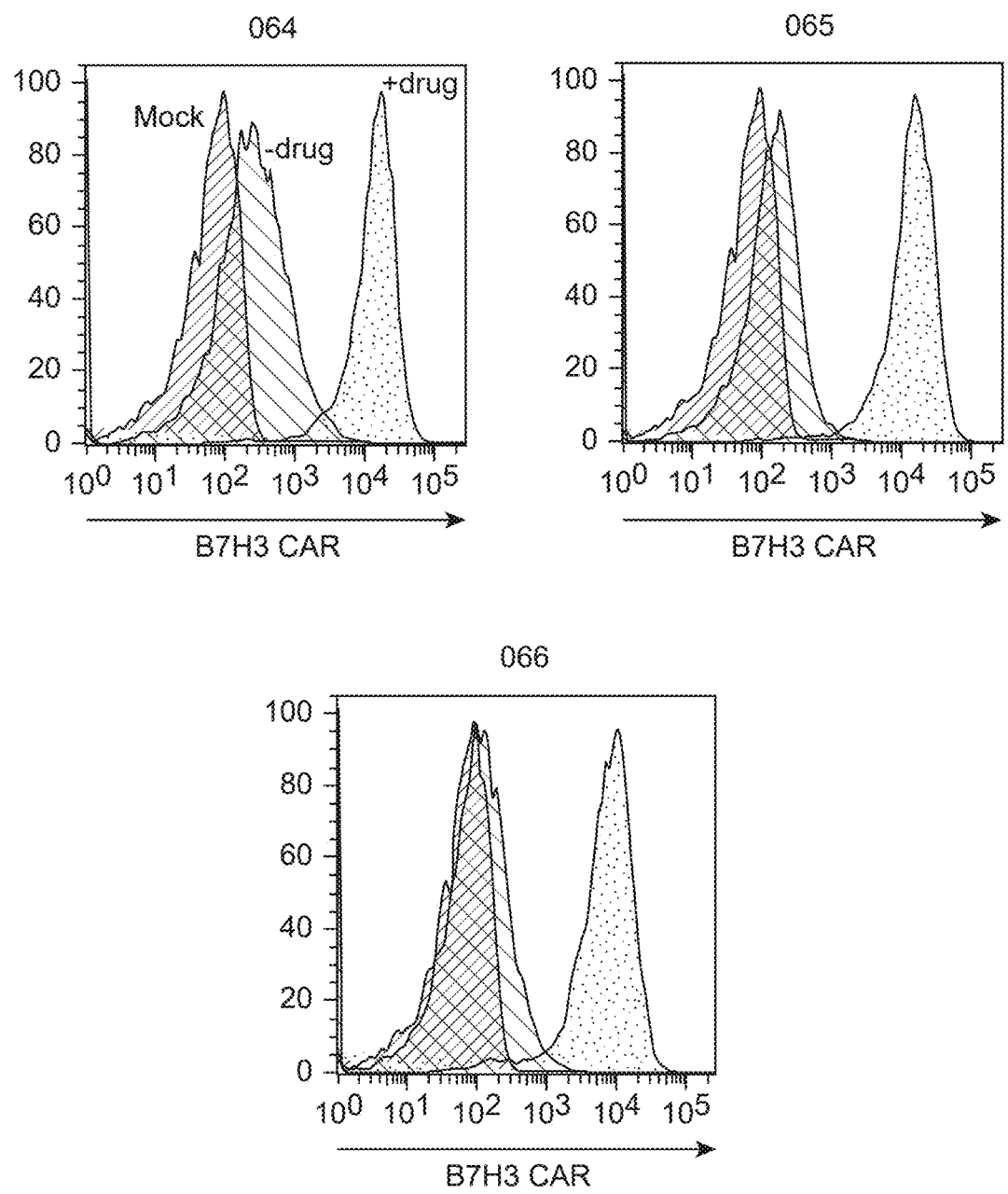
FIG. 17: Panel A: Flow cytometry plots showing the expression of a full-length CAR having the configuration shown in FIG. 5. In this example, the antigen binding portion of the CAR binds to B7H3, and the CAR includes a 4-1BB intracellular signaling domain and a CD3ζ intracellular signaling domain. Expression was determined by staining with B7H3 Fc in the presence or absence of an inhibitor of the protease for various cleavage sites. Panel B: A graph showing the quantification of the flow cytometry plots of panel A. Panel C: A table showing the amino acid sequences and biochemical parameters of the various cleavage sites used. Cleavage site 064 (DEMEECSQH) (SEQ ID NO:5); cleavage site 065 (EDVVPCSMGS) (SEQ ID NO: 8); cleavage site 066 (ECTTPCSGSWL) (SEQ ID NO:9).
Figure 17:
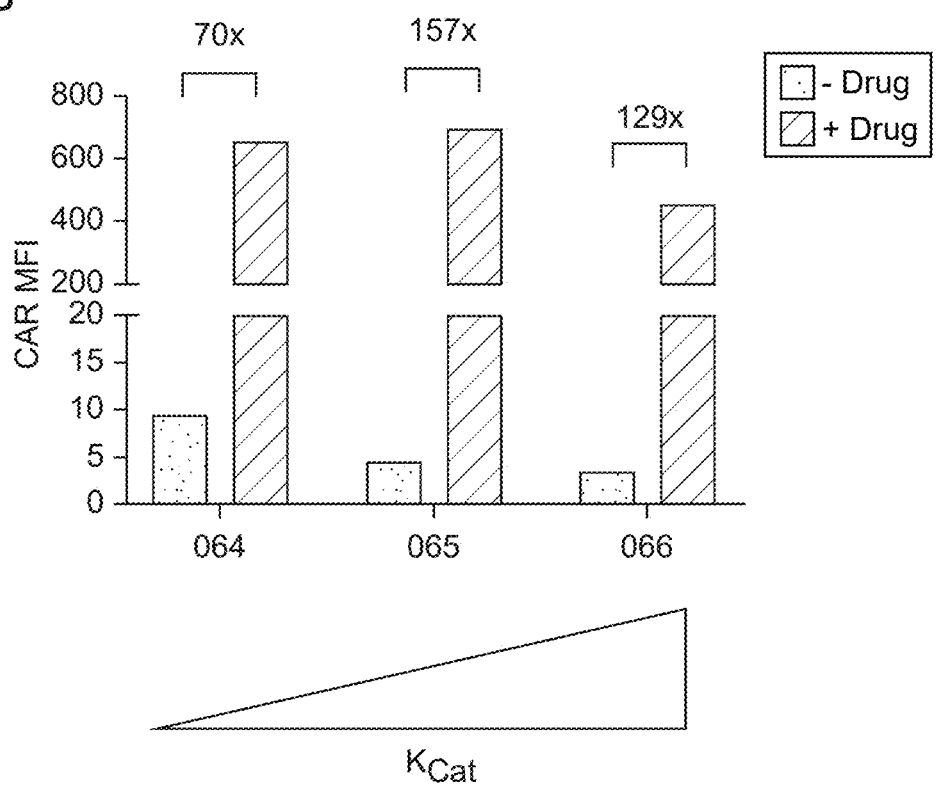

FIG. 17 (panel A) is a series of flow cytometry plots showing the expression of full length B7H3-cis SNIP scFv CAR, as determined by staining with B7H3 Fc, in the presence or absence of 3 µM grazoprevir for various cleavage sites. FIG. 17 (panel B) is a graph showing the quantification of the flow cytometry plots of panel A. FIG. 17 (panel C) is a table showing the amino acid sequences and biochemical parameters of the various cleavage sites used. As can be seen from the data, the choice of cleavage site influences the maximum expression level as well as the level of leakiness.

FIG. 18 (panel A) is a plot showing the time course of B7H3-cis SNIP scFv full length CAR expression, for constructs integrated with various cleavage sites, following administration of 3 µM grazoprevir. FIG. 18 (panel B) is a plot showing the dose response to grazoprevir for the same CAR constructs in panel A. FIG. 18 (panel C) is a table showing the amino acid sequences and biochemical parameters of the various cleavage sites used. As can be seen from the data, the choice of cleavage site influences CAR expression kinetics and drug dose response.

Figure 19:
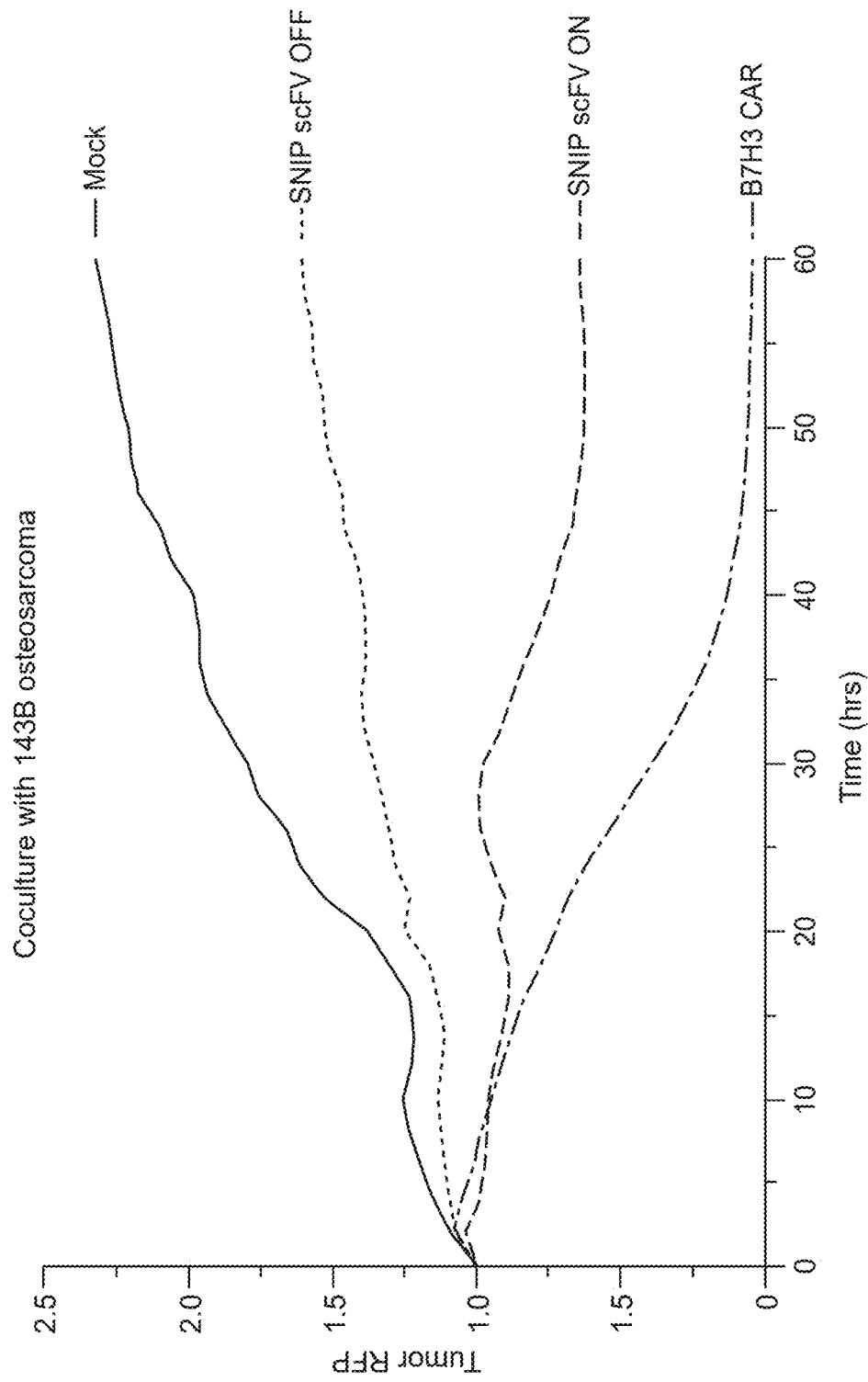
FIG. 19: A graph showing the RFP fluorescence of RFP-expressing 143B osteosarcoma cells which also express the B7H3 antigen. The tumor cells were co-cultured with CAR-T cells having the CAR as described for FIG. 17 in the presence (ON) or absence (OFF) of an inhibitor of the protease.

FIG. 19 is a graph showing RFP fluorescence of RFP expressing 143B osteosarcoma cells which also express the B7H3 antigen. The tumor cells were co-cultured with B7H3-cis SNIP scFv CAR T cells in the presence (ON) or absence (OFF) of 3 M grazoprevir. As determined by tumor RFP fluorescence, the cytotoxic capacity of B7H3-cis SNIP scFv CAR-T cells can be controlled by the addition of the protease inhibitor. Mock untransduced T cells served as a negative control. B7H3-CAR T cells lacking the cis SNIP scFv domains served as a positive control. The data demonstrates that B7H3-cis SNIP scFv CAR T cells have greater cytotoxicity against the tumor cells in the ON state as compared to the OFF state.

Figure 20:
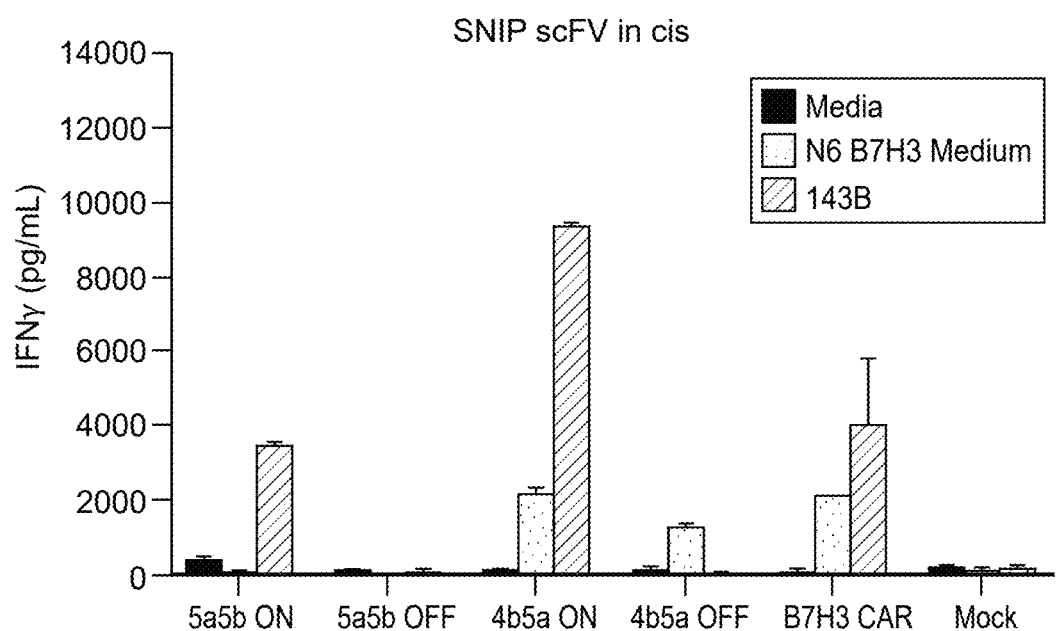
FIG. 20: A graph showing quantification of interferon gamma (IFNγ) levels in co-culture supernatant of B7H3-expressing Nalm6 or 143B tumor cells co-cultured with SNIP scFv CAR T cells bearing a 5a5b or 4b5a cleavage site in the presence ("ON") or absence ("OFF") of 3 μM grazoprevir.

FIG. 20 provides a graph showing quantification of interferon gamma (IFNγ) levels in co-culture supernatant of B7H3-expressing Nalm6 or 143B tumor cells co-cultured with SNIP scFv CAR T cells bearing a 5α5b or 4b5α cleavage site in the presence ("ON") or absence ("OFF") of 3 µM grazoprevir. Constitutively expressed B7H3-BBz CAR and mock T cells serve as positive and negative controls, respectively. The data demonstrates that the CAR T cells secrete cytokines during tumor cell co-cultures only in the presence of the protease inhibitor.

Example 4-Modulation of CAR T Cell Cytotoxic Capacity Using Protease Cleavage Sites of Various Strengths Employed in this example were B7H3-SNIP-BBz CARs as schematically illustrated in FIG. 1, where the CARs differed from one another with respect to the protease cleavage sites: a 4A/4B HCV NS3 protease cleavage site; a 5A/5B HCV NS3 protease cleavage site; and a 4β/5A HCV NS3 protease cleavage site.

Figure 21:
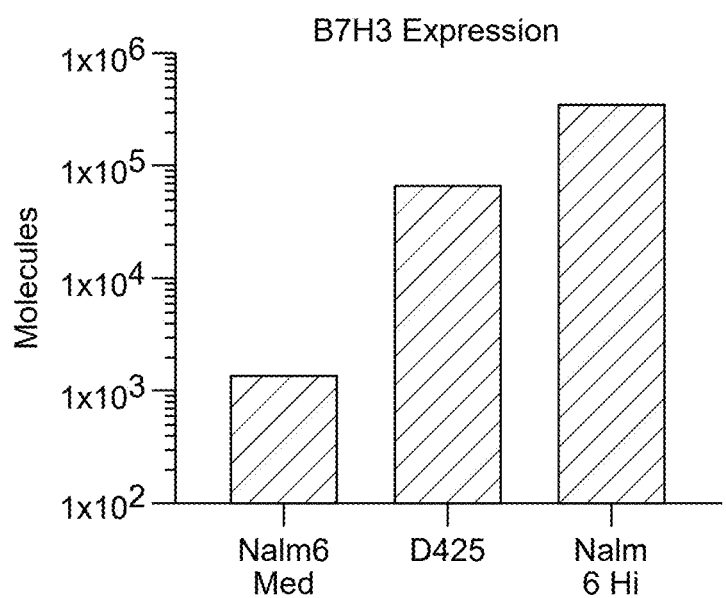
FIG. 21: A graph showing the expression of B7H3 antigen on several tumor cell lines, as determined by flow cytometric analysis of MGA271 stained cells.
Figure 22A:
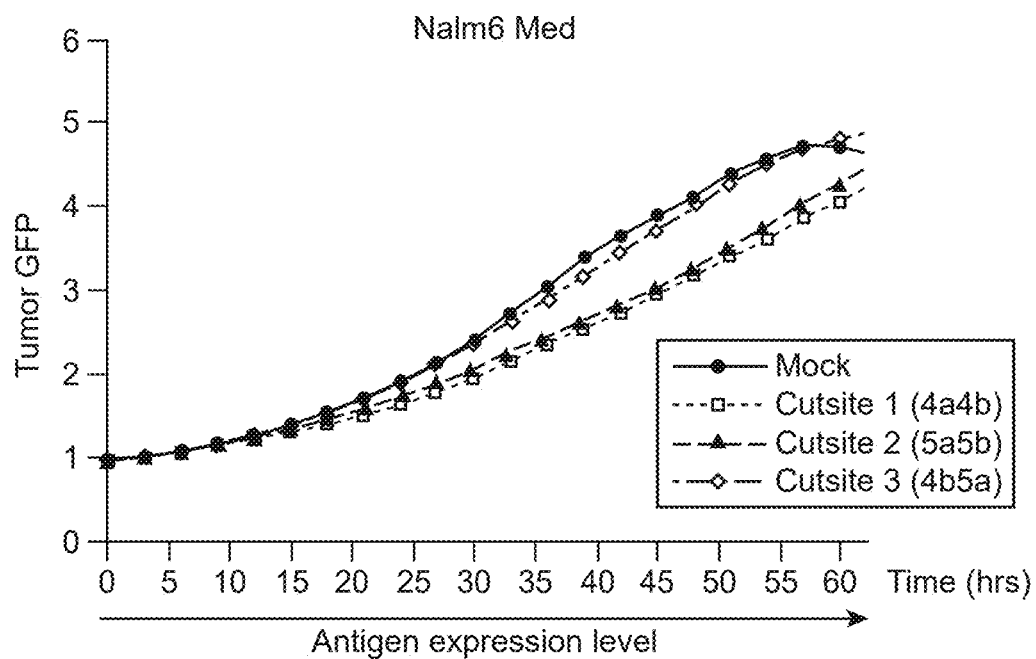
FIGS. 22A-22C: A series of graphs showing the GFP fluorescence of GFP-labeled tumor cells (Nalm6 Med, D425, Nalm6 Hi) that express the B7H3 antigen. The tumor cells were co-cultured with CAR T cells (as described for FIG. 6) in the absence of an inhibitor of the protease.
Figure 22B:
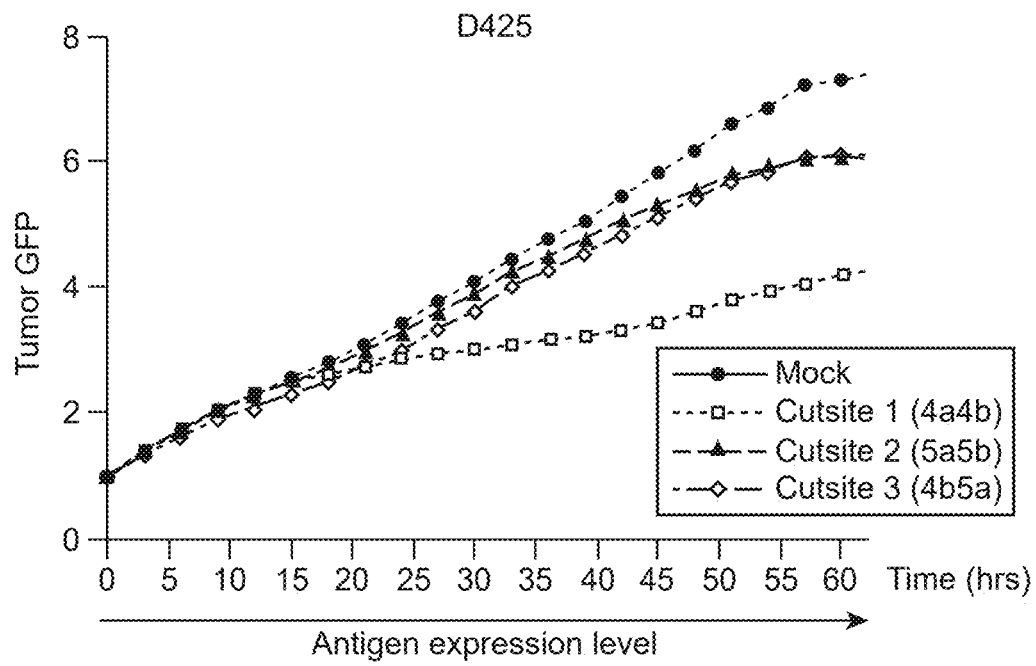
Figure 22C:
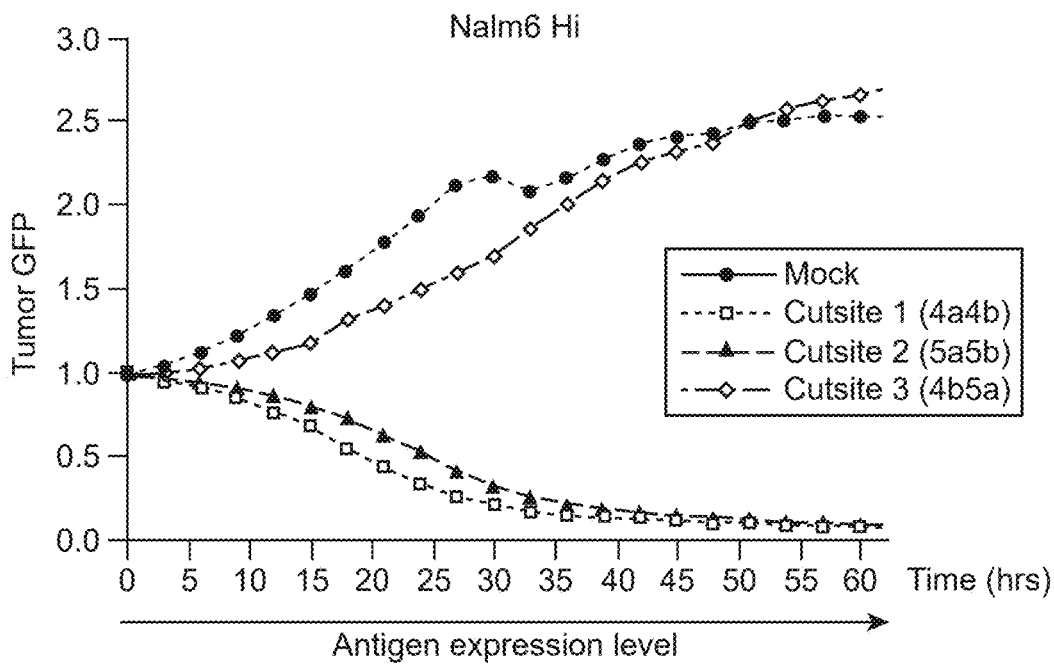
Figure 23A:
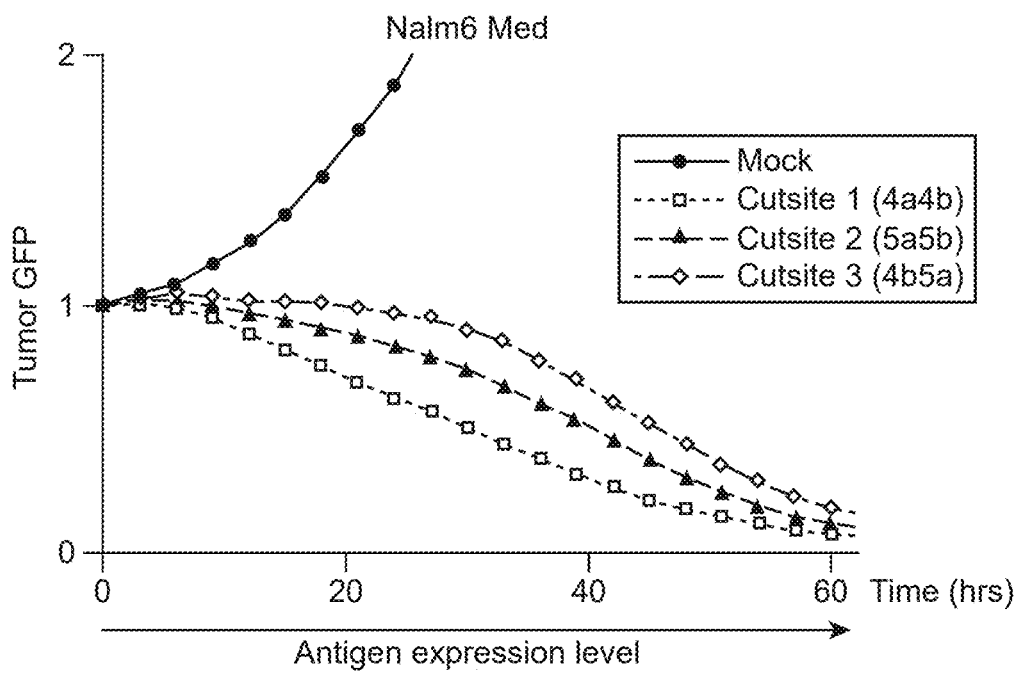
FIGS. 23A-23C: A series of graphs showing the GFP fluorescence of GFP-labeled tumor cells (Nalm6 Med, D425, Nalm6 Hi) that express the B7H3 antigen. The tumor cells were co-cultured with CAR T cells (as described for FIG. 6) in the presence of an inhibitor of the protease.
Figure 23B:
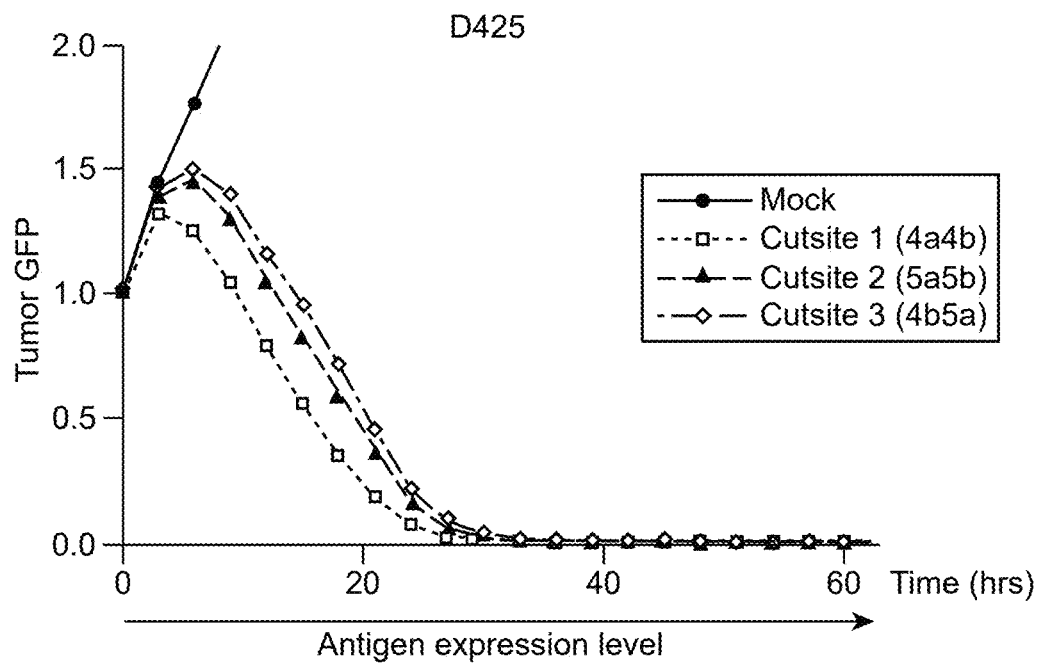
Figure 23C:
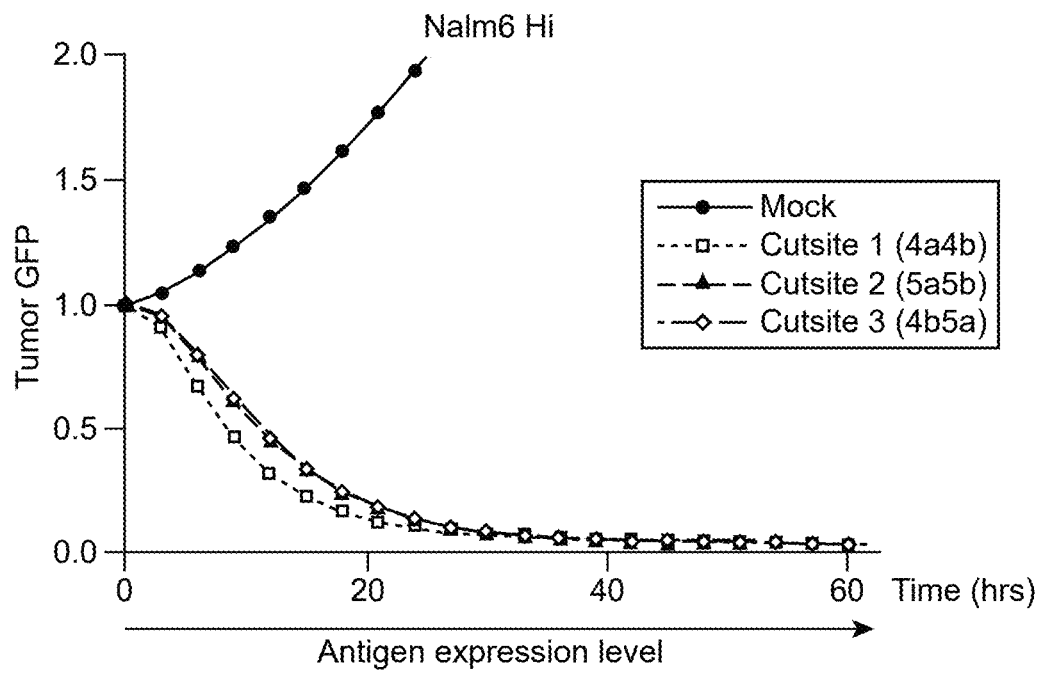

FIG. 21 is a graph showing the expression of B7H3 antigen on several tumor cell lines (Nalm6 Med, D425, Nalm6 Hi), as determined by flow cytometric analysis of MGA271 stained cells. FIG. 22 shows a series of graphs showing the GFP fluorescence of the GFP-labeled tumor cells of FIG. 21. The tumor cells were co-cultured with B7H3-SNIP-BBz T cells in the absence of protease inhibitor ("OFF"). The basal cytotoxic capacity of the B7H3-SNIP-BBz cells in the OFF condition is modulated by the strength of the cleavage site and antigen expression level on the tumor cells. FIG. 23 shows a series of graphs showing the GFP fluorescence of the GFP-labeled tumor cells of FIG. 21. The tumor cells were co-cultured with B7H3-SNIP-BBz T cells in the presence of 3 µM grazoprevir ("ON"). The cytotoxic capacity of the B7H3-SNIP-BBz cells in the ON state is modulated by the strength of the cleavage site and antigen expression level on the tumor cells. The present example demonstrates that the cytotoxic capacity of CAR T cells may be modulated by employing protease cleavage sites of various strengths.

Example 5-Modulation of In Vivo CAR T Cell Activity Via Selection of Protease Cleavage Site Employed in this example were B7H3-SNIP-BBz CARs and the SNIP system as schematically illustrated in FIG. 1. In this example, NSG mice were infused with 1×10⁶ Med8A medulloblastoma cells which express firefly luciferase. Five days later, mice were infused with 8×10⁶ β7H3-SNIP-BBz CAR T cells in which the B7H3-SNIP-BBz CAR had one of three protease cleavage ("cut") sites. Also tested was a SNIP variant ("Kcat Hi") containing the NS3 protease variant A54T determined to exhibit increased catalytic efficiency (SEQ ID NO:2).

Mice that received B7H3-SNIP-BBz CAR-T cells were either administered 50 mg/kg grazoprevir+25 mg/kg ritonavir (CAR ON) three times per day by oral gavage or no drug (CAR OFF). Bioluminescence imaging was used to follow the expansion of the firefly luciferase-expressing MED8A cells. As shown in FIG. 26, leakiness of activity of the CAR can be reduced by choosing stronger cleavage sites or engineering the protease to be more catalytically efficient. Cut site 3 displayed no leakiness in activity but required additional drug dosing (indicated by arrow) to clear the tumor in the "CAR ON" state, whereas "Kcat Hi" had minimal leakiness in the "CAR OFF" state and could clear the tumor at the typical drug dosing regimen in the "CAR ON" state.

Figure 27:
FIG. 27: An anti-CD3ζ western blot of protein extracted from primary human T cells transduced with a B7H3-SNIP-BBz CAR and cultured in absence of drug to determine efficiency of proteolytic cleavage of the CAR by the NS3 protease.

Example 6-Efficiency of CAR Cleavage in Trans SNIP Systems with Matched and Mismatched Transmembrane Domains Employed in this example were B7H3-SNIP-BBz CARs and the SNIP system as schematically illustrated in FIG. 1, where the transmembrane domains of the CAR and protease were either the same (matched) or different (mismatched). Employed in this particular example were CD8α and CD28 transmembrane domains. Shown in FIG. 27 is an anti-CD3ζ western blot of protein extracted from primary human T cells transduced with a B7H3-SNIP-BBz CAR and cultured in absence of drug to determine the efficiency of proteolytic cleavage of the CAR by the NS3 protease. As can be seen in the western blot, matched transmembrane domains (e.g., CD8α transmembrane with CD8α transmembrane) between the CAR and the protease result in more complete cleavage compared to mismatched transmembrane domains (e.g., CD8α transmembrane with CD28 transmembrane). This difference in efficiency might be due to self-association of transmembrane domains, which would bring the protease into close proximity with the CAR and promote cleavage.

Example 7-Dose Dependence of SNIP-CAR T Cell Cytotoxicity and Cytokine Secretion Employed in this example were B7H3-SNIP-BBz CARs and the SNIP system as schematically illustrated in FIG. 1. Nalm6 leukemia cells and 143B osteosarcoma cells were co-cultured with B7H3-SNIP-BBz T cells in various concentrations of grazoprevir (drug).

Figure 28:
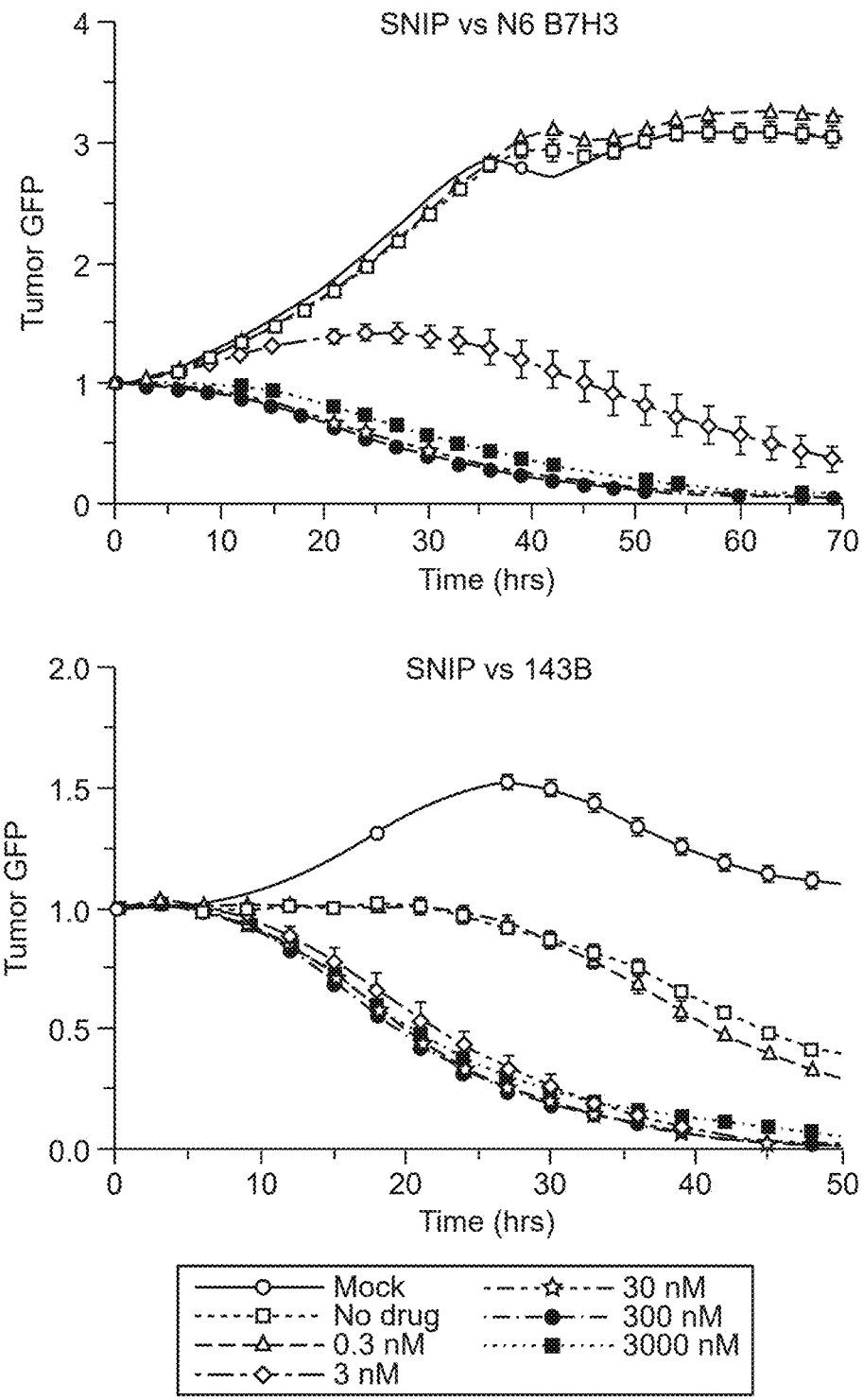
FIG. 28: Data demonstrating dose dependence of SNIP-CAR T cell cytotoxicity and cytokine secretion. Panel A: A series of graphs showing the GFP fluorescence of GFP-labeled Nalm6 leukemia cells (left) and 143B osteosarcoma cells (right) co-cultured with B7H3-SNIP-BBz CAR-T cells with the indicated concentration of grazoprevir (GPV). Panel B: A series of graphs showing the levels of IFNγ and IL-2 cytokine secreted in the co-cultures described in Panel A.
Figure 28:
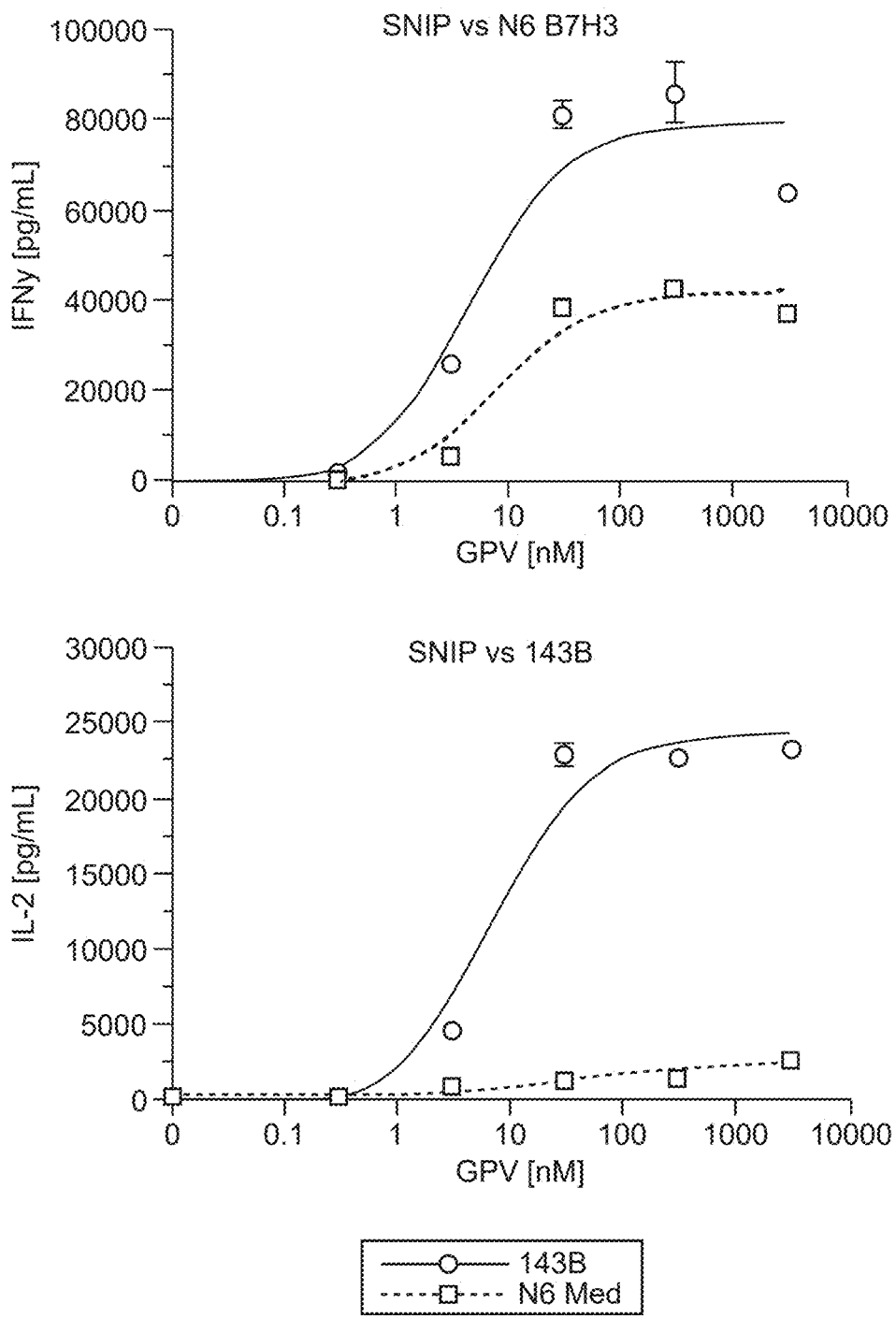

Shown in FIG. 28, panel A, is a series of graphs showing the GFP fluorescence of GFP-labeled Nalm6 leukemia cells (left) and 143B osteosarcoma cells (right). As shown, the cytotoxic capacity of B7H3-SNIP-BBz cells can be controlled by the addition of drug, as determined by tumor GFP fluorescence. Mock untransduced T cells served as a negative control. B7H3-CAR T cells lacking the protease cleavage site served as a positive control.

Shown in FIG. 28, panel B, is a series of graphs showing the levels of IFNγ and IL-2 cytokine secreted in the co-cultures described in Panel A. The data demonstrate that the cytotoxic and cytokine secretion capacity of the CAR-T cells can be controlled by the level of drug added to the culture.

Example 8-on and Off Kinetics of SNIP-CAR T Cells

Figure 29:
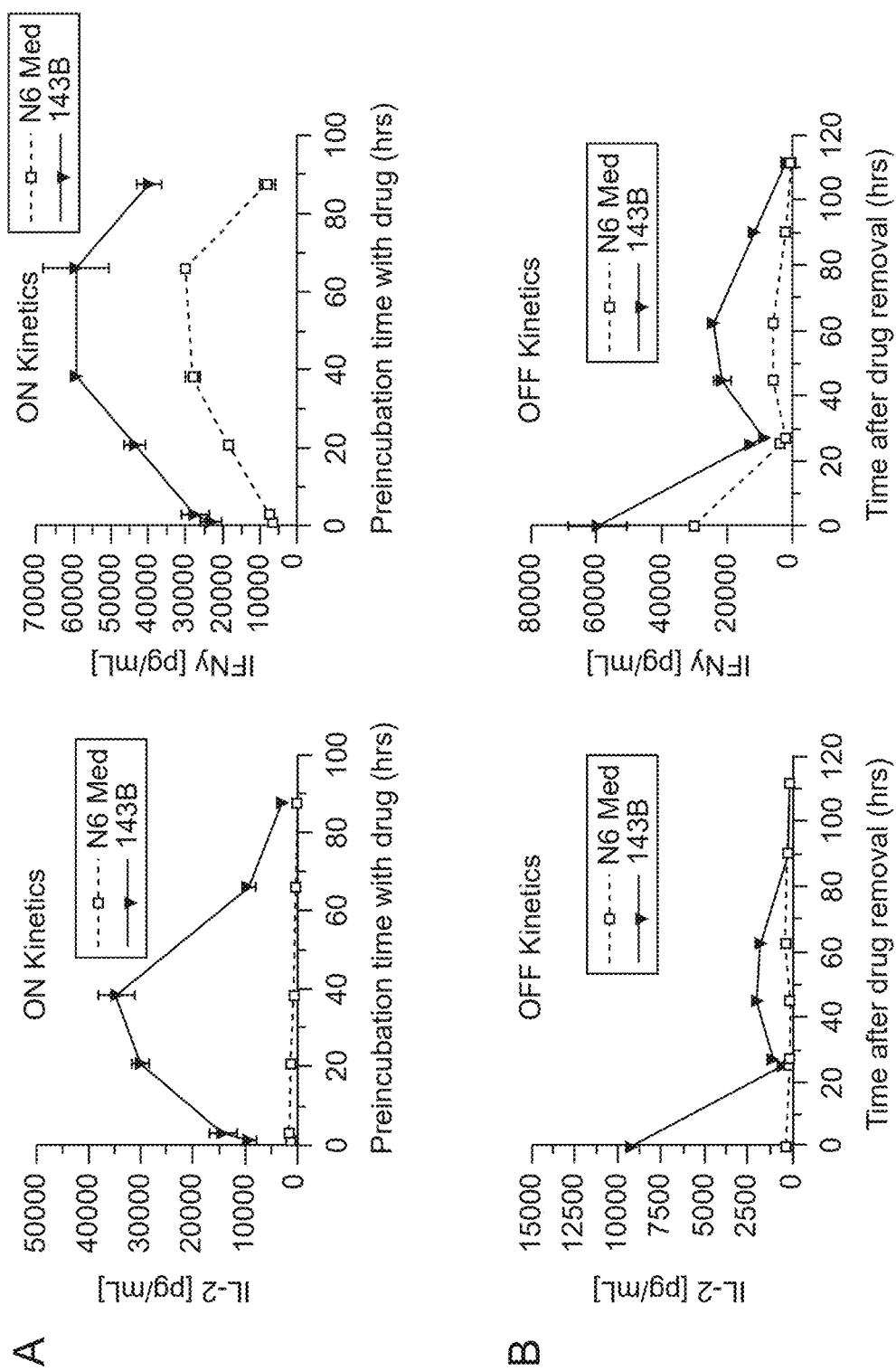
FIG. 29: Data demonstrating On and Off kinetics of SNIP-CAR T cells. Panel A: A series of graphs showing the levels of IFNγ and IL-2 cytokine levels in tumor co-cultures after pre-incubation with 3 μM grazoprevir (drug) for various amount of time prior to co-culture. Drug was also present during the co-culture. Panel B: A series of graphs showing the levels of IFNγ and IL-2 cytokine levels in tumor co-cultures after removal of 3 μM grazoprevir (drug) for various amount of time prior to co-culture. Drug was absent during the co-culture.

Assessed in this example were the On and Off kinetics of B7H3-SNIP-BBz CAR-T cells comprising the SNIP system schematically illustrated in FIG. 1. Shown in FIG. 29, panel A, is a series of graphs showing the levels of IFNγ and IL-2 cytokine levels in tumor co-cultures after pre-incubation with 3 μM grazoprevir (drug) for various amount of time prior to co-culture. Drug was also present during the co-culture. Co-culture supernatant was harvested 24 hours after initiation of the co-culture and analyzed for cytokine secretion by ELISA. Shown in FIG. 29, panel B, is a series of graphs showing the levels of IFNγ and IL-2 cytokine levels in tumor co-cultures after removal of 3 μM grazoprevir (drug) for various amount of time prior to co-culture. Drug was absent during the co-culture. Co-culture supernatant was harvested 24 hours after initiation of the co-culture and analyzed for cytokine secretion by ELISA. These data demonstrate that SNIP CAR-T cells become capable of secreting IFNγ and IL-2 rapidly after coming into contact with drug, as shown in FIG. 29 panel A. The capacity to secrete these cytokines decreases after prolonged exposure to drug, especially IL-2, which is likely a result of the CAR-T cells becoming exhausted from the tonic signaling that occurs with the SNIP B7H3 CAR in the "ON" state. These diminished cytokine levels become comparable to constitutive B7H3 CAR-T cells. The data in FIG. 29 (panel B) demonstrate that the SNIP CAR-T cells rapidly lose the capacity to secrete IFNγ and IL-2 after removal of drug from the culture medium. These ON and OFF kinetics are desirable in a clinical setting because they allow for rapid responses to drug conditions.

Example 9-In Vivo Anti-Tumor Efficacy of SNIP CAR-T Cells Compared to the Constitutive CAR-T Cells In this example, the anti-tumor efficacy of SNIP CAR-T cells (trans configuration) and the corresponding constitutive CAR-T cells was assessed in vivo in various mouse tumor models.

Figure 30:
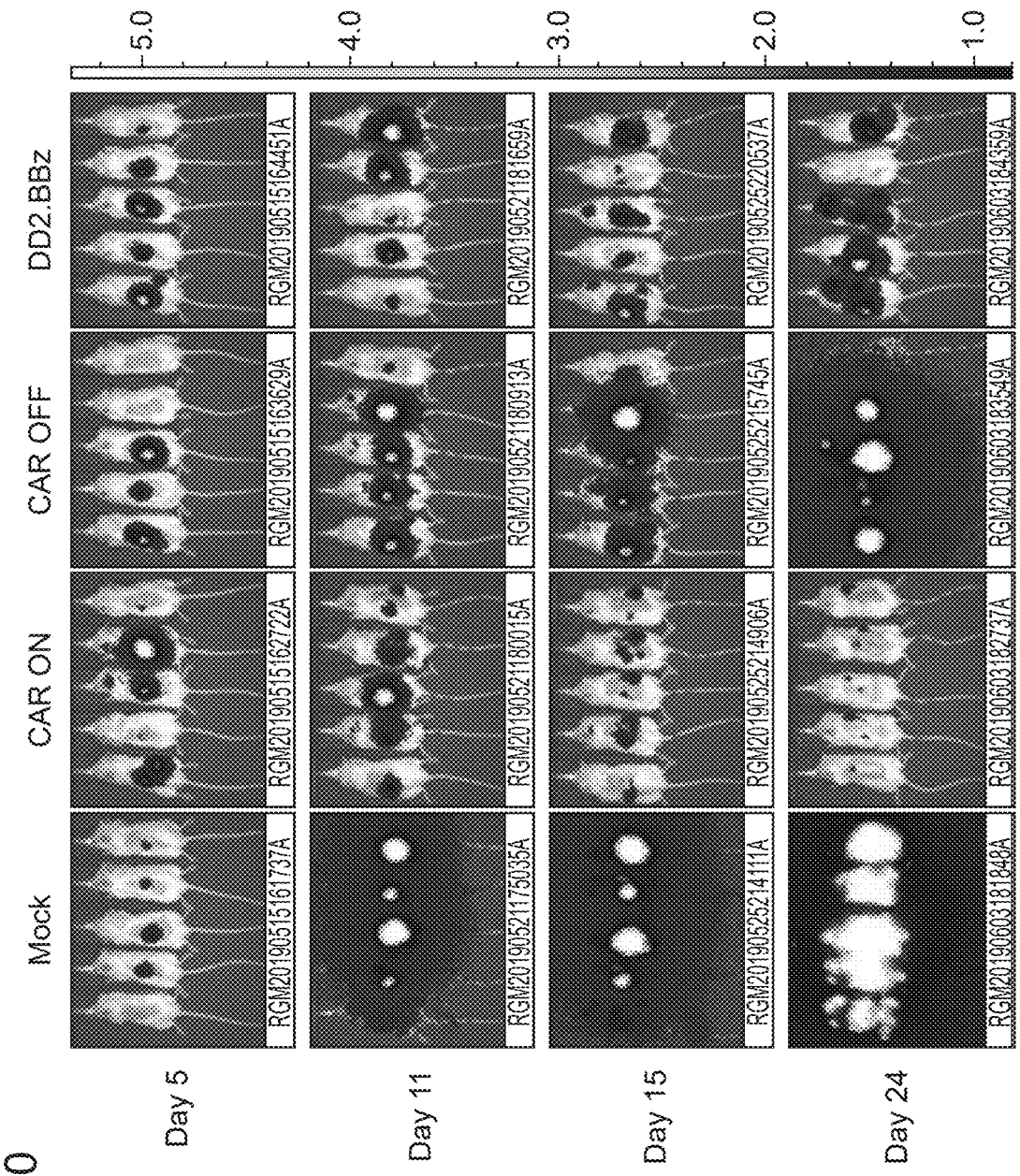
FIG. 30: Data demonstrating that GD2 SNIP CAR-T cells have greater anti-tumor efficacy compared to constitutive GD2 CAR-T cells in an orthotopic neuroblastoma model. Panel A: A series of bioluminescent images tracking the growth of CHLA255 neuroblastoma cells, which express firefly luciferase. Panel B: Quantification of the bioluminescent imaging seen in Panel A.
Figure 30:
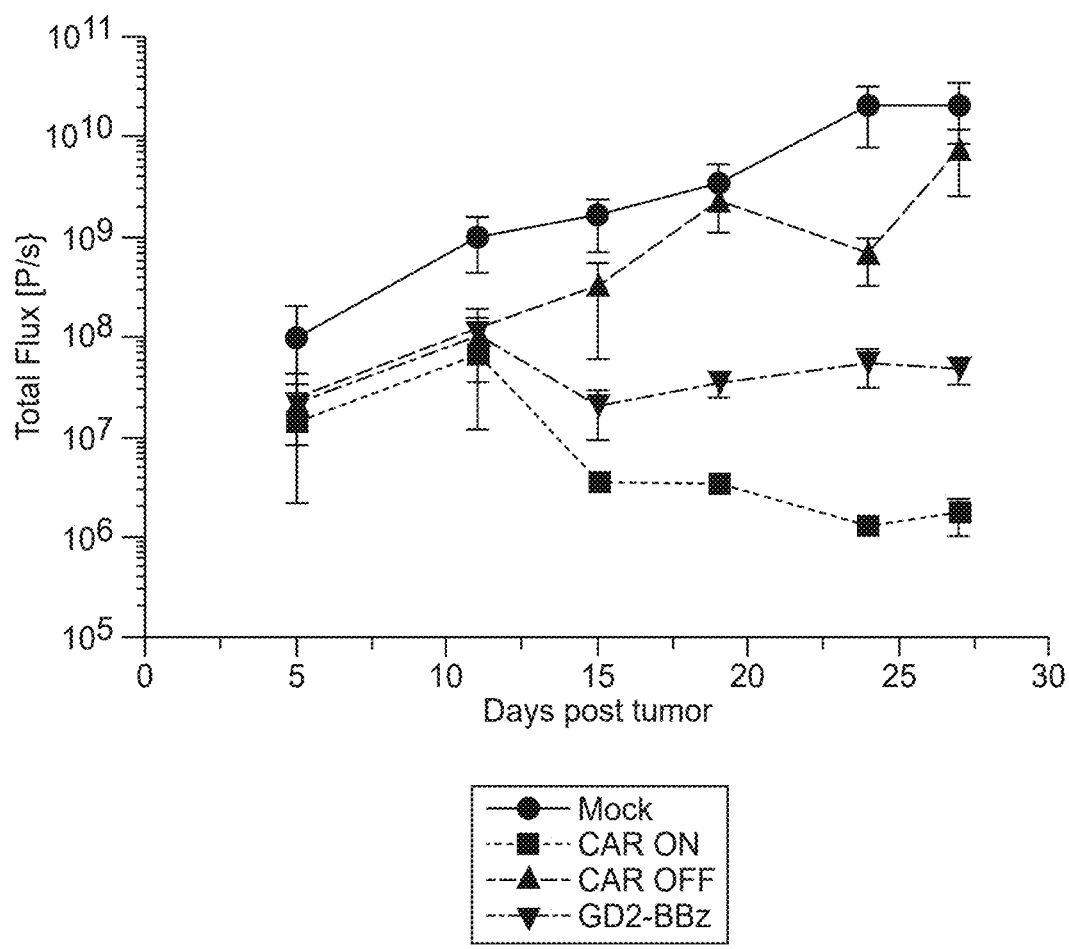

Data for GD2-SNIP-BBz CAR-T cells and the corresponding constitutive CAR-T cells in an orthotopic neuroblastoma model (kidney capsule) is provided in FIG. 30. Shown in panel A is a series of bioluminescent images tracking the growth of CHLA255 neuroblastoma cells, which express firefly luciferase. At day 0, NSG mice were infused with $1 \times 10^6$ CHLA255 cells in the kidney capsule, and then treated with the indicated CAR-T cells. Seven days later, $10 \times 10^{\wedge 6}$ CAR-T or control cells were implanted by tail vein injection. Mice in the "CAR ON" group were also implanted with an osmotic drug pump (Azlet model 2002) containing 54 mg/mL grazoprevir and 0.6 mg/mL ritonavir. These mice were additionally dosed with 50 mg/kg grazoprevir and 25 mg/kg ritonavir by oral gavage 1-2 times per day. Shown in FIG. 30, panel B, is the quantification of the bioluminescent imaging seen in panel A. As can be seen in the data, GD2-SNIP-BBz CAR-T cells have greater anti-tumor activity in the CAR ON state compared with the standard constitutive CAR (GD2-BBz).

Figure 31A:
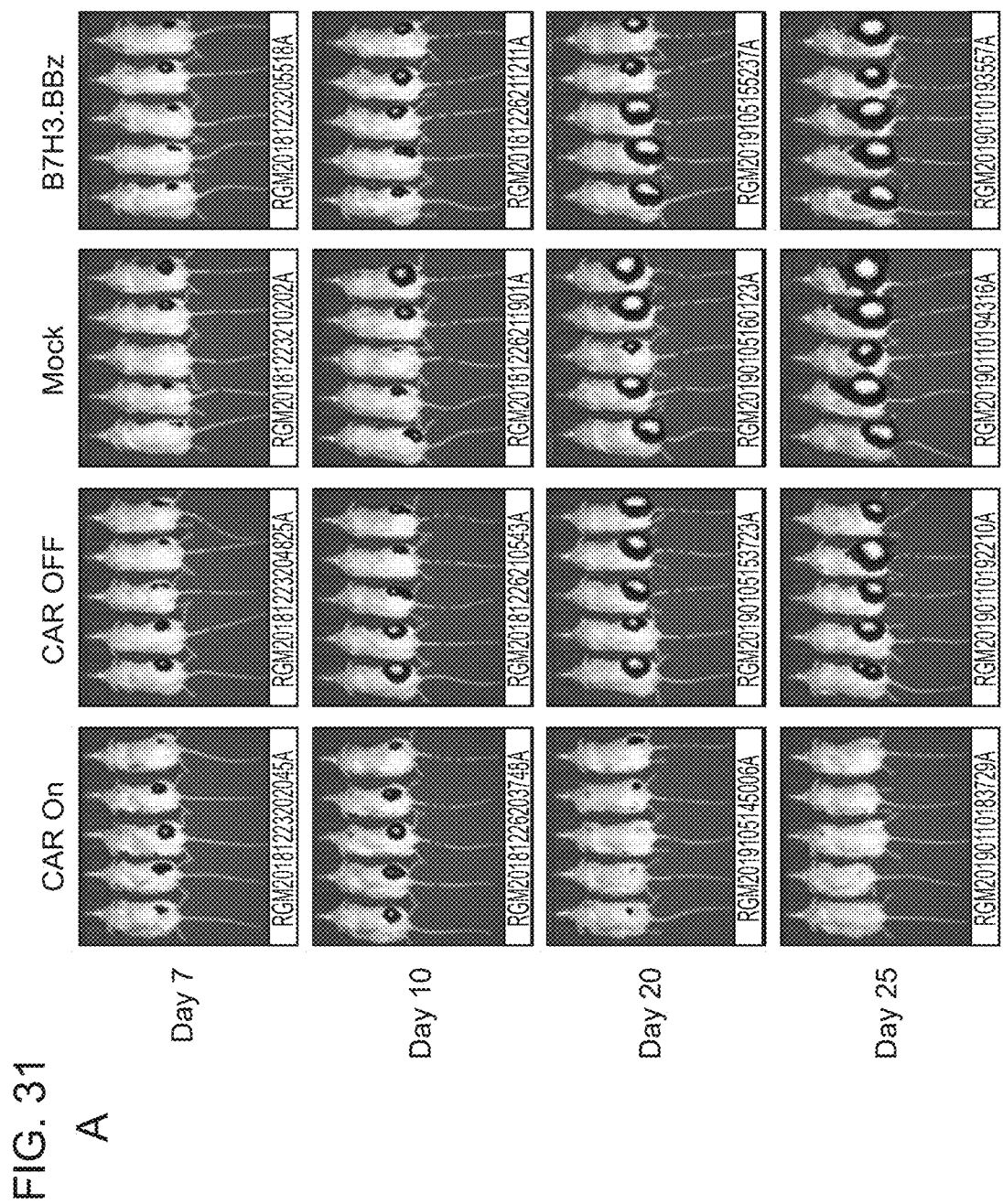
FIG. 31: Data demonstrating that B7H3 SNIP CAR-T cells have greater anti-tumor efficacy compared to constitutive B7H3 CAR-T cells in a medulloblastoma flank model. Panel A: A series of bioluminescent images tracking the growth of medulloblastoma cells (MED8A), which express firefly luciferase, and then treated with the indicated CAR-T cells. Panel B: Quantification of the bioluminescent imaging of Panel A.
Figure 31:
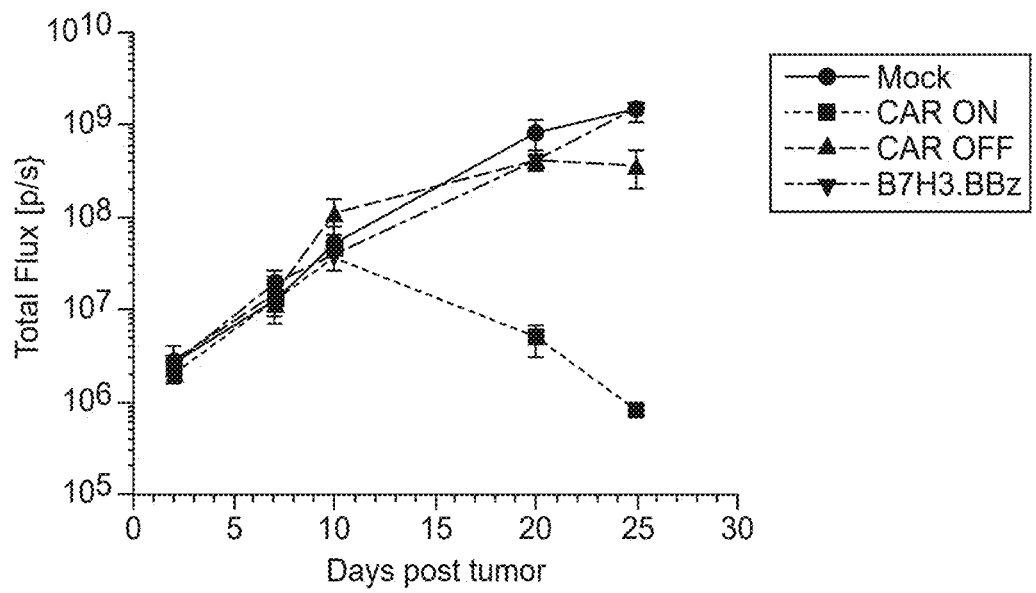

Data for B7H3-SNIP-BBz CAR-T cells and the corresponding constitutive CAR-T cells in a medulloblastoma flank model is provided in FIG. 31. Shown in panel A is a series of bioluminescent images tracking the growth of medulloblastoma cells (MED8A), which express firefly luciferase, and then treated with the indicated CAR-T cells. At day 0, NSG mice were infused with $1 \times 10^6$ MED8A cells in the right flank. Five days later, $8 \times 10^6$ CAR-T or control cells were implanted by tail vein injection. Mice in the "CAR ON" group were also given 50 mg/kg grazoprevir and 25 mg/kg ritonavir by oral gavage 3 times per day. Shown in panel B is the quantification of the bioluminescent imaging seen in panel A. As can be seen in the data, B7H3-SNIP-BBz CAR-T cells have greater anti-tumor activity in the CAR ON state compared with the standard constitutive CAR (B7H3-BBz).

Figure 32:
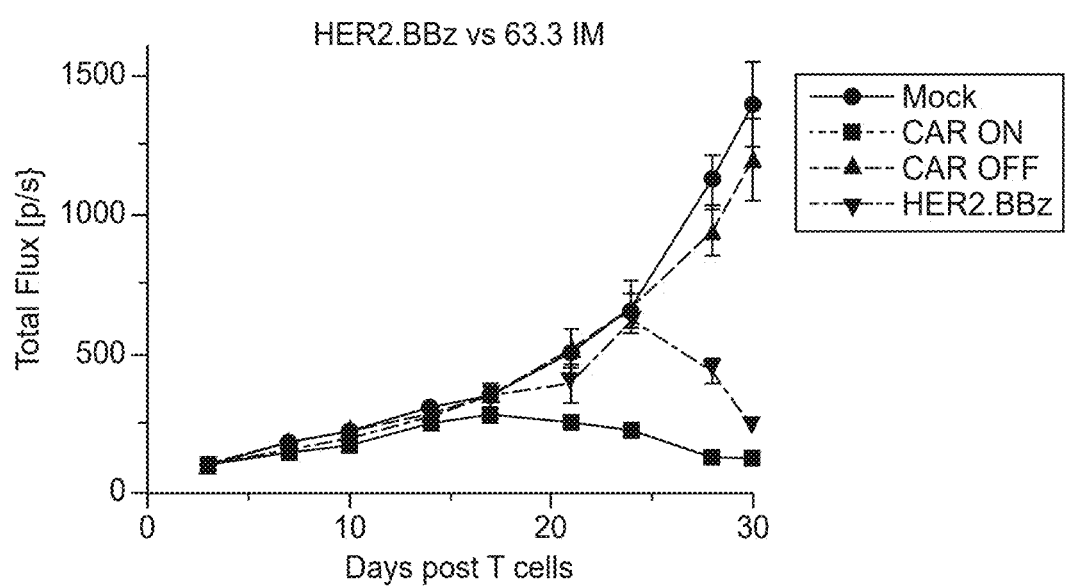
FIG. 32: A graph showing tumor size of mice that were implanted with 63.3 osteosarcoma cells, which express firefly luciferase, and then treated with the indicated CAR-T cells.

Data for HER2-SNIP-BBz CAR-T cells and the corresponding constitutive CAR-T cells in an orthotopic osteosarcoma model is provided in FIG. 32. Shown in FIG. 32 is a graph of the tumor size of mice that were implanted with 63.3 osteosarcoma cells, which express firefly luciferase, and then treated with the indicated CAR-T cells. At day 0, NSG mice were infused with $1 \times 10^6$ 63.3 cells in the right leg. At day 18 days, $1 \times 10^7$ CAR-T or control cells were implanted by tail vein injection. Mice in the "CAR ON" group were also implanted with an osmotic drug pump (Azlet model 2002) containing 54 mg/mL grazoprevir and 0.6 mg/mL ritonavir. These mice were additionally dosed with 50 mg/kg grazoprevir and 25 mg/kg ritonavir by oral gavage 1-2 times per day. As can be seen in the data, HER2-SNIP-BBz CAR-T cells have greater antitumor activity in the CAR ON state compared with the standard constitutive CAR (HER2-BBz).

In the preceding experiments, the improved anti-tumor activity of the SNIP CAR-T cells could be attributed to reduced levels of tonic signaling and dynamic full-length CAR expression profile, which follows the pharmacokinetics of the administered drug. In contrast, constitutive expression of the corresponding CAR results in high tonic signaling and over-activation of T cells, which might lead to exhaustion and diminished anti-tumor activity.

Figure 33A:
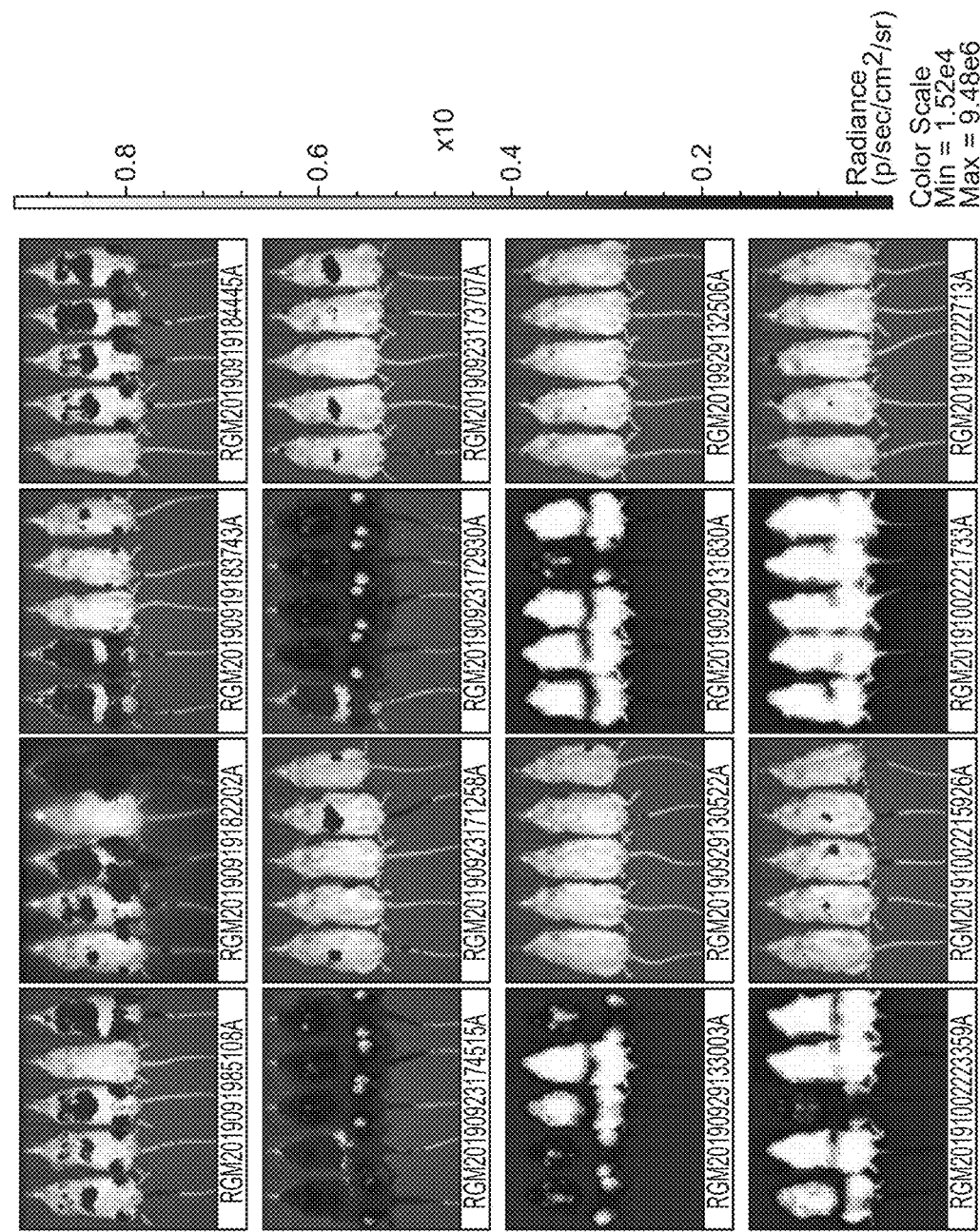
FIG. 33: Data demonstrating that CD19 SNIP CAR-T cells have equivalent anti-tumor efficacy compared to constitutive CD19 CAR-T cells in an orthotopic leukemia model. Panel A: A series of bioluminescent images tracking the growth of Nalm6 leukemia cells, which express firefly luciferase. Panel B: Quantification of the bioluminescent imaging seen in Panel A.
Figure 33:
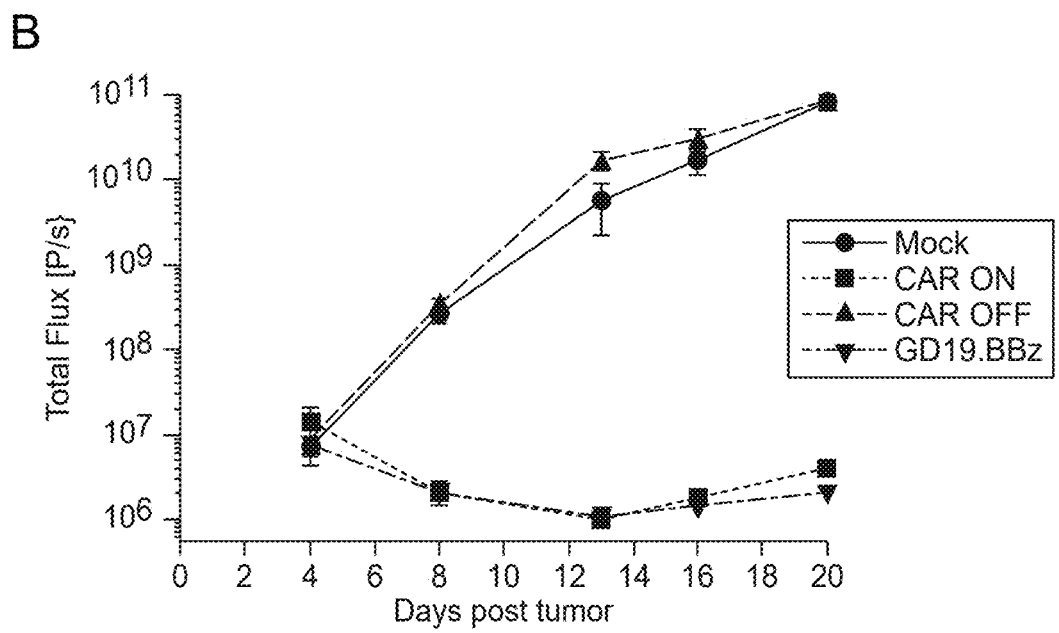

Data for CD19-SNIP-BBz CAR-T cells and the corresponding constitutive CAR-T cells in an orthotopic leukemia model is provided in FIG. 33. Shown in panel A is a series of bioluminescent images tracking the growth of Nalm6 leukemia cells, which express firefly luciferase. At day 0, NSG mice were infused with $1 \times 10^6$ Nalm6 cells by tail vein injection, and then treated with the indicated CAR-T cells. Four days later, $5 \times 10^6$ CAR-T or control cells were implanted by tail vein injection. Mice in the "CAR ON" group were also implanted with an osmotic drug pump (Azlet model 2002) containing 54 mg/mL grazoprevir and 0.6 mg/mL ritonavir. These mice were additionally dosed with 50 mg/kg grazoprevir and 25 mg/kg ritonavir by oral gavage 1-2 times per day. Shown in panel B is the quantification of the bioluminescent imaging seen in panel A. As can be seen in the data, CD19-SNIP-BBz CAR-T cells display equivalent anti-tumor activity in the CAR ON state compared with the standard constitutive CAR (CD19-BBz). Interestingly of all the CARs tested in the SNIP system, the CD19-SNIP-BBz CAR was the only one that did not yield enhanced anti-tumor activity compared to the corresponding constitutive CAR. This might be due to the CD19.BBz CAR being less prone to exhaustion than other CARS because it does not suffer from tonic signaling (see Long et al., Nat Med 2015). Moreover, T cell exhaustion due to antigen exposure and the tumor microenvironment is more severe in solid tumors (e.g. GD2 CAR vs neuroblastoma, HER2 CAR vs osteosarcoma, and B7H3 CAR vs medulloblastoma) than hematologic tumors (e.g. CD19 CAR vs leukemia).

Figure 34:
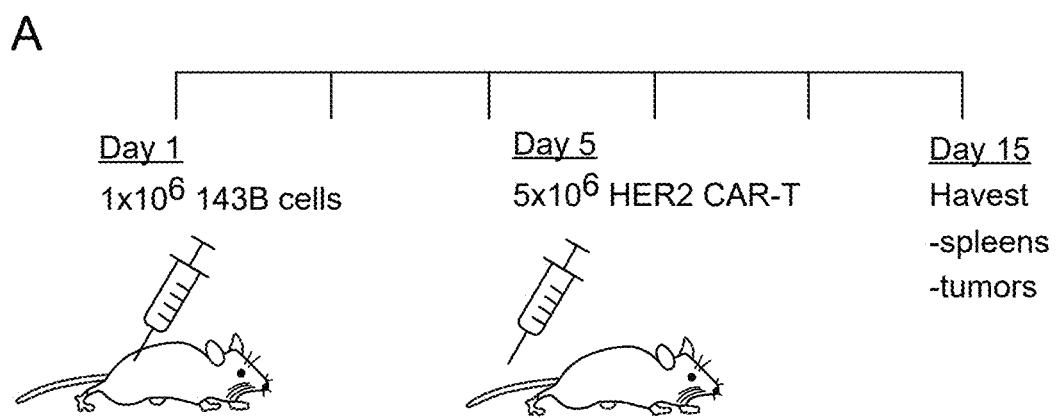
FIG. 34: Data demonstrating that SNIP CAR-T cells isolated from spleen and tumor display a more functional phenotype than the constitutive HER2 CAR. Panel A: A schematic of the experimental setup of an orthotopic osteosarcoma model treated with HER2 CAR-T cells. Panel B: A graph showing the tumor sizes of mice treated with the indicated CAR-T cells at day 10 post treatment. Panel C: A graph showing the persistence of CAR % cells isolated from spleens. Panel D: A graph showing the percent of CD4 and CD8 cells isolated from spleens.

Example 10-SNIP CAR-T Cells Display a More Functional Phenotype, have Greater Proportions of Memory T Cells, Exhibit Reduced Expression of Exhaustion Markers, and are More Responsive to Ex Vivo Stimulation than the Corresponding Constitutive CAR-T Cells In this example, the phenotype of HER2-SNIP-BBz CAR-T cells was assessed in an orthotopic osteosarcoma model. The experimental setup is schematically illustrated in FIG. 34, panel A. At day 0, NSG mice were infused with $1\times10^6$ $^{143}$B cells in the right leg. Five days later, $5\times10^6$ of HER2-SNIP-BBz CAR-T cells, constitutive HER2.BBZ, or Mock control cells were implanted by tail vein injection. Mice in the "SNIP ON" group were also implanted with an osmotic drug pump (Azlet model 2002) containing 54 mg/mL grazoprevir and 0.6 mg/ml ritonavir. These mice were additionally dosed with 50 mg/kg grazoprevir and 25 mg/kg ritonavir by oral gavage 2 times per day. On day 15, T cells from spleens and tumors were extracted and analyzed ex vivo.

Shown in FIG. 34, panel B, is a graph showing the tumor sizes of mice treated with the indicated CAR-T cells at day 10 post treatment. The data demonstrate that HER2-SNIP-BBz CAR-T cells have greater anti-tumor efficacy in the "ON" state compared to the HER2-BBz constitutive CAR-T cells. A graph showing the persistence of CAR % cells isolated from spleens is shown in FIG. 34, panel C. The data demonstrate that HER2-SNIP-BBz CAR-T cells have greater persistence than constitutive HER2-BBz CAR-T cells. A graph showing the percent of CD4 and CD8 cells isolated from spleens is shown in FIG. 34, panel D. The data demonstrate that HER2-SNIP-BBz CAR-T cells have a healthier balance of CD4 to CD8 cells (~50%) compared to constitutive HER2-BBz CAR-T cells.

Figure 35:
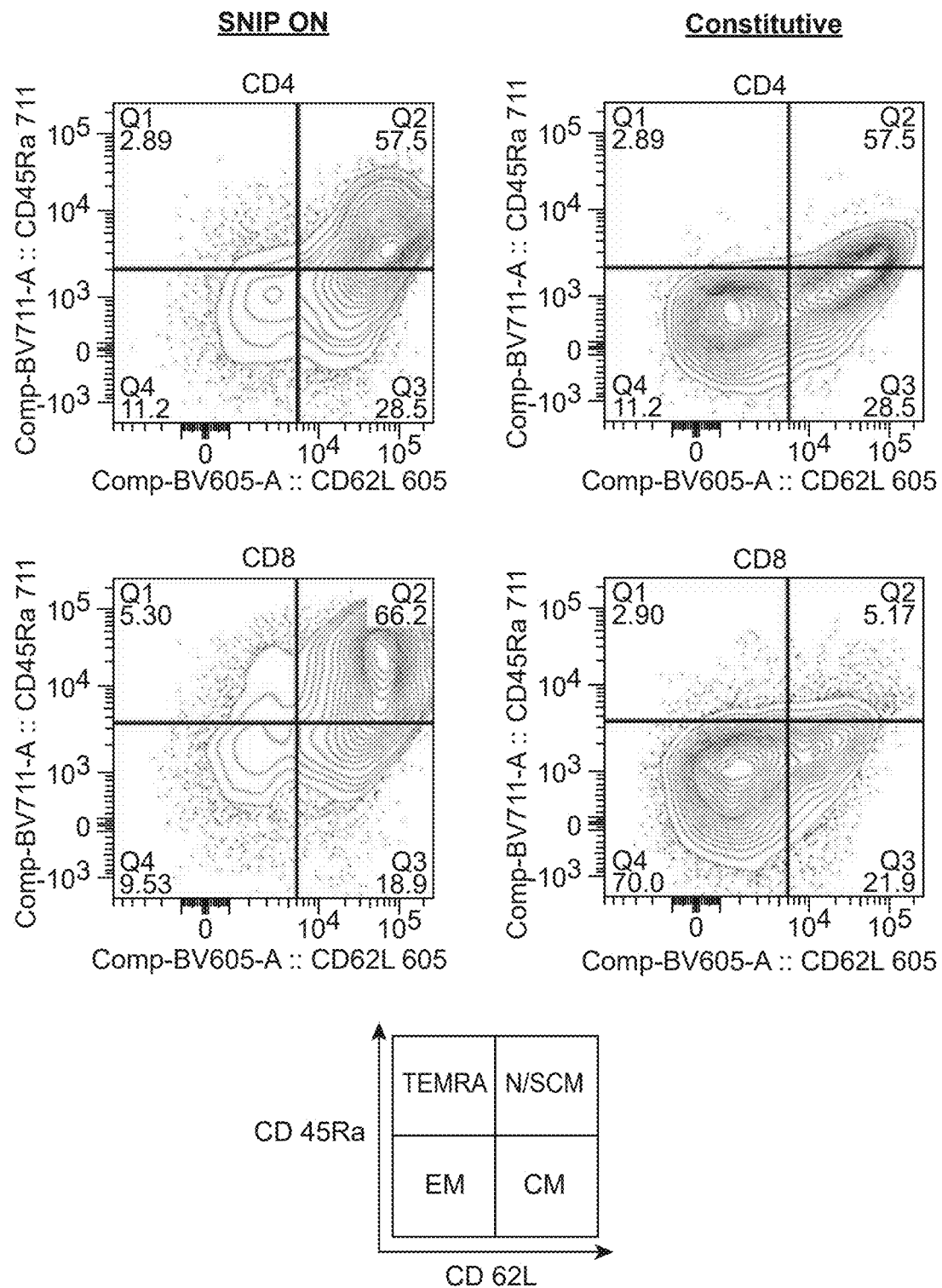
FIG. 35: A series of flow cytometry plots showing expression of CD62 ligand (x-axis) and CD45Rα (y-axis) for CD4 and CD8 cells isolated from splenocytes described in FIG. 34.

FIG. 35 shows a series of flow cytometry plots showing expression of CD62 ligand (x-axis) and CD45Rα (y-axis) for CD4 and CD8 cells isolated from splenocytes described in FIG. 34. The data demonstrate that HER2-SNIP-BBz CAR-T cells generate more stem cell memory T cell subsets (CD62L$^+$CD45Ra+) than the HER2.BBz constitutive CAR-T cells.

Figure 36:
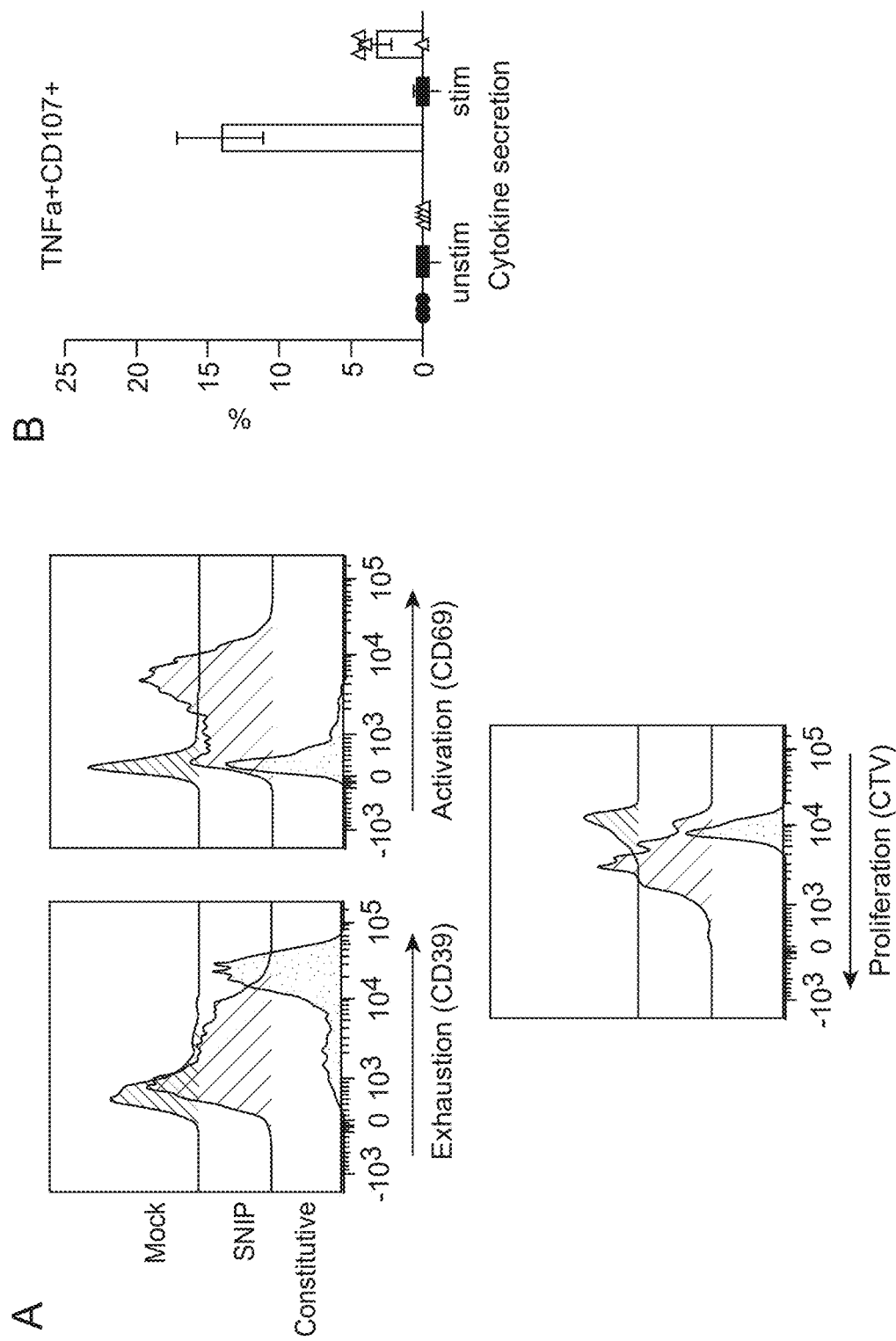
FIG. 36: Data demonstrating that HER2 SNIP CAR-T cells isolated from spleen have reduced expression of exhaustion markers and are more responsive to ex vivo stimulation than constitutive HER2 CAR-T cells. Panel A: A series of flow cytometry plots of T cells isolated from spleens of mice described in FIG. 34. Panel B: A graph quantifying the percent of CAR-T cells, described in FIG. 34, that are positive for the functional markers TNFα (cytokine secretion) and CD107α (degranulation).

FIG. 36, panel A, is a series of flow cytometry plots of T cells isolated from spleens of mice described in FIG. 34. As shown, mice isolated from HER2-SNIP-BBZ CAR-T cells display less exhaustion markers (left panel), and a greater ability to respond to antigen ex vivo, as determined by CD69 staining (middle panel) and the CellTrace™ Violet (CTV) proliferation assay (right panel). A graph quantifying the percent of CAR-T cells, described in FIG. 34, that are positive for the functional markers TNFα (cytokine secretion) and CD107α (degranulation) is provided in FIG. 36, panel B. Plate-bound HER2 Fc was used for stimulation of CAR-T cells ex vivo. These data demonstrate that HER2-SNIP-BBz CAR-T cells isolated from spleens of tumor-bearing mice are less exhausted and more functional than constitutive HER2-BBz CAR-T cells, as determined by markers of exhaustion (CD39) and markers of effector function (CD69, TNFα, CD107α, and proliferation).

Example 11-Control of Plasma Levels of Proinflammatory Cytokines by Dosing of Drug In this example, CD19-SNIP-BBz CAR-T and constitutive CD19-BBz CAR-T cells were compared in a mouse model of cytokine release syndrome. The experimental setup is schematically illustrated in FIG. 37, panel A. At day-21, NSG mice were infused with $1\times10^6$ Raji cells in the right leg. Twenty one days later, $3\times10^7$ CD19-SNIP-BBz CAR-T or constitutive CD19-BBz CAR-T cells were implanted by tail vein injection. Mice in the SNIP CD19 groups also received the indicated amount of grazoprevir (drug) three times per day. Mouse plasma was harvested 48 hours after T cell administration.

Shown in FIG. 37, panel B, is a series of graphs showing plasma cytokine levels of the proinflammatory cytokines IL-2 and IFNγ in mice treated with the indicated amount of drug. The data demonstrate that plasma cytokine levels of mice that received CD19-SNIP-BBz CAR-T cells can be tuned by administration of selected doses of the HCV protease inhibitor grazoprevir. Importantly, plasma cytokine levels of IL-2 and IFNγ are low in the absence of drug, indicating that the CAR-T cells are completely "OFF" and do not have observable leaky activity. This is a desirable property of a regulatable CAR-T system which is to be used as a safety switch in clinical applications. Residual activity of regulatable CAR-T cells in the "OFF" state in the setting of an adverse event (e.g., cytokine release syndrome, neurotoxicity, on-target off-tumor toxicity) may not be tolerated clinically and could fail to avert or reverse toxicities. Thus, it is highly beneficial for CAR-T cells to be completely inactive in the "OFF" state, which is observed in the SNIP system.

Example 12-ROR1-SNIP CAR-T Cells Extend Survival as Compared to Constitutive ROR1 CAR-T Cells in an On-Target Off-Tumor Toxicity Model In this example, ROR1-SNIP-BBz CAR-T cells were tested in an on-target, off-tumor toxicity model (see Srivastava et al. *Cancer Cell* 2019). The CAR construct included the anti-ROR1 scFv designated as "clone F" in International Patent Application Publication No. WO 2019/008378. NSG mice were irradiated (2.2 Gy) to initiate toxicity and then 5 hours later treated with 6M ROR1-SNIP CAR-T cells or constitutive control CAR-T cells. Mice weight was measured every two days. FIG. 38, panel A, is a graph showing percent weight change. The data demonstrate that mice that received constitutive CAR-T cells (ROR1-BBz and ROR1-28z) experienced severe toxicities, as determined by rapid weight loss, whereas mice treated with ROR1-SNIP-BBz or ROR1-SNIP–28z CAR-T cells in the OFF state had much slower onset of weight loss.

A graph showing the survival of mice described in panel A is provided in panel B. As can be seen from the data, mice that received ROR1-SNIP-BBz or ROR1-SNIP–28z CAR-T cells had prolonged survival compared to those that received constitutive ROR1-BBz or ROR1-28z CAR-T cells.

Accordingly, the preceding merely illustrates the principles of the present disclosure. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the example embodiments shown and described herein.

What is claimed is:

1. An expression vector comprising a nucleic acid encoding a cell surface receptor, wherein the cell surface receptor comprises:
   an extracellular binding domain;
   a transmembrane domain;
   an intracellular signaling domain; and
   a cleavage site for a protease, wherein the cleavage site is disposed between the transmembrane domain and the intracellular signaling domain,
   wherein the cell surface receptor is a chimeric antigen receptor (CAR) or an engineered T cell receptor (TCR),
   wherein the cell surface receptor does not comprise the protease, and
   wherein the cell surface receptor does not comprise a domain that dimerizes with the protease.

2. A cell comprising the expression vector of claim 1.

3. The cell of claim 2, wherein the cell is an immune cell.

4. The cell of claim 3, wherein the immune cell is a T cell or a natural killer (NK) cell.

5. The cell of claim 4, wherein the cell surface receptor is a CAR.

6. The cell of claim 4, wherein the cell is T cell and the cell surface receptor is a CAR.

7. A pharmaceutical composition comprising the cell of claim 6.

8. A pharmaceutical composition, comprising:
   the cell of claim 2; and
   a pharmaceutically-acceptable carrier.

9. The expression vector of claim 1, wherein the cell surface receptor is a chimeric antigen receptor (CAR).

10. The expression vector of claim 1, wherein the cell surface receptor is an engineered TCR.

11. The expression vector of claim 1, wherein the extracellular binding domain specifically binds an antigen on the surface of a cancer cell.

\* \* \* \* \*